United States Patent [19]

Chadima, Jr. et al.

[11] 3,823,388

[45] July 9, 1974

[54] DATA COLLECTION AND UTILIZATION SYSTEM

[75] Inventors: George E. Chadima, Jr.; Robert A. Bruce, both of Cedar Rapids, Iowa

[73] Assignee: Norand Corporation, Cedar Rapids, Iowa

[22] Filed: Feb. 10, 1971

[21] Appl. No.: 114,249

[52] U.S. Cl. ........ 340/172.5, 340/174.1, 346/74 M, 235/153, 179/2 DP

[51] Int. Cl. ............................ G06f 3/02, G06f 3/06

[58] Field of Search ............. 340/172.5, 365, 146.1; 235/153; 179/2 DP; 346/74 M

[56] References Cited

UNITED STATES PATENTS

| | | | |
|---|---|---|---|
| 3,491,355 | 1/1970 | Harrold | 340/365 |
| 3,500,327 | 3/1970 | Belcher et al. | 179/2 DP |
| 3,505,474 | 4/1970 | Quatse | 179/2 DP X |
| 3,541,526 | 11/1970 | Levy et al. | 340/172.5 |
| 3,557,311 | 1/1971 | Goldstein | 179/2 |
| 3,576,433 | 4/1971 | Lee et al. | 235/153 |
| 3,594,734 | 7/1971 | An Wang | 340/172.5 |
| 3,605,089 | 9/1971 | Gray | 340/172.5 |
| 3,617,638 | 11/1971 | Jochimsen | 179/2 DP |
| 3,629,850 | 12/1971 | Clark et al. | 340/172.5 |
| 3,656,131 | 4/1972 | Libby et al. | 340/172.5 |

*Primary Examiner*—Paul J. Henon
*Assistant Examiner*—John P. Vandenburg
*Attorney, Agent, or Firm*—Hill, Gross, Simpson, Van Santen, Steadman, Chiara & Simpson

[57] ABSTRACT

A data collection and utilization system having a portable data key entry and memory unit and a portable recorder, both of which operably fit into a console system. The key entry unit and the recorder may be coupled together by a cable and used apart from the console for entering numeric or alphabetic data into memory and for taking data from memory to the recorder. The two units may be readily electrically coupled to the console system by a series of pin connections which make contact when the units are placed in their carriage slots in the console. When so coupled, the portable units and the console operate to convert data from the tape through memory to various points of data utilization such as print-out or transmission. The present disclosure describes the logic circuitry which accomplish this unique portability, data storage and data handling capability.

48 Claims, 85 Drawing Figures

INVENTORS
GEORGE E. CHADIMA JR.
ROBERT A. BRUCE
BY Hill, Sherman, Meroni, Gross & Simpson ATTORNEYS

INVENTORS
GEORGE E. CHADIMA JR.
ROBERT A. BRUCE

BY [signature] ATTORNEYS

INVENTORS
GEORGE E. CHADIMA JR.
ROBERT A. BRUCE

BY Hill, Sherman, Meroni, Gross & Simpson ATTORNEYS

INVENTORS
GEORGE E. CHADIMA JR
ROBERT A. BRUCE

BY Hill, Sherman, Meroni, Gross & Simpson ATTORNEYS

INVENTORS
GEORGE E. CHADIMA JR.
ROBERT A. BRUCE

BY Hill, Sherman, Meroni, Gross & Simpson ATTORNEYS

INVENTORS
GEORGE E. CHADIMA JR.
ROBERT A. BRUCE

BY Hill, Sherman, Meroni, Gross & Simpson ATTORNEYS

INVENTORS
GEORGE E. CHADIMA JR.
ROBERT A. BRUCE
BY Hill, Sherman, Meroni, Gross & Simpson ATTORNEYS INVENTORS
GEORGE E. CHADIMA JR.
ROBERT A. BRUCE
BY Hill, Sherman, Meroni, Gross & Simpson ATTORNEYS INVENTORS
GEORGE E. CHADIMA JR.
ROBERT A. BRUCE
BY Hill, Sherman, Meroni, Gross & Simpson ATTORNEYS

INVENTORS
GEORGE E. CHADIMA JR.
ROBERT A. BRUCE

BY Hill, Sherman, Meroni, Gross & Simpson ATTORNEYS

INVENTORS
GEORGE E. CHADIMA JR.
ROBERT A. BRUCE
BY Hill, Sherman, Meroni, Gross & Simpson ATTORNEYS

INVENTORS
GEORGE E. CHADIMA JR.
ROBERT A. BRUCE

BY Hill, Sherman, Meroni, Gross & Simpson ATTORNEYS

INVENTORS
GEORGE E. CHADIMA JR.
ROBERT A. BRUCE

BY ATTORNEYS

INVENTORS
GEORGE E. CHADIMA JR.
ROBERT A. BRUCE

BY Hill, Sherman, Meroni, Gross & Simpson ATTORNEYS

INVENTORS
GEORGE E. CHADIMA JR.
ROBERT A. BRUCE

BY Hill, Sherman, Meroni, Gross & Simpson ATTORNEYS

INVENTORS
GEORGE E. CHADIMA JR.
ROBERT A. BRUCE
BY Hill, Sherman, Meroni, Gross & Simpson ATTORNEYS INVENTORS
GEORGE E. CHADIMA JR.
ROBERT A. BRUCE
BY Hill, Sherman, Meroni, Gross & Simpson ATTORNEYS INVENTORS
GEORGE E. CHADIMA JR.
ROBERT A. BRUCE
BY Hill, Sherman, Meroni, Gross & Simpson ATTORNEYS INVENTORS
GEORGE E. CHADIMA JR.
ROBERT A. BRUCE
BY Hill, Sherman, Meroni, Gross & Simpson ATTORNEYS INVENTORS
GEORGE E. CHADIMA JR.
ROBERT A. BRUCE
BY Hill, Sherman, Meroni, Gross & Simpson ATTORNEYS INVENTORS
GEORGE E. CHADIMA JR.
ROBERT A. BRUCE
BY Hill, Sherman, Meroni, Gross & Simpson ATTORNEYS

INVENTORS
GEORGE E. CHADIMA JR.
ROBERT A. BRUCE

BY Hill, Sherman, Meroni, Gross & Simpson ATTORNEYS

INVENTORS
GEORGE E. CHADIMA JR.
ROBERT A. BRUCE

BY Hill, Sherman, Meroni, Gross & Simpson ATTORNEYS

INVENTORS
GEORGE E. CHADIMA JR.
ROBERT A. BRUCE

BY [signature] ATTORNEYS

INVENTORS
GEORGE E. CHADIMA JR.
ROBERT A. BRUCE

BY Hill, Sherman, Meroni, Gross & Simpson ATTORNEYS

INVENTORS
GEORGE E. CHADIMA JR.
ROBERT A. BRUCE

BY Hill, Sherman, Meroni, Gross & Simpson ATTORNEYS

| STATE | QA | QB | START A | START B | RESET H | A | B |
|---|---|---|---|---|---|---|---|
| 1 | 0 | 0 | 0 | 0 | 0 | 1 | 1 |
| 2 | 0 | 0 | 0 | 1 | 1 | 0 | 1 |
| 3 | 1 | 0 | 1 | 1 | 1 | 0 | 0 |
| 4 | 0 | 0 | 1 | 1 | 1 | 1 | 0 |
| 5 | 0 | 1 | 1 | 1 | 1 | 0 | 0 |

INVENTORS
GEORGE E. CHADIMA JR.
ROBERT A. BRUCE
BY Hill, Sherman, Meroni, Gross & Simpson ATTORNEYS INVENTORS
GEORGE E. CHADIMA JR.
ROBERT A. BRUCE
BY Hill, Sherman, Meroni, Gross & Simpson ATTORNEYS

INVENTORS
GEORGE E. CHADIMA JR.
ROBERT A. BRUCE

BY Hill, Sherman, Meroni, Gross & Simpson ATTORNEYS

INVENTORS
GEORGE E. CHADIMA JR.
ROBERT A BRUCE
BY Hill, Sherman, Meroni, Gross & Simpson ATTORNEYS INVENTORS
GEORGE E. CHADIMA JR.
ROBERT A. BRUCE
BY Hill, Sherman, Meroni, Gross & Simpson ATTORNEYS

INVENTORS
GEORGE E. CHADIMA JR.
ROBERT A. BRUCE

BY Hill, Sherman, Meroni, Gross & Simpson ATTORNEYS

INVENTORS
GEORGE E. CHADIMA JR.
ROBERT A. BRUCE

BY Hill, Sherman, Meroni, Gross & Simpson ATTORNEYS

INVENTORS
GEORGE E. CHADIMA JR.
ROBERT A. BRUCE

BY Hill, Sherman, Meroni, Gross & Simpson ATTORNEYS

INVENTORS
GEORGE E. CHADIMA JR.
ROBERT A. BRUCE

BY Hill, Sherman, Meroni, Gross & Simpson ATTORNEYS

PATENTED JUL 9 1974 3,823,388

SHEET 36 OF 44

INVENTORS
GEORGE E. CHADIMA JR.
ROBERT A. BRUCE
BY Hill, Sherman, Meroni, Gross & Simpson ATTORNEYS INVENTORS
GEORGE E. CHADIMA JR.
ROBERT A. BRUCE
BY Hill, Sherman, Meroni, Gross & Simpson ATTORNEYS INVENTORS
GEORGE E. CHADIMA JR.
ROBERT A. BRUCE
BY Hill, Sherman, Meroni, Gross & Simpson ATTORNEYS

INVENTORS
GEORGE E. CHADIMA JR.
ROBERT A. BRUCE

BY Hill, Sherman, Meroni, Gross & Simpson ATTORNEYS

INVENTORS
GEORGE E. CHADIMA JR.
ROBERT A. BRUCE
BY Hill, Sherman, Meroni, Gross & Simpson ATTORNEYS INVENTORS
GEORGE E. CHADIMA JR.
ROBERT A. BRUCE
BY Hill, Sherman, Meroni, Gross & Simpson
ATTORNEYS

INVENTORS
GEORGE E. CHADIMA JR.
ROBERT A. BRUCE

BY Hill, Sherman, Meroni, Gross & Simpson ATTORNEYS

INVENTORS
GEORGE E. CHADIMA JR.
ROBERT A. BRUCE
BY Hill, Sherman, Meroni, Gross & Simpson ATTORNEYS INVENTORS
GEORGE E. CHADIMA JR.
ROBERT A. BRUCE
BY Hill, Sherman, Meroni, Gross & Simpson ATTORNEYS

DATA COLLECTION AND UTILIZATION SYSTEM

BACKGROUND OF THE INVENTION

1. Description of the Prior Art

Data collection and utilization systems have been known in the prior art which have keyboard devices for entering numeric data or alphanumeric data and incremental recording devices of various forms for recording data. Such systems have usually utilized multichannel recording devices to obtain separation between data and synchronization. Though attempts were made to make such systems portable, in fact, portability meant a large bulky system usually attached to a cart for wheeling from point to point. In addition to the large physical size of the prior art systems, such systems were limited in the intermediate storage capacity prior to placing the data on the recording medium.

The lack of true portability of prior art devices resulted in a general unacceptability of such devices in the industry.

1. Field of the Invention

The field of art to which this invention pertains is data collection and utilization systems and in particular to such systems which have a control console, a portable data key entry and memory unit and a bulk data recording and storage unit.

SUMMARY OF THE INVENTION

It is a principal feature of the present invention to provide an improved portable data collection and utilization system.

It is another feature of the present invention to provide a portable data collection and utilization system which employs a hand-held key entry and display memory unit and an equally portable data storage unit which may be operated either together or in conjunction with a console system which contains the required logic circuitry for retrieving and utilizing the data.

It is a principal object of the present invention to provide a data entry and utilization system which is divided into three elements, a key entry-memory and display unit, a recorder unit, and a console unit wherein the three units may be used integrally as a single system or the key entry unit may be used in conjunction with the recorder unit apart from the console.

It is an important object of the present invention to provide a data collection and utilization system which has a central intermediate memory and a number of peripheral systems which are permitted to access memory in accordance with a time division multiplexing system and which in addition employs a contention control system to prevent the peripheral devices from interfering with each other in the transfer of data to and from the intermediate memory.

It is a further object of the present invention to provide a data collection and utilization system as described above which employs a split intermediate memory in conjunction with a contention control circuit to permit the transfer of data to one section of memory and the retrieving of data from another section of memory by peripheral devices while preventing interference between such devices in the transfering of data to or from memory.

It is also an object of the present invention to provide a contention control circuit which includes logic means for comparing the logic states of two device inputs and for using this comparison to control the operation of one of the two devices whenever said one device would, if not controlled, result in operational interference with the other device.

These and other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure.

DESCRIPTION OF THE PREFERRED EMBODIMENTS

The present invention comprises a data collection and utilization system which consists of a console or operating station which may be placed on a table in a relatively stationary position and which also consists of a hand-held keyboard/display data-entry and memory unit and also a recorder, in the present case, a simple cassette type recorder together with a portable power supply.

Figure 1:
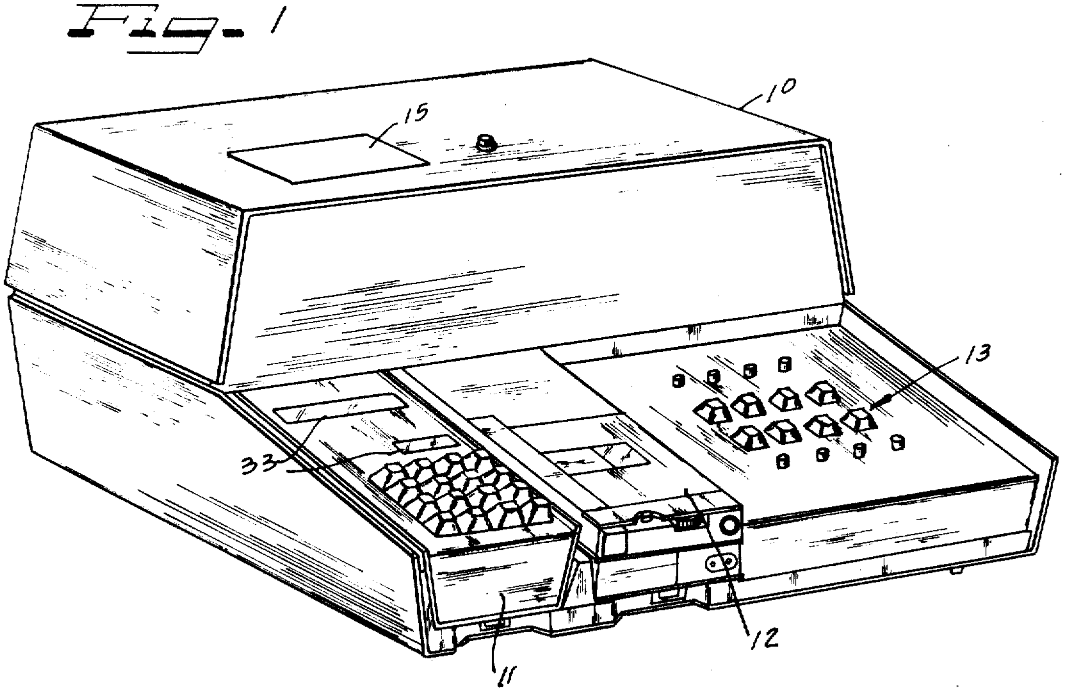
FIG. 1 is a perspective of a data collection and utilization system according to the present invention.

The system may be operated with the hand-held keyboard unit and the recording unit operably connected to the console portion of this system as shown in FIG. 1.

The console is illustrated by the reference numeral 10, and the keyboard unit is illustrated by the reference numeral 11. The cassette tape recorder is illustrated by the numeral 12. Both the keyboard unit and the tape recorder are positioned in carriage slots in FIG. 1, and each of these units are electrically and operably coupled to the console 10 by means of suitable pin connections at the base of each of the units 11 and 12. When the system is assembled as shown in FIG. 1, data from the recorder 12 may be controllably fed through the system contained in the console 10 and through the electronic system associated with the keyboard unit 11 to various utilization points inside and outside the console. Control of the flow of data within the console is accomplished through a keyboard 13 shown in FIG. 1.

Figure 2:
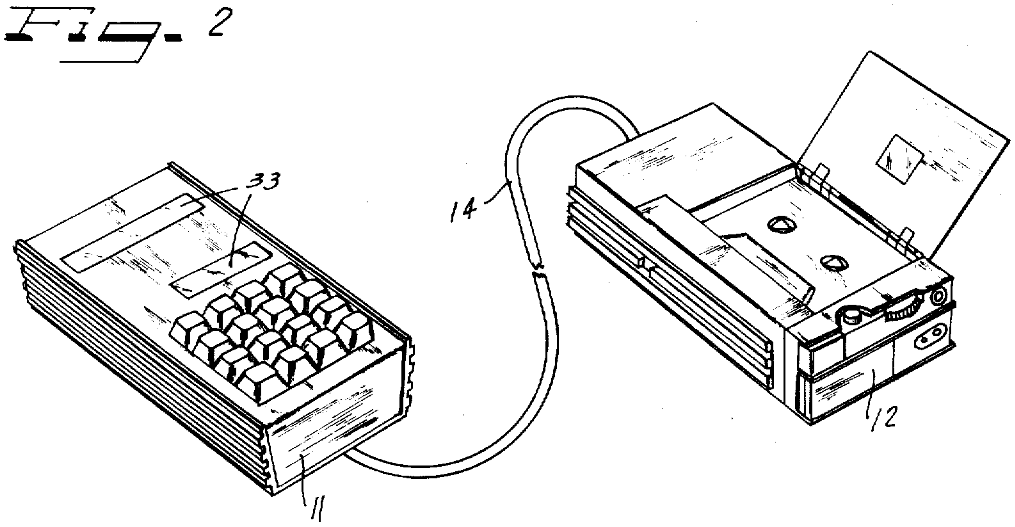
FIG. 2 shows the key board entry and recorder portions of the system shown in FIG. 1 with the key board and recorder operating wholly apart from the console portion of the system shown in FIG. 1.

The system becomes portable by easily removing the units 11 and 12 from FIG. 1 and coupling the units together by means of a cable 14 shown in FIG. 2. The keyboard unit is of such a size as to be readily held in the hand, and the recorder is proportioned to be of such a size to be either carried on a suitable hip or shoulder strap. The recorder also contains the power supply for the keyboard unit when the system is operated in the portable mode.

The system of the present invention may have various uses whenever it is desired to portably collect and transmit data. The system has a special application to chain-store operations where a number of stores in the chain order through a central ordering system. An individual user may place a daily order through a central system by removing the keyboard and recording units 11 and 12 and walking through the aisles of the store entering data in numeric form in the keyboard unit which is then released periodically to the recorder. When the entire order is completed, the units 11 and 12 then are simply positioned in the carriage slots provided for the units in the console. The positioning of the units makes the required electrical connection to the console, and the keyboard 13 on the console may then be used to control the flow of data through the system to produce a direct print-out of the order through a printer which is integrally mounted in the console. Such a printer may have a paper feed through an opening 15 shown in FIG. 1. The system may also be used with a telephone coupling arrangement to transmit data directly to a receiving terminal unit at a central distribution point. The receiving unit could be of a like design to the unit shown in FIG. 1, since the unit in FIG. 1 also has data receiving and printing capability.

The output of the system shown in FIG. 1 may be coupled to a variety of suitable data retrieving or utilization equipment which has the effect of reproducing the individual store order in visible form. The system shown in FIG. 1 has the advantage of allowing the individual store in the chain to order daily and receive more rapid delivery and thereby significantly reduce the inventory the store must carry at any period of time. The system is a more convenient method of ordering, is more accurate, and results in a reduction of warehousing space required for each of the individual stores.

The system shown in FIGS. 1 and 2 may also be used to transmit general accounting information or any other statistical information which is reducable to numeric or in principle alphabetic characters.

FIGS. 3 through 7 illustrate in a simplified block form the operational features of the system shown in FIGS. 1 and 2. The remaining figures illustrate detailed portions of the circuitry which is part of the various blocks shown in FIGS. 3 through 7.

Figure 3:
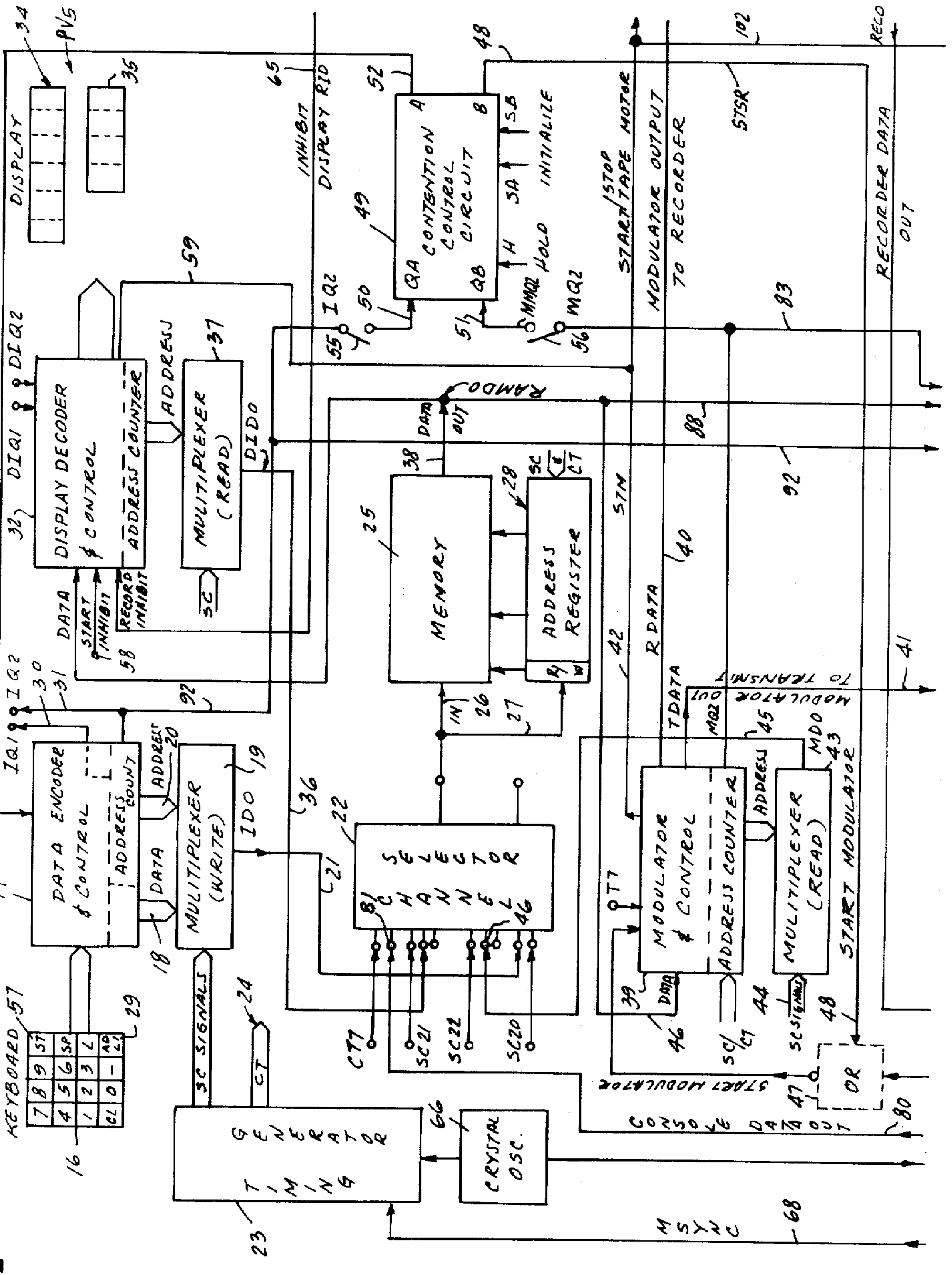
FIG. 3 is a portion of a block diagram of the electronic schematic of the system of the present invention.

FIG. 3 in its entirety represents the portion of the system which is contained within the keyboard entry unit 11.

The keyboard unit has a push button keyboard arrangement shown at 16 in FIG. 3. The keyboard unit has output couplings to a data encoder and control unit 17. The couplings consist of 16 lines, one for each of the keys on the keyboard 16. Each of the lines sense switch closures and couple a signal from a power supply to the encoder 17.

When each one of the keys are depressed, the encoder produces a four bit code coupled through four lines shown at 18 through a multiplexer 19. The four lines 18 are identified in FIG. 3 as the data lines. At the same time, the encoder produces nine bit address information which is coupled through nine lines shown at 20.

The output of the multiplexer is coupled through a signal path 21 to a channel selector 22.

A timing generator 23 produces a series of time slots illustrated as SC and CT signals 24 which are coupled to a series of inputs on the multiplexer 19 and at the channel selector identified as SC20, SC22 and SC21, and CT7.

At the appropriate time interval determined by the timing generator, the data and address information from the multiplexer 19 is coupled to a memory 25. The data and address information is coupled to the input of the memory at 26 and to the input 27 of an address register 28. The address register 28 is then coupled to the memory circuit as shown.

The address register 28 is controlled by the same SC and CT signals generated by the timing generator 23 as shown.

Each time a key is depressed on the keyboard 16, the address counter of the data encoder 17 is incrementally advanced and multiplexed and coupled to the address register 28 through the channel selector 22. The address register 28 then advances and locates a new available storage position in the memory unit 25. This process is continued until 10 key entries have been made. Ten digits then fill one portion of memory which may be referred to as a line in memory.

After a line in memory is completed, the advanced line key 29 is depressed, resulting in suitable outputs on data lines 30 and 31 referred to as IQ1 and IQ2. These signals are coupled from the address counter through the address register 28. The address register 28 then shifts the memory to a new line. In the present case, memory is provided with four lines. Also, the signals IQ1 and IQ2 from the encoder 17 are coupled to a display unit 32.

The display portion of the keyboard 11 is shown by reference numeral 33 in FIG. 1 and consists of a series of gas discharge display tubes illustrated generally by the reference numerals 34 and 35 in FIG. 3. Such a display could also be accomplished by solid state elements. Each character of the display has an address in memory, and the address counter of the display decoder 32 scans memory on a line basis by means of a line 36 which couples the multiplexer 37 through the channel selector to memory. It should be noted that the encoder as coupled through the channel selector is writing data into memory in accordance with the sequence provided by the timing generator 23 and in accordance with a portion of the address register identified as R-W which tells the memory 25 whether a read or write operation is to be performed. In the case of the encoder 17, the multiplexer 19 produces an output from the R/W portion of the address register 28 which designates a write operation, and in the case of the display decoder, the multiplexer 37 results in an output from the R/W section of the address register 28 which indicates a read operation.

The data read from memory is coupled through an output 38 to the input of the display decoder 32 and eventually results in illumination of the display tubes 34 and 35 in accordance with the control of the associated address counter. Input signals DIQ1 and DIQ2 to the decoder 32 tell the decoder which line of memory to scan at any one point in time.

The keyboard unit shown in FIG. 2 has a modulator 39 which is employed to access memory and to provide a format for combining synchronization and data to transmit data to a recorder at an output 40 or to an output transmission line 41. The modulator 39 is also used to start and stop the tape recorder motor through a circuit line 42.

The modulator has a multiplexer 43 which is controlled by the SC signals at 44 from the timing generator 23. The multiplexer 43 is coupled through a line 45 to an input 46 of the channel selector 22. Through this arrangement, the multiplexer can scan memory during the time slot provided for the modulator by the timing generator 23. The data available in memory is then coupled from the output 38 to the data input of the modulator identified by the numeral 46.

The modulator circuit is controllable by two means. It may be controlled by a signal from the console unit which is illustrated in block diagram in FIG. 4 by an input ZM. The signal ZM is coupled to an orgate 47 which is shown in dash lines in FIG. 3, and which in fact is part of the modulator 39. The modulator 39 may also be started by a signal which is coupled to the or-gate 37 at a point 48 and which is an output of a contention control circuit 49.

The contention control circuit 49 has a pair of inputs 50 and 51. The circuit 49 compares the two inputs to determine when to produce a signal on the line 48 to start the modulator. The input to the contention control circuit which is identified by the numeral 50 is coupled to the IQ2 output 31 of the data encoder circuit 17. When a pair of lines have been entered into memory through the encoder 17, a change in signal is produced on the IQ2 output indicating that two lines have entered into memory and a new section of memory will be addressed by a subsequent pair of lines from the encoder 17. When such a change in signal occurs on the line 50 and a different signal appears on the output MQ2 of the modulator 39, the contention control circuit produces a start signal at the output 48 to start the modulator 39.

When the modulator 39 has completed access of the given two lines of memory, a change in signal appears on the circuit line MQ2. If a change has not occurred on the circuit line IQ2 at the output of the encoder 17, the contention control circuit will produce an output on the circuit line 48 which results in a stop signal for the modulator. When however a second pair of lines has been completed by suitable entries on the keyboard 16, a change in signal again occurs on the line IQ2 which then produces a desired relationship of signals at the inputs 50 and 51 of the contention control circuit to produce a start signal at the output 48 of the modulator control. In this way, the modulator is prevented from reading a section of memory which has not been completely written. In the present invention this concept may be referred to as a line pair concept.

It has been determined that by utilizing two sections of memory, each with two lines, an operator of the keyboard system usually cannot physically enter three lines prior to the time the modulator completes reading of two prior lines. Therefore, one section of memory will be available to receive data from the keyboard. If unusual keyboard entry conditions should occur, the contention control circuit 49 has an output 52 which is coupled to an input 53 of the data encoder which can be used to inhibit the entry of additional data into memory until such time as a one of the two sections of memory is read by the modulator circuit 39.

Figure 4:
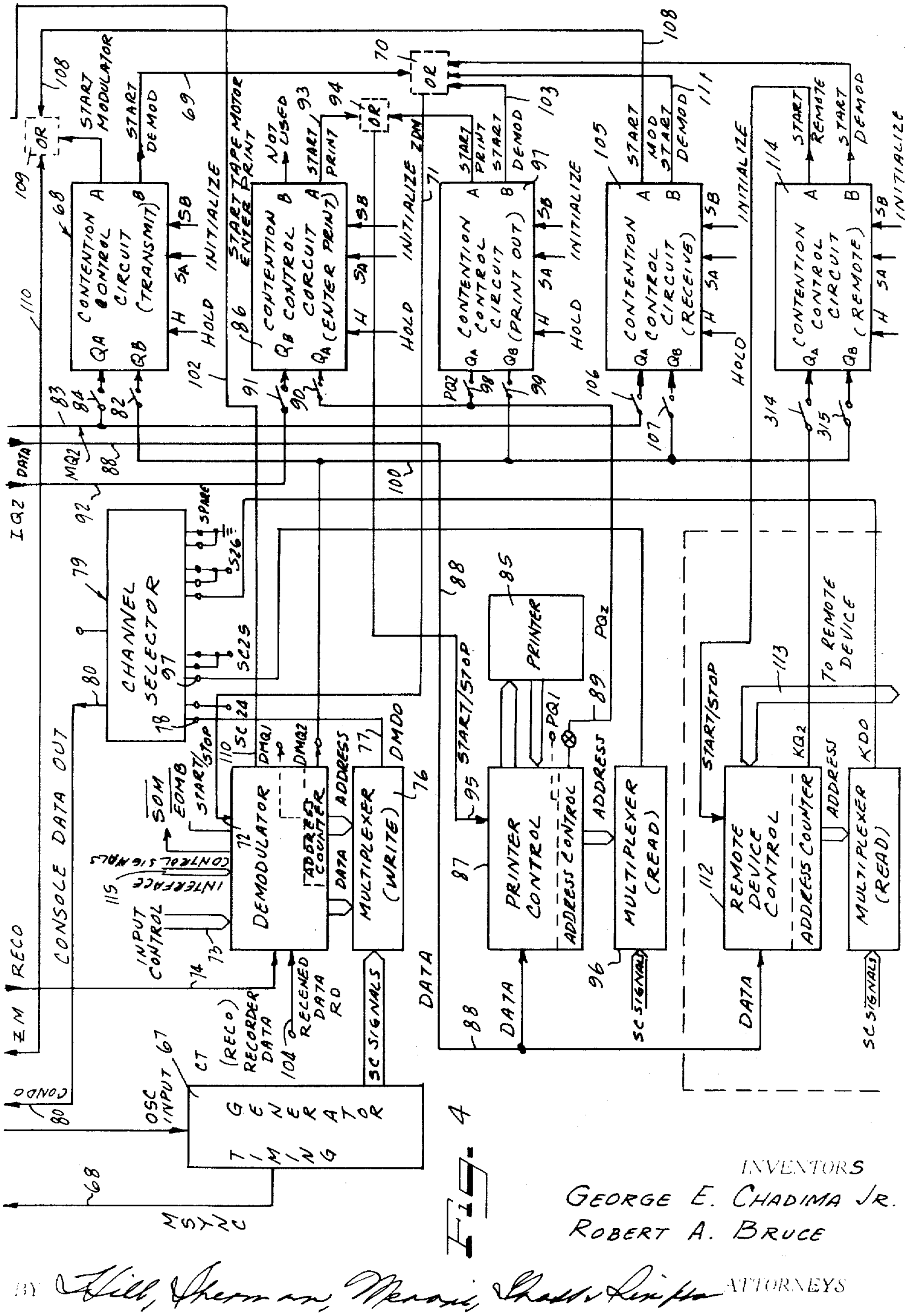
FIG. 4 is a further portion of the block diagram illustrated in part in FIG. 3.
Figure 5:
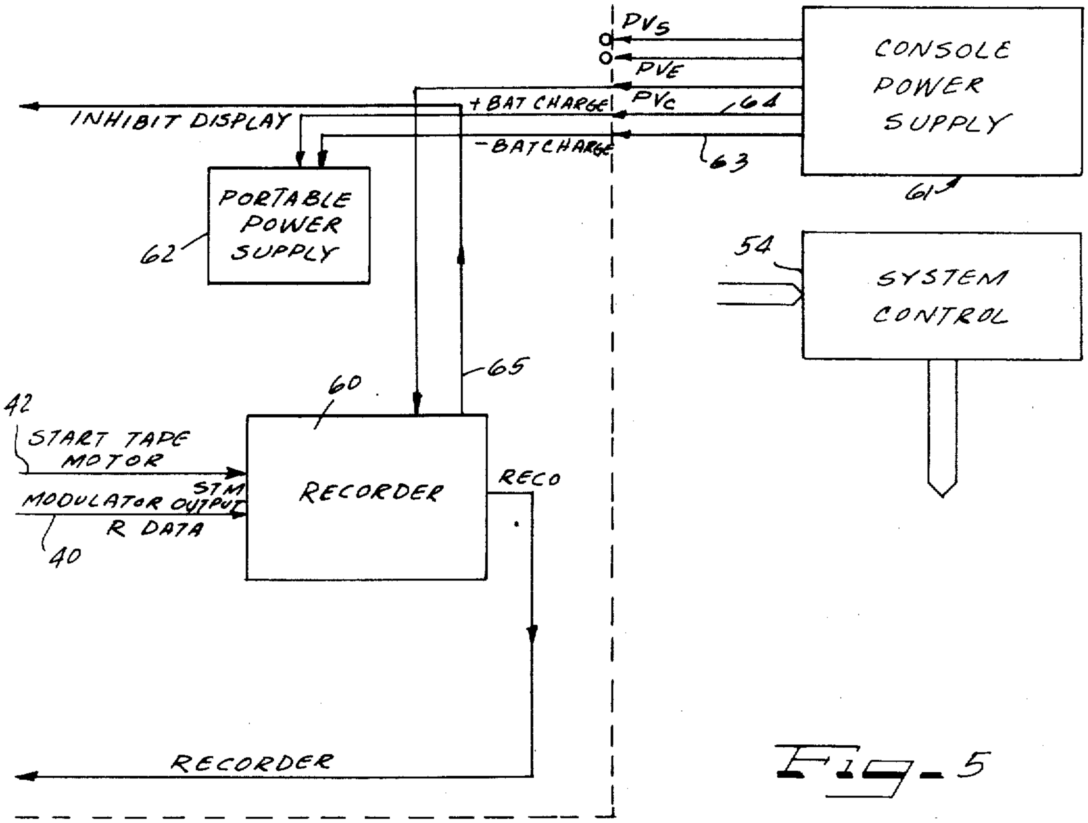
FIG. 5 is a continuation of the block diagram of FIG. 4.

As shown in FIGS. 3 and 4 there are a number of contention control circuits, and a system control illustrated by the reference numeral 54 in FIG. 5 which is controlled by the keyboard 13 in FIG. 1 is used to initialize or hold any one of the contention control circuits to be used in connection with any one of the selectable operational modes of the system. For this purpose the initialize and hold inputs as well as the IQ2 and IQ1 inputs of the circuit 49 are controlled by the system control circuit. For this purpose, switches 55 and 56 are illustrated schematically within the inputs 50 and 51 of the contention control circuit 49.

To initiate operation of the system, a start key 57 is depressed. This applies a signal to a terminal 58 at one of the inputs of the display decoder 32 which inhibits the display for a predetermined period of time such as 6 seconds. At the same time that the key 57 is depressed, the display decoder 32 produces an output on a line 59 which couples a start signal through the line 42 to a recorder 60. After the lapse of the given period of time, the signal at the line 59 releases and the recorder 60 stops. This allows the recorder to advance for several inches of tape to advance beyond tape leaders or to place non-recorded gaps on tape.

During the time the inhibit signal is applied to the display, the display 34 and 35 is left blank. When the recorder 60 is stopped due to the releasing of the signal at the output 59 of the decoder, a start code appears at each digit position on the display indicators 34 and 35. After the tape is advanced to a start position, the keyboard or hand-held unit may be operated as described above for entering data through memory to the recorder, and will be displayed as the numeric data is entered on the display indicators 34 and 35 on a line by line basis. If the start key 57 were not depressed and attempts were made to enter data, the display would not be operative due to the lack of a signal at the input of the start inhibit terminal 58.

Figure 7:
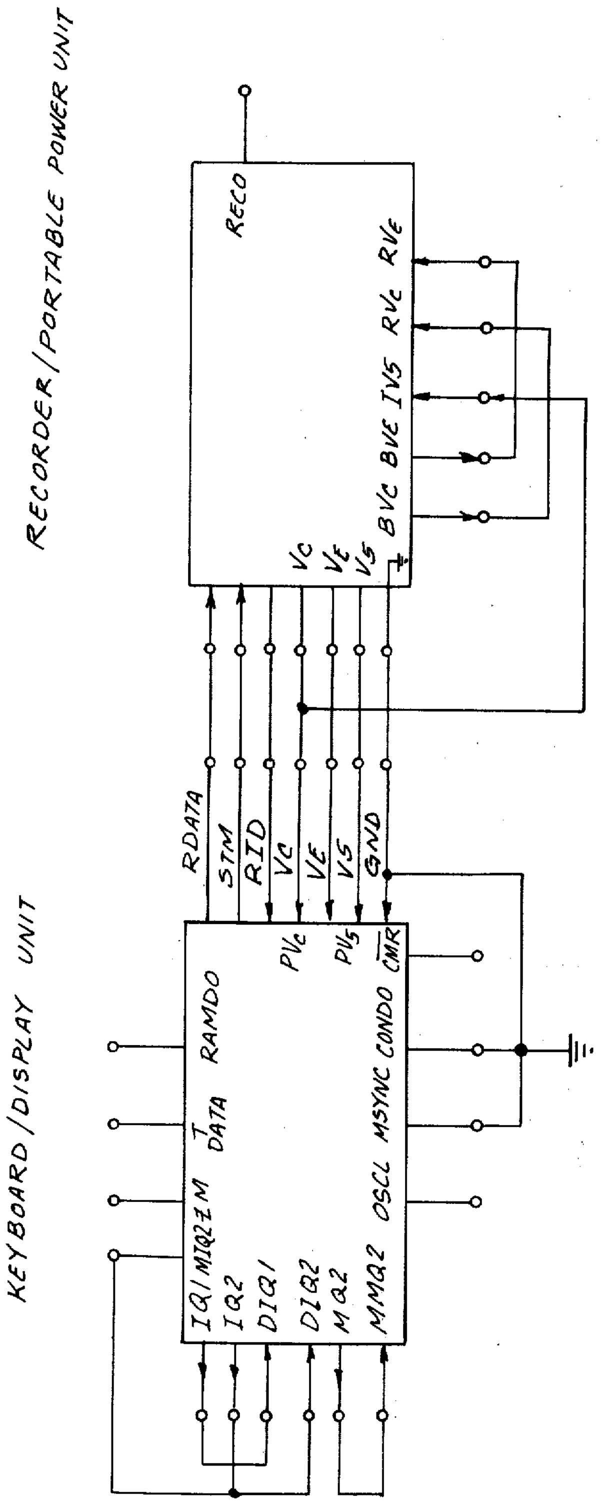
FIG. 7 is an illustration of the block diagram of the keyboard and recorder system operating as an integrated unit separate apart from the console as shown in FIG. 1.

When the keyboard-display unit and the recorder are used as a portable unit for collecting data, the two units are electrically coupled by means of a cable 14 as shown in FIG. 2 with mating pin and socket connections. The connection between the two units is shown in FIG. 7. In FIG. 7 the keyboard-display unit and the recorder unit are identified. The IQ1, IQ2 terminals are the terminals which are connected to the similarly identified terminals at the data encoder 17. The DIQ1 and DIQ2 terminals are the terminals associated with the similarly identified terminals of the display decoder 32. The MQ2 and MMQ2 terminals are identified in FIG. 3 as the connections of the terminals on either side of the switch 56 associated with the contention control circuit 49. In the portable mode, the terminal ZM, T data RAMDO and oscillator, OSC, terminals are not employed. The MIQ2 terminal on the keyboard is coupled to the IQ2 terminal and these two terminals are identified in FIG. 3 on opposite sides of the switch 55 also associated with one of the inputs of the contention control circuit 49.

In the portable mode of operation, the R DATA lines are coupled between the keyboard unit and the recorder unit as shown in FIGS. 7 and FIGS. 3 through 5. Similarly, the STM and RID lines are also coupled as shown in FIGS. 7 and 3 through 5.

The console power supply 61 has outputs VC, VE, and V5 as shown in FIG. 5 and these outputs are coupled to the keyboard display unit as shown in FIG. 7. Also a ground line is coupled between the two units in FIG. 7.

In the portable operation the ocillator terminal on the keyboard unit is not utilized. Also the M Sync and CONDO (console data output) are not utilized and are grounded as shown in FIG. 7.

Figure 82:
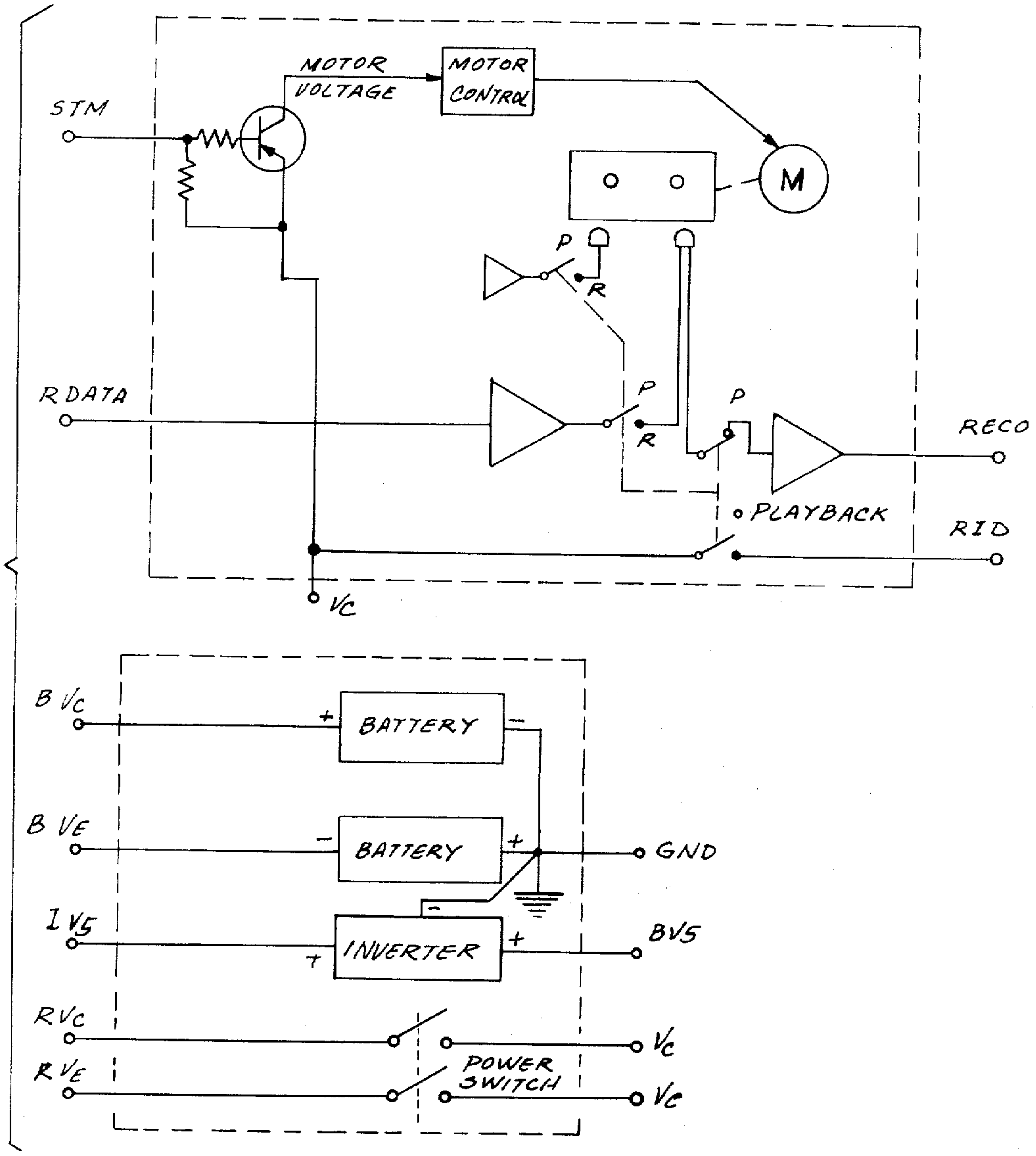
FIG. 82 is a schematic of the recorder and the portable power supply shown in FIG. 5 of the block diagram.

Also shown in FIG. 7 are a series of battery and inverter power switch connections which are identified in further detail in FIG. 82. These are $BV_c$, $BV_E$, IV5, $RV_c$, and $RV_E$. In addition, the recorder has an output terminal, RECO which is not used in the portable mode of operation.

After a suitable quantity of data has been placed on the recorder 60, and it is desirable to either transmit the data to a central receiving point or central ac counting or payroll system, the hand-held key-entry unit is placed into the console 10 as shown in FIG. 1 with the pin connections at the base of the hand-held unit making electrical contact with a mating socket arrangement on the console. This then connects the hand-held unit which is shown in its entirety in FIG. 3 to the console electronic system shown in its entirety in FIG. 4, part in FIG. 5 and FIG. 6.

The console is provided with a console power supply 61 shown in FIG. 5. The recorder module 12 shown in FIG. 1 is provided with a portable power supply 62 also shown in FIG. 5. When the recorder unit 12 is placed into the console by making a series of pin connections at the base of the recorder, similar to the connections made by the hand-held unit 11, the portable power supply is disconnected from the system and the console power supply 61 is then coupled to the entire system shown in FIG. 3 and FIG. 4 and at the same time is used to charge the portable power supply by means of circuit lines 63 and 64 shown in FIG. 5.

The recorder 60 also has an output 65 which is used to inhibit the display decoder 32. The line 65 is coupled to a recorder input at the display decoder, and unless the recorder is in the record mode as opposed to the playback mode the display indicators 34 and 35 are inoperative.

The timing generator shown in 23 is supplied by a crystal oscillator 66. The crystal oscillator 66 also supplies a timing generator 67 in the console unit shown in FIG. 4. The two timing generators 23 and 67 are coupled by a circuit path 68 identified as M SYNC. This circuit path is used to synchronize the phase of the timing signals generated by the units 23 and 67.

With the keyboard and recording units 11 and 12 in the position shown in FIG. 1, a typical mode of operation might be to utilize the system to transmit data which has been collected on the recorder. The data may be transmitted over telephone lines or other transmission systems. For such a mode of operation, the recorder 60 is turned to a playback mode by a suitable playback switch. The tape is reqound to an initial position and placed in the forward playback setting. In this mode of operation, the first step is to select the transmit button or key on the keyboard 13 of the console. When this key is depressed a contention circuit 68 shown in FIG. 4 is released from a hold position to an initialized condition to start the demodulator. The contention control circuit 68 has an output 69 which is coupled through an or-circuit 70 and a circuit line 71 to an input 72 to start the demodulator. Also, the system control 54 which is actuated by depressing the transmit key on the keyboard 13 couples a suitable signal to the input control of the demodulator identified by the numeral 73. This selects the proper input for the demodulator which in this case is the recorder data input 74. Also, the system control 54 initiates the coupling of the data terminal interface output 75 to the circuit line 41 which is coupled directly to the modulator transmit output data or T DATA line also identified as 41 in FIG. 3.

With the recorder and the demodulator operating, the demodulator multiplexer 76 couples demodulator data and address information to the demodulator data output 77. The line 77 is coupled to a terminal 78 of a channel selector 79. The timing generator 67 couples SC signals to the input of the multiplexer. These signals are also coupled to the input of the channel selector as shown and as illustrated by the identifying designations SC24, SC25, and SC26. The channel selector has an output 80 identified as the console data out. The line 80 is coupled to a similarly identified line 80 of FIG. 3 which in turn is connected to an input 81 of the channel selector 22. Data from the input 71 is passed through the channel selector at a time when the timing generator 23 couples a timing signal identified as CT7 to the associated input of the channel selector. From this point, the demodulator data is passed to memory in a similar manner as described in connection with the passing of data from the data encoder to memory from the keyboard operation.

After the demodulator has entered two lines of data in memory 25, the output identified as DMQ2 of the demodulator changes state. The output DMQ2 is coupled directly through a switch 82 to the input QB of the contention control circuit 68. Also, the modulator output MQ2 (FIG. 3) is coupled through a circuit line 83 shown both in FIGS. 3 and 4 to a switch 84 and then to the input terminal QA of the contention control circuit 68. The switches 82 and 84 are controlled by the system control circuit 54 shown in FIG. 5. Only after the demodulator output DMQ2 changes state, will the contention control circuit permit the modulator to start reading data from memory. After two lines have been placed in memory, then the modulator may read those two lines from memory. The modulator then couples the data through the T DATA line 41 to the data terminal interface shown in FIG. 6 and eventually to an output transmission line 75.

After the starting of the modulator, the demodulator will proceed to feed two additional lines of data into the memory. If the two additional lines are fed into memory prior to the time the modulator has read the initial two lines from memory, the contention control circuit will produce a change in signal at the output 69 which will inhibit the demodulator from proceeding until such time as the modulator has released the initial two lines of memory. If on the other hand the modulator transmits two lines of data from memory prior to the time that the demodulator has entered a subsequent pair of lines into memory, the contention control circuit 68 will produce an output signal at the A output thereof which will stop the modulator until such time as the demodulator has completed entering the required line-pair. This is the same type of operation that was described in connection with the contention control circuit 49. Again, this operation relates to the fact that the memory 25 is divided into two sections with each section being divided into a pair of lines.

The modulator 39 has an input TT which is a signal coupled from the system control 54. The system control provides the signal on the terminal TT when a suitable key is depressed on the keyboard 13 of FIG. 1. This signal is used to inhibit the R DATA output of the modulator when the system is used in the transmit mode.

Another mode of operation which may be selected by the keyboard 13 on the console shown in FIG. 1 is referred to an enter-print mode. In this mode, the keyboard may be depressed manually resulting in a display of the characters on the display indicators 34 and 35, and the data encoder 17 will couple the data through the channel selector 22 and the memory 25 to the modulator 39 from which it is then coupled to the recorder 60 by way of the R DATA line 40. At the same time, the printer identified by the numeral 85 may be employed to print out a verification of the information keyed into the keyboard unit.

In applying the data from the data encoder 17 to the recorder 60, the contention control circuit 49 is employed as described previously to start and stop the modulator to be sure that the recorder does not access memory until such time as at least two lines of memory have been filled by the keyboard. In a like manner, the printer 85 is provided with a contention control circuit 86 in conjunction with a printer control 87. The data is taken from the memory by way of the output 38 through a circuit line 88 to the input of the printer control 87. The printer control is provided with an output PQ2 to a circuit line 89 which is then coupled to a switch 90 at the input of the contention control circuit 86. The switch 90 is controlled by the system control 54. At this point in time, the switch 90 has been closed by the depressing of the enter- print key on the keyboard 13 shown in FIG. 1.

The contention control circuit 86 also has a second input switch 91 which is also closed at the same time as the closing of the switch 90. The switch 91 has a signal coupled thereto by way of a circuit line 92 which couples a signal from the output IQ2 of the data encoder 17. Accordingly, the contention control circuit 86 is operative between the output PQ2 of the printer control 87 and the output IQ2 of the data encoder control 17. The contention control circuit 87 then operates in a manner similar to the operation of the contention control circuit 49 to be certain that the printer control and the printer do not have access to memory until such time as at least two lines or one-half of memory has been filled by the entering of a suitable number of characters from the keyboard 16. It is noted that each one of the contention control circuits including the circuit 86 are provided with hold and initialize inputs. The circuits are switched from hold to initialize condition upon depressing the associated key, in this case the enter-print key on the console keyboard 13 of FIG. 1. The initialize signal occurs in such a way as to inhibit the output of the contention control circuit until the required input conditions are satisfied between the data encoder output and the printer control output. When the conditions are satisfied, the circuit 86 produces a signal at the output 93 which is coupled to an orgate 94 which in turn couples the start signal to the printer control at a point 95. The printer control then initiates the printing. Upon initiation of the printing, the address counter of the printer control sends appropriate addresses to the multiplexer 96 which relays the address information to a terminal 97 on the channel selector 79. This address information is then passed through the channel selector at a time SC25 as determined by the timing generator 67. The address information is then relayed via the line 80 to the channel selector 22 as described previously for accessing memory to provide data output on the line.

Another mode of operation that may be employed by the system is a print-out mode wherein the data previously recorded on the recorder is demodulated and applied to the printer by way of the memory 25.

To perform the print-out function, a further contention control circuit 97 is provided. The contention control circuit 97 has an input switch 98 which is closed at the time that a print-out key is depressed on the keyboard 13 of the console, (FIG. 1). The closing of the switch 98 couples the PQ2 signal from the printer control to the contention control circuit. The contention control circuit also has a switch 99 which is similarly closed at the time of the closing of the switch 98 and which couples a signal DMQ2 from the output of the demodulator address counter via a circuit line 100.

When the demodulator is started, a signal is produced on an output 101 of the demodulator which is then coupled through a circuit line 102 to the circuit line 42 in FIG. 3. The circuit line 42 is then coupled to start the recorder. It is assumed that at this point in time the recorder is rewound and placed in a playback mode.

The contention control circuit 97 is switched to initialize from a hold position by the system control 54 of FIG. 5 at the time the printout key is depressed on the keyboard 13 (FIG. 1). When the circuit 97 is initialized an output signal is produced on a line 103 which is then coupled to the gate 70. The or-gate 70 has an output on a circuit line 71 which is coupled to the demodulator to start the demodulator.

The contention control circuit 97 operates in a manner similar to the contention control circuits 49, 68, and 86, and operates between the demodulator/-recorder and the printer. This circuit prevents the printer from accessing memory until the memory has at least two lines of data filled. Also, the contention control circuit 97 prevents the demodulator and recorder from writing data into memory until the printer has accessed two lines of data from memory or until at least two lines of data are released for access by the demodulator.

The demodulator is also provided with a pair of terminals SOM and EOMB. These two terminals sense the presence of start and stop signals respectively on the tape. When the given signals are sensed, they are then coupled to the correspondingly identified inputs on the data terminal interface of FIG. 6 where they are used as control signals for the transmission of data over telephone lines or the like.

Another mode of operation for the system of FIG. 1 is the receive mode. In this mode incoming information over a telephone line or the like is received at a terminal 104 of the demodulator. The received data is demodulated and coupled through the multiplexer 76 and channel selectors 79 and 22 as previously described to the memory 25. The data out from the memory at 38 is then coupled to the modulator and associated control which in turn starts the tape motor via the line 42 to enter data from the modulator on the recorder. The recorder at this point has been set to the record mode.

The contention control circuit associated with the receive mode of operation is identified by the reference numeral 105 and has a pair of inputs switches 106 and 107. The input switch 107 couples information from the output of demodulator at DMQ2 to the contention control circuit. The switch 106 couples data from the output of the modulator at MQ2 to the contention control circuit. Both of the switches are closed when the receive key is depressed on the keyboard 13 of the console unit of FIG. 1.

The contention control circuit 105 is similar to the previously discussed contention control circuits. In this case the contention control circuit operates between the demodulator and the modulator to assure that the modulator does not access memory at a rate faster than the demodualtor supplies data to memory. In this case, the reverse function is not utilized since under normal circumstances, the data input to the demodulator from a receiving line such as a telephone line is continuous and is not to be interrupted by the contention control circuit. However, it still must be certain that the modulator will be able to access memory at a rate which is fast enough to clear memory so that additional data can be entered as it is received on the demodulator input 104. To accomplish this, the modulator is designed to be faster than the demodulator.

The modulator, however, is nevertheless controlled by the contention control circuit and is inhibited from accessing memory until the demodulator has supplied at least two lines of memory with data.

The modulator is controlled by the output 108 of the contention control circuit 105. The output at the line 108 is coupled to an or-gate 109 which in turn has an output circuit line 110 which forms a ZM signal which in turn is coupled to the or-gate 47 of the circuit shown in FIG. 3. The output of the or-gate 47 is then coupled to the modulator 39.

The contention control circuit 105 has a second output 111 which is also coupled to the or-gate 70. The output of the or-gate is coupled to the demodulator. However, as explained, since it is not desirable to stop the demodulator under normal circumstances, and since the demodulator has been designed to be slower in operation than the modulator, the contention control circuit will not generate an output on the terminal 111 other than a start demodulate signal.

The hold and initialize terminals of the contention control circuit are provided by system control 54 of FIG. 5.

Other modes of operation are possible with the system of the present invention by pressing suitable combinations of keys on the keyboard 13 on the console unit. For instance, if the print-out key and the receive key are depressed, the system will receive data over the telephone lines into the demodulator 104 and feed the information through memory which in turn is accessed by the printer control 87. In this way, received data may be printed directly on a paper tape. In such a case, similar to the previous case of receiving data, the printer control must be faster in response than the incoming data, since the incoming data is normally not controllable without utilization of the start demodulator output and without a suitable feedback from the system to the source of the data at the other end of the telephone line.

It should be noted that such two way control is possible with the appropriate interface equipment, and in fact the data being transmitted from a remote source can be stopped and started if the circumstances justify such a system operation.

Other devices may be similarly operated to provide different modes of operation such as for instance punch-tape machines. Such other devices are illustrated generally by a block 112 identified as a remote device control. The output of the remote device control is then coupled to the remote device through a series of control lines indicated generally by the reference numeral 113. In this case the remote device has its own address counter and a multiplexer similar to the printer and demodulator devices previously illustrated. Also, a contention control circuit may be provided such as the circuit 114 to control the operation of the remote device in conjunction with the accessing of memory by way of the demodulator.

Figure 6:
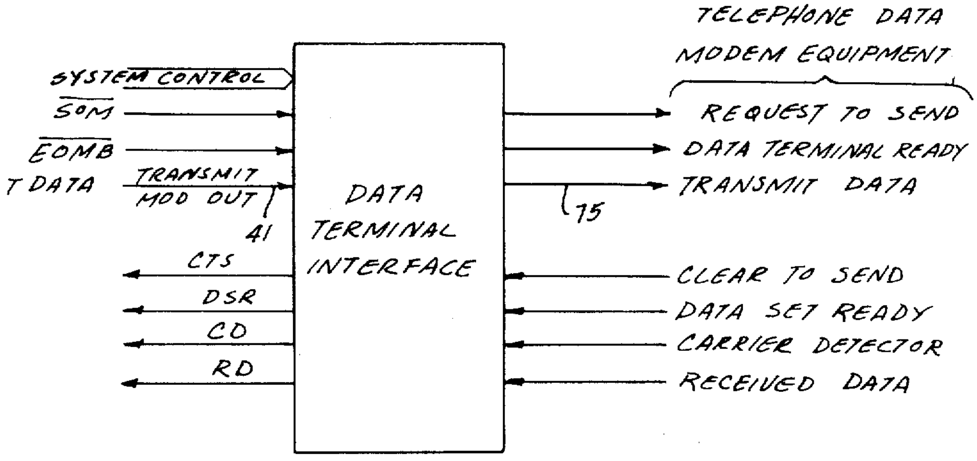
FIG. 6 is a further portion of the block diagram illustrated in FIGS. 3, 4 and 5.

Referring to FIG. 6, the data terminal interface has a series of inputs identified as clear to send, data set ready, carrier detector, and receive data. These signals are coupled at the output terminal CTS, DSR, CD, and RD. These signals are coupled to the demodulator at the interface control signal path identified by the reference numeral 115 in FIG. 4, and to the system control in FIG. 5.

Figure 8:
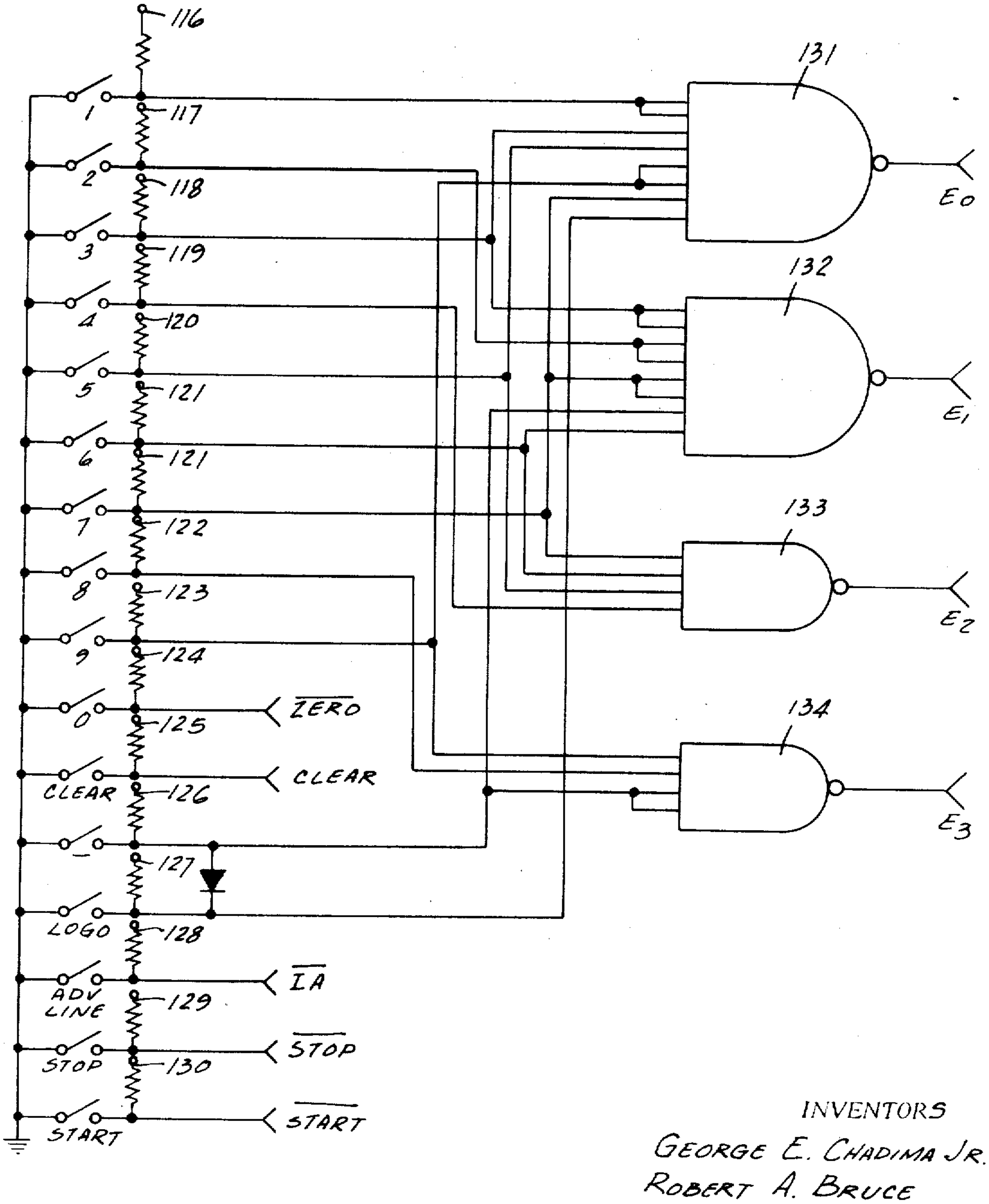
FIG. 8 is a schematic of the data coder shown in block form in FIG. 3.
Figures 9, 10:
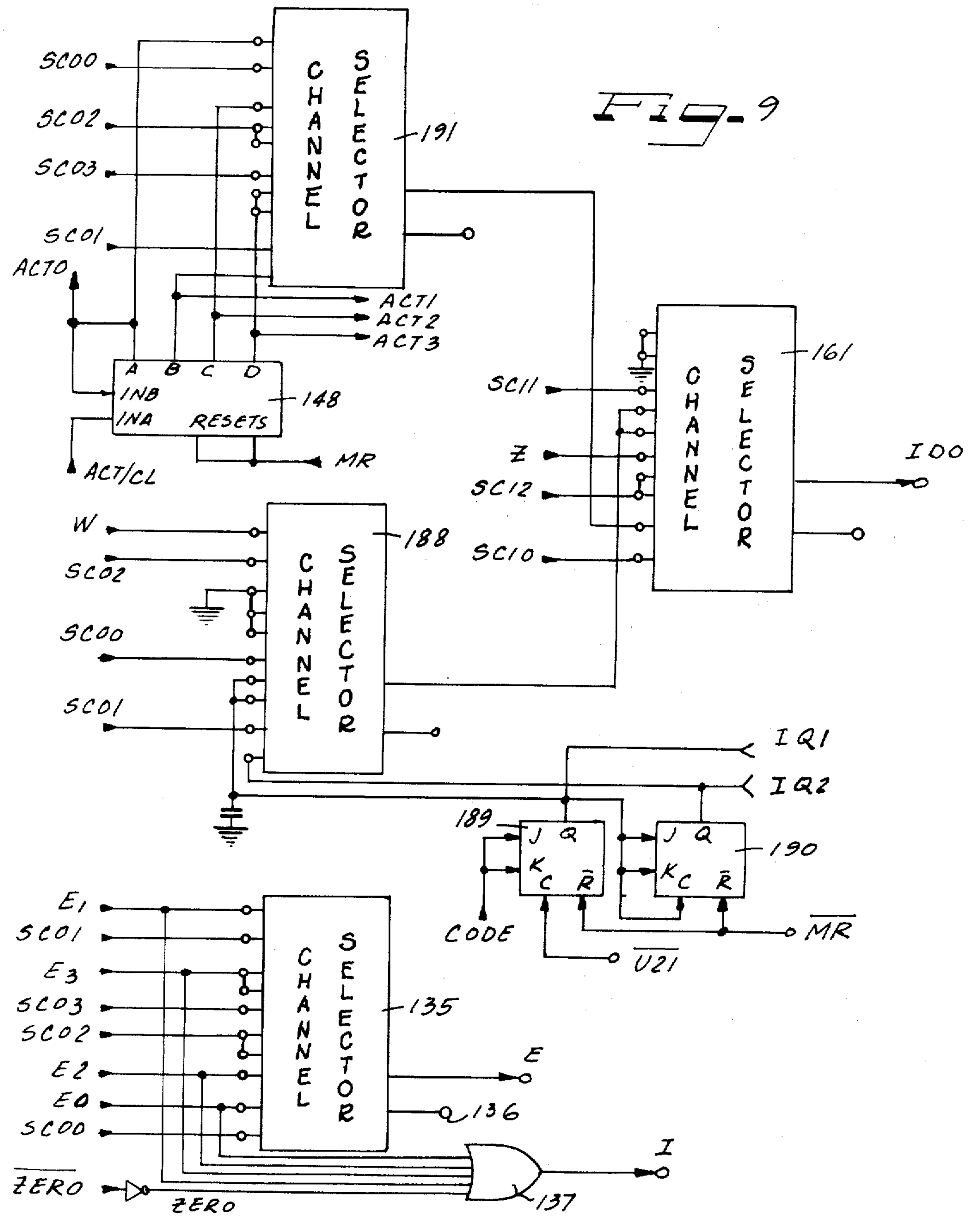
FIG. 9 is a schematic of a portion of the multiplexer associated with the data and coder and control of FIG. 3.
FIG. 10 is a further portion of the multiplexer illustrated in FIG. 9.

Referring to the circuit features of the block diagrams in greater detail, FIGS. 8, 9 and 10 show the schematic of the data encoder 17 and the keyboard switching arrangement associated therewith. In FIG. 8 a positive voltage is applied to a terminal 116 through 130, thereby applying a logic one signal to the inputs of a series of nand-gates 131 through 134. Each of the gates 131 through 134 have outputs designated as $E_0$, $E_1$, $E_2$, and $E_3$, all of which have a logic zero output in the quiescent condition. Each of the keys on the keyboard 16 (FIG. 3) are illustrated by a series of switches which are numbered in FIG. 8 corresponding to the numbers on the keyboard. When any one of the keys is depressed involving the numbers from one to nine, a corresponding code is generated at the output of the nand-circuits 131 through 134 as determined by the combinational input logic shown in FIG. 8.

It is not necessary to code the zero key output since the outputs of the nand-gates are normally in the zero logic condition.

The clear, the advance-line, the stop and the start switches are also functional switches which are coupled to circuit points at various portions in the remaining figures of the drawings. All such portions are identified by the designations CLEAR, IA, STOP, and START.

A minus symbol is also coded through the nand-circuits 131 through 134 as well as a local output.

The outputs of the nand-gates 131 through 134 of FIG. 8 are coupled to similarly identified inputs of a channel selector 135 in FIG. 10. The outputs $E_0$ through $E_3$ are coupled to the indicator terminals together with timing generator signals from the timing generator 23 (FIG. 3). The purpose of the channel selector is to serialize the coded information into a pulse train at the output E.

The channel selector also has an output 136 which is not utilized in the present circuit. This is true of all of the channel selectors shown throughout the schematics of the drawings in the present application.

Each one of the inputs $E_0$ through $E_3$ are coupled to an or-gate 137. Also, the zero key shown in FIG. 8 is coupled to the or-gate 137 at the input terminal identified by the term ZERO. The or-gate indicates the presence of a coded key being depressed.

Figure 27:
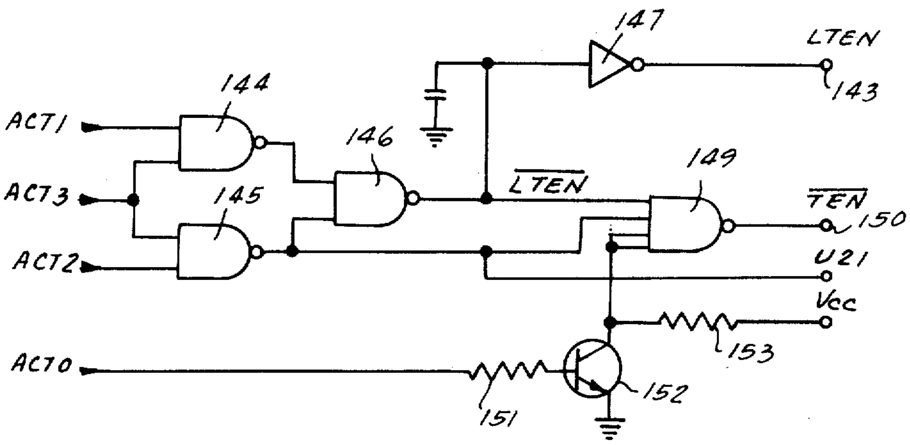
FIGS. 27 through 33 are schematics of logic circuitry associated with the data and coder control system as illustrated in block form in FIG. 3.
Figure 30:
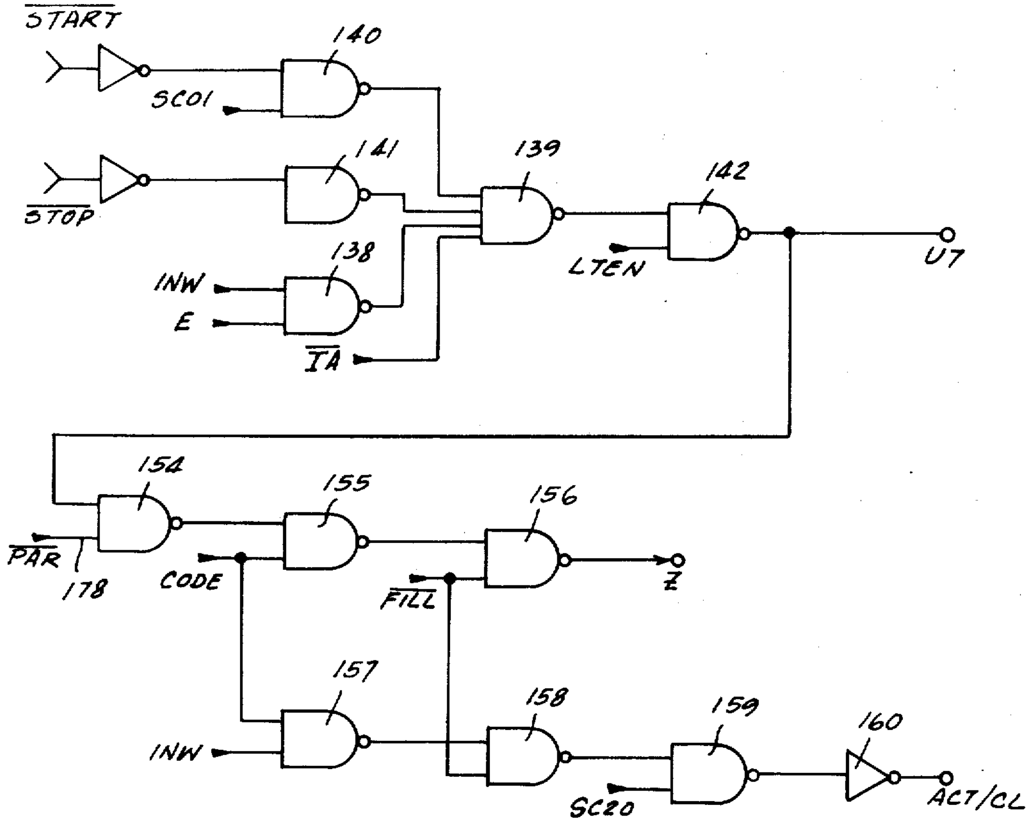

The output E of the channel selector 135 is coupled to an input identified also as E in FIG. 30. The signal at the input E in FIG. 30 is coupled through the logic circuit shown and develops an output signal Z also shown in FIG. 30. In particular, the output E is coupled to a nand-gate 138 which has an output coupled to a further nand gate 139. Nand-gates 140 and 141 are coupled from STOP and START functional keys shown in FIG. 8. Also, the gate 139 has an input $\overline{IA}$ which is coupled from the similarly identified output of the advance line switch of FIG. 8. The output of the gate 139 is coupled to a further gate 142 which has an additional input LTEN which is a signal generated at an output 143 shown in FIG. 27. The signal generated at the terminal 143 is developed by the circuit shown in FIG. 27 consisting of nand-gates 144 through 146 and an inverter 147 connected as shown. The signal developed at the terminal 143 is developed when the count of the address counter 148 of FIG. 9 is less than 10. The inputs to the logic circuitry 144 through 146, namely the inputs ACT1, ACT2, and ACT3 are developed at the outputs of the address counter 148 which is a four-bit commercially-available binary counter.

Referring further to FIG. 7, a nand-gate 149 has an output developed at a circuit point 150 which is a logic one when the count of the address counter 148 does not equal 10.

One of the outputs of the address counter 148 of FIG. 9, namely ACT0 is coupled to a resistor 151 which in turn is coupled to a switching transistor 152. The transistor 152 has its collector powered from a voltage source VCC through a further resistor 153.

Referring to the circuit of FIG. 30, the LTEN signal is coupled to the nand-gate 142 developing an output U7. The output U7 is then coupled to the input of further logic circuit consisting of nand-gates 154 through 159 and an inverter 160. The nand-gate 156 develops an output Z which is coupled to the input of a channel selector 161 shown in FIG. 9. Also, the inverter 160 develops an output ACT/CL which is coupled to a similarly identified input of the address counter 148 of FIG. 9.

Figure 33:
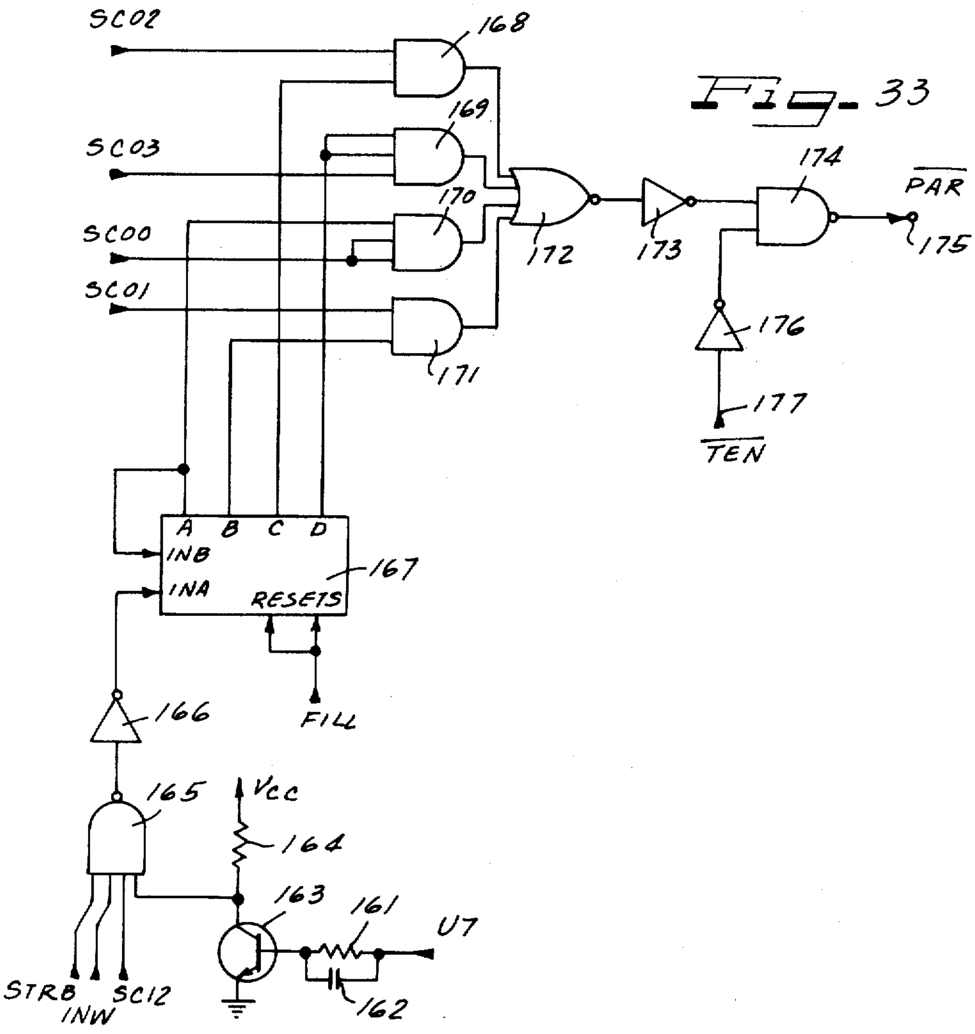

The signal U7 at the output of the nand-gate 142 is coupled to a circuit point U7 in FIG. 33. The signal is coupled to a combination of a resistor 161 and a capacitor 162 to a transistor switch 163. The power supply of VCC is coupled through a resistor 164 to the collector of the transistor 163. The collector of the transistor 163 is coupled to a nand gate 165 and an inverter 166 to an input INA of a four bit binary counter 167. The counter 167 is similar to the commercially-available counter 148.

The counter 167 has an input INB which is coupled from an output A. The counter 167 also has outputs B, C, and D which are coupled to a series of and-gates 168 through 171. The and-gates 168 through 171 have a series of inputs SCO2, SCO3, SCO0, and SCO1 which are coupled from the timing generator 23 of FIG. 3. The output of each of the and-gates is coupled to a nor-gate 172 and to an inverter 173. The output of the inverter is coupled to a nand-gate 174 to develop a signal 175 which is identified as a PAR which is the serialized parity check digit output. The nand-gate 174 has one of its inputs coupled through an inverter 176 from a circuit point 177 which is the same as the circuit point 150 shown in FIG. 27. The circuit point 175 of FIG. 33 is then coupled to a circuit point 178 of FIG. 30.

THe purpose of the circuit shown in FIG. 30 is to augment the data information by adding in a parity digit after the tenth digit of a line and adding in blank digits to fill out a 16-digit line.

Figure 28:
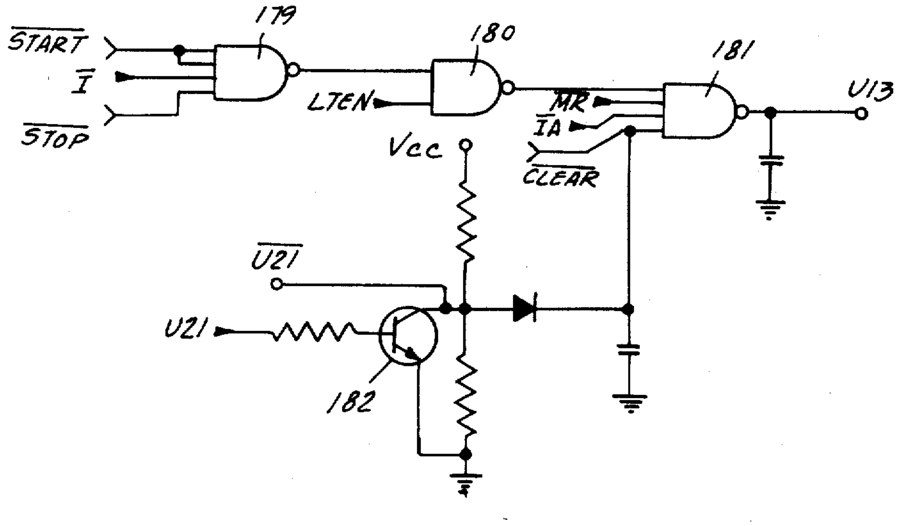
Figure 29:
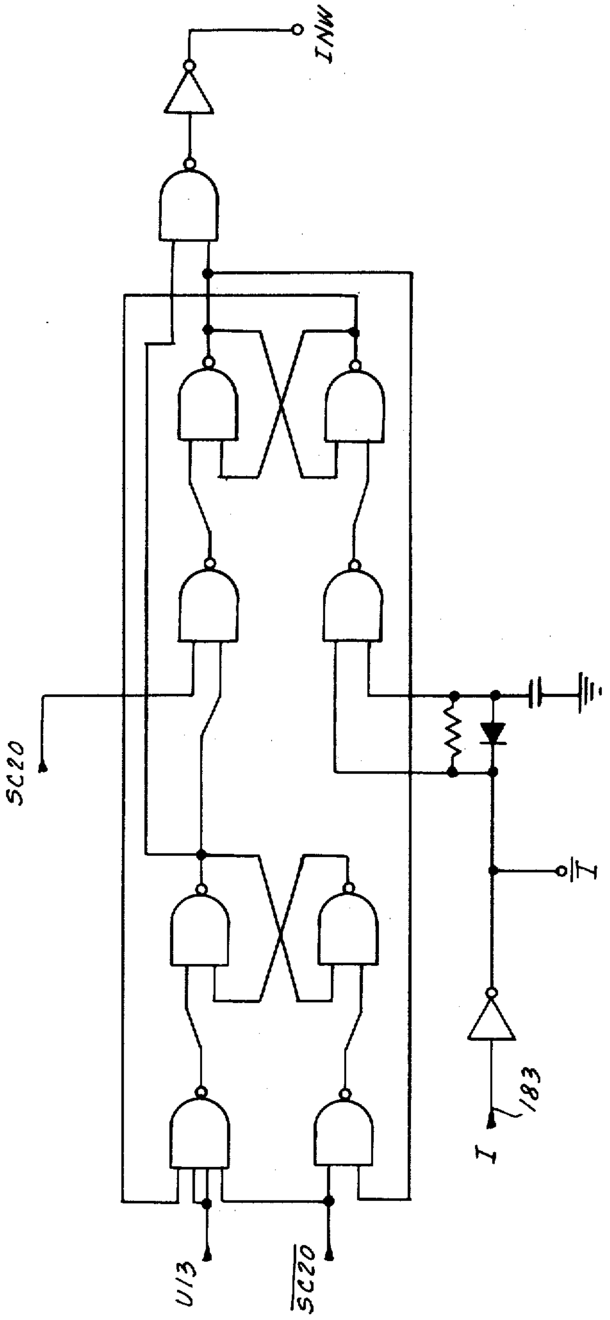
Figure 32:
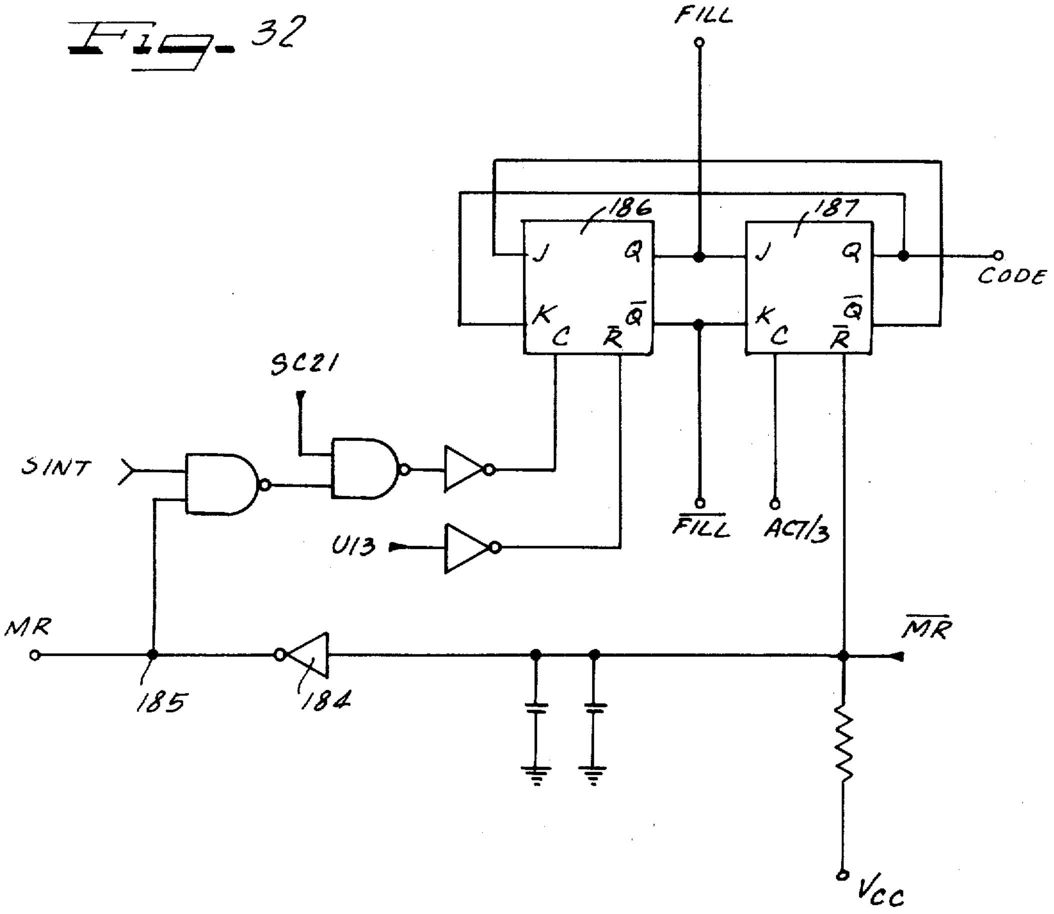

The FILL, CODE, and INW signals shown as inputs in FIG. 30 may be derived from reference to FIGS. 28, 29 and 32.

FIG. 28 has a series of nand-gates 179, 180, and 181 which are coupled from START and STOP and I inputs as shown. The output of the gate 181 is a signal identified as U13. A signal U21 is coupled to a transistor 182 which has its output coupled to one of the inputs of the nand-gate 181. A voltage supply VCC is coupled to the transistor 182 as shown. The nand-gate 181 has two other inputs $\overline{MR}$ and $\overline{IA}$ and is tied to the $\overline{CLEAR}$ input from FIG. 8. The $\overline{IA}$ signal is coupled from the corresponding point in FIG. 8, and the $\overline{MR}$ signal is generated by the circuit of FIG. 32.

Referring to FIG. 29, the $\overline{I}$ signal which is coupled to the input of the gate 179 of FIG. 28 is derived from the I signal at a circuit point 183 in FIG. 29. This circuit point is coupled to the output of the gate 137 of FIG. 10.

The U13 signal developed at the output of the circuit of FIG. 28 is coupled to the input of the circuit of FIG. 29 as shown together with a timing signal $\overline{SC\ 20}$ from the timing generator. Another timing signal SC 20 is coupled to the input of one of the nand-gates shown in FIG. 29. The result is an output INW which is coupled to one of the inputs of the nand-gate 157 shown in FIG. 30.

The signal $\overline{MR}$ which is coupled to the input of the gate 181 of FIG. 28 is derived in the circuit of FIG. 32, as shown. $\overline{MR}$ is coupled through an inverter 184 to a circuit point 185. The circuit of FIG. 32 has an input SINT which is derived from FIG. 51. The SINT and the MR inputs are coupled through a series of gates as shown to a pair of flip-flops 186 and 187. The counter 148 of FIG. 9 generates an output signal identified as ACT3 which is coupled to the input of the flip-flop 187 as shown. The flip-flops 186 and 187 then generate the FILL and CODE signals as shown in FIG. 32. These FILL and CODE signals are then coupled to the corresponding FILL and CODE points identified in FIG. 30.

Figure 31:
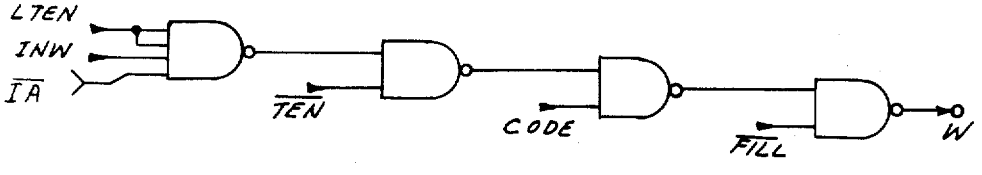

FIG. 31 shows a logic circuit for developing a write (W) signal which is coupled to an input of a channel selector 188 of FIG. 9. Each of the inputs of the logic circuit shown in FIG. 31 have been previously identified.

A pair of flip-flops 189 and 190 in FIG. 9 have code, $\overline{U21}$, and $\overline{MR}$ inputs coupled as shown to develop the IQ1 and IQ2 line address outputs which have been previously discussed in connection with the block diagram of FIG. 3. These IQ1 and IQ2 signals are coupled to suitable inputs of the channel selector 188 as shown.

The channel selector 188 also has a W signal which is generated in FIG. 31.

In FIG. 9, a further channel selector 191 is coupled to the channel selectors 161 and 188. The combination of the selectors 188, 161, and 191 together with the address counter 148 is to multiplex the data and address information to develop an output signal IDO at the output of the channel selector 161 which may then be coupled to the channel selector 22 of FIG. 3 and from the channel selector 22 to the memory 25. The multiplexing is controlled by the timing generator signals SC00, SC01, SC02, SC03, and SC10, SC11, and SC12 which are coupled to the indicated inputs of the respective channel selectors.

Figure 11:
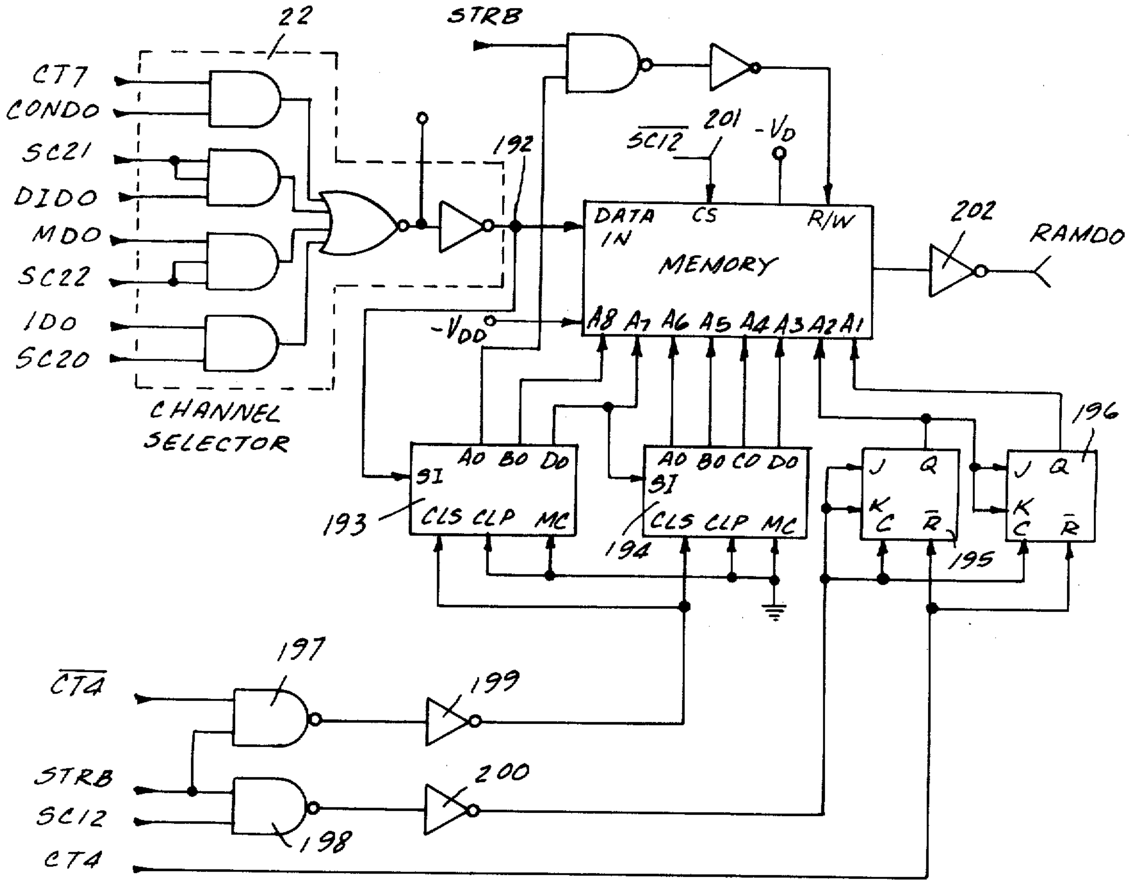
FIG. 11 illustrates the memory circuit shown in FIG. 3 and the associated channel selector also shown in FIG. 3.

Channel selector 22 of FIG. 3 is shown in dotted lines in FIG. 11 and consists of a series of and-gates coupled to the input of a nor-gate and finally to an inverter at an output 192. Each of the inputs to the channel selector 22 have been previously identified. The inputs CT7, SC21, SC22, and SC20 are timing signals from the timing generator 23. the input signal CONDO is the output of the channel selector 79 which is coupled through a circuit line 80 of FIG. 4. The input signal DIDO is the display data output as indicated in connection with the multiplexer 37 of FIG. 3. The IDO input to the channel selector 22 is shown at the output of the multiplexer 19, also of FIG. 3. This is the same IDO signal which is shown at the output of the circuit of FIG. 9.

The output of the channel selector 22 is coupled to the input of the memory as shown in FIG. 11. The memory of FIG. 11 has a plurality of inputs A1 through A8 which are coupled from a pair of shift registers 193 and 194 which may, for example, be TEXAS Instruments, shift registers numbers 74L95. Also a pair of flip-flops 195 and 196 are used to supply the inputs A1 and A2 of the memory. The combination of 193 through 196 forms a signal shift register.

A clock and reset control for the shift registers 193 through 196 take the form of a pair of nand-gates 197 and 198 which are coupled to respective inverters 199 and 200. The input signals to the gates 197 and 198 as identified are derived from the timing generator 23. The memory also has an input 201 coupled from the timing generator 23. The memory also has a power supply $-V_D$, and a $-V_{DD}$ which are derived from the power supply control circuit of FIG. 12. The memory shown in FIG. 11 is a 256-bit random-access memory which is commercially available such as an INTEL 1101. The output of the memory is coupled through an inverter 202 to an output identified as RAMDO. The RAMDO output is the output which appears on the circuit line 38 of FIG. 3.

Figure 12:
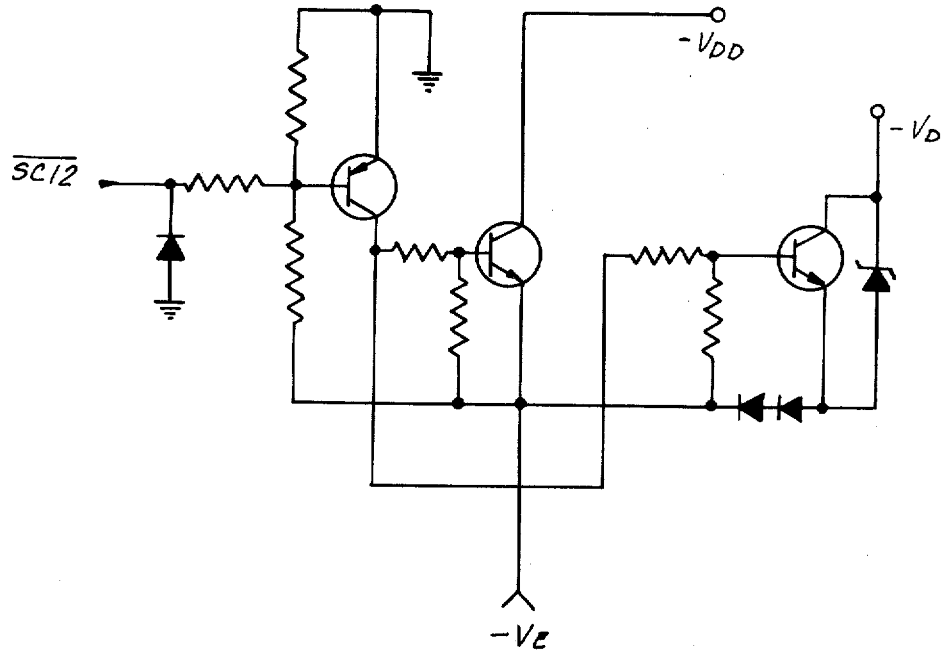
FIG. 12 is a power control circuit for supplying power to the memory illustrated in FIG. 11.

FIG. 12 as mentioned above is a power control circuit which has an input −VE coupled from one of the power supplies of the system and which develops a $-V_D$ and a $-V_{DD}$ output. The power supply control circuit is controlled by a timing generator signal $\overline{SC12}$ which is coupled to the input thereof. Each of the transistors shown in FIG. 12 are standard switching transistors. The purpose of the circuit of FIG. 12 is to reduce the power consumption used by memory. This is accomplished by turning the memory on only when it is needed in accordance with the timing information of the timing input $\overline{SC12}$.

Figure 13:
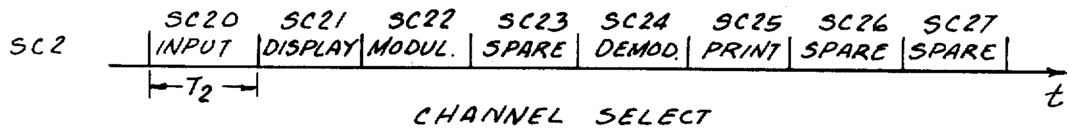
FIG. 13 is a timing diagram of the various multiplexer inputs and timing generator outputs shown in FIGS. 3, 4 and 5.

FIGS. 13, 14, 15 and 16 illustrate the time slots available in the system in accordance with the timing operation of the timing generators. FIG. 13 shows the channel selector time increments such as SC20, SC21, and SC22.

Figure 14:
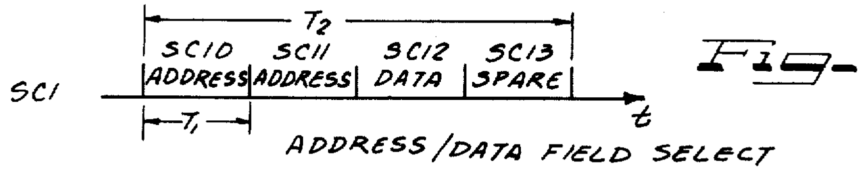
FIG. 14 is an expanded timing diagram of a portion of FIG. 13.

FIG. 14 is an expanded time scale showing time slots within one of the increments shown in FIG. 13. In FIG. 14, the SC20 time slot referred to as $T_2$ has been expanded to show the SC10, SC11, SC12, and SC13 time slots associated with the addressing and data flow function of the system.

Figure 15:
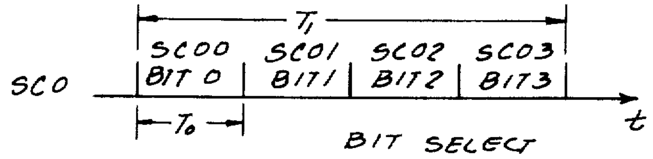
FIG. 15 is a further expanded timing diagram of a portion of FIG. 14.

FIG. 15 is a further expansion of the time scale of FIG. 14 and illustrates the SC00, SC01, SC02, and SC03 signals which are the bit selection time slots. These four signals occur during the time interval of SC10 which is also identified as $T_1$.

Figure 16:
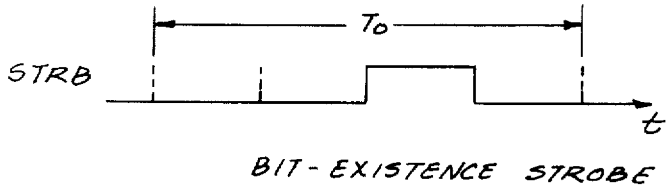
FIG. 16 is a further expanded timing diagram of a portion of FIG. 15.

FIG. 16 shows a STROBE signal (STRB) which is used to clock the bit pulses and to separate the bit pulses from each other in the timing sequence. As shown, the STROBE signal appears during a small portion of the bit time slot SC00, also referred to as $T_0$.

Figure 19:
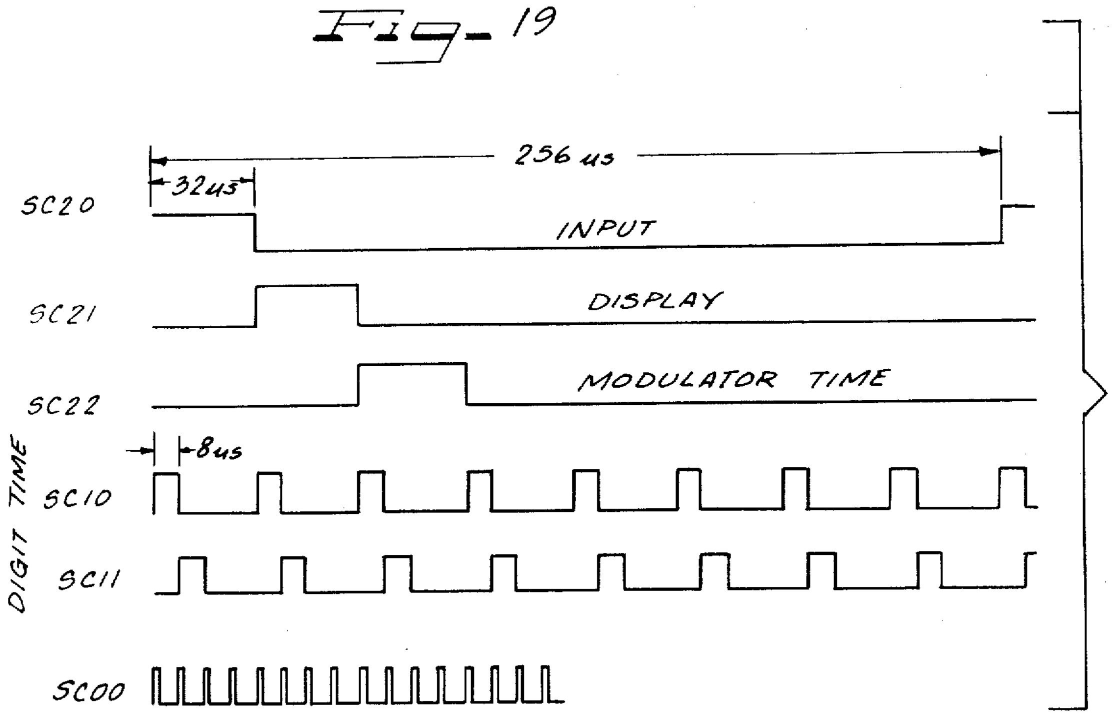
FIG. 19 is a diagrammatic illustration of waveform outputs from the timing generator shown in the block diagrams of FIGS. 3 and 4.

FIG. 19 shows the actual waveforms which occur at the output of the timing generator during the time slots illustrated in FIGS. 13 through 16. As shown, the SC20, SC21, and SC22 signals, for example, are sequentially staggered to produce the time slots shown in FIG. 13. Similarly the SC10 and SC11 pulses are staggered to produce the time intervals shown in FIG. 14. It is also noted that the SC10 and SC11 pulses have a pulse duration which is approximately 1/4 of the pulse duration of the SC20 and SC21 signals in accordance with the timing diagrams of FIGS. 13 and 14. The SC00 signals are also shown in FIG. 19, with each having a pulse duration which is approximately one-quarter of the pulse duration of the pulse duration of the SC10 signal.

Figure 20:
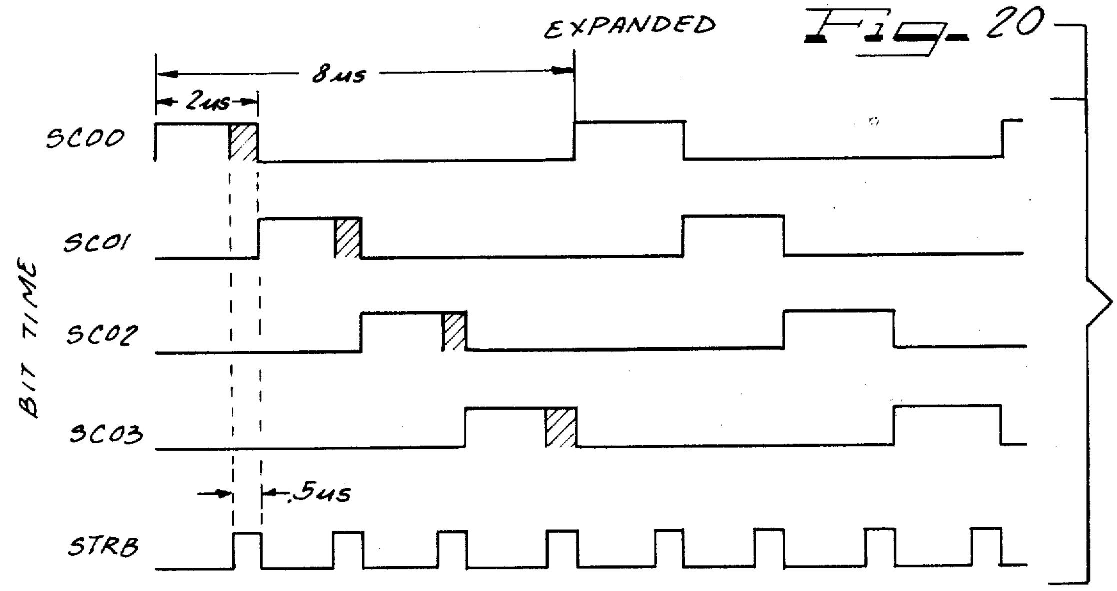
FIG. 20 is an expanded timing time scale illustration of some of the waveforms shown in FIG. 19, and also illustrating some additional waveforms from the timing generator.

FIG. 20 shows the SC00 signals expanded in a larger time scale to illustrate the staggering of the signals and also to show the functioning of the STROBE signals in clocking and separating the pulses. By using the STROBE signal, each of the pulses SC00, SC01, SC02, and SC03 can be identified. Otherwise, the pulses would run together and the clocking function would be negated. The STROBE signal must have a pulse duration which is less than the pulse duration of the bit pulses, such as SC00.

Figure 22:
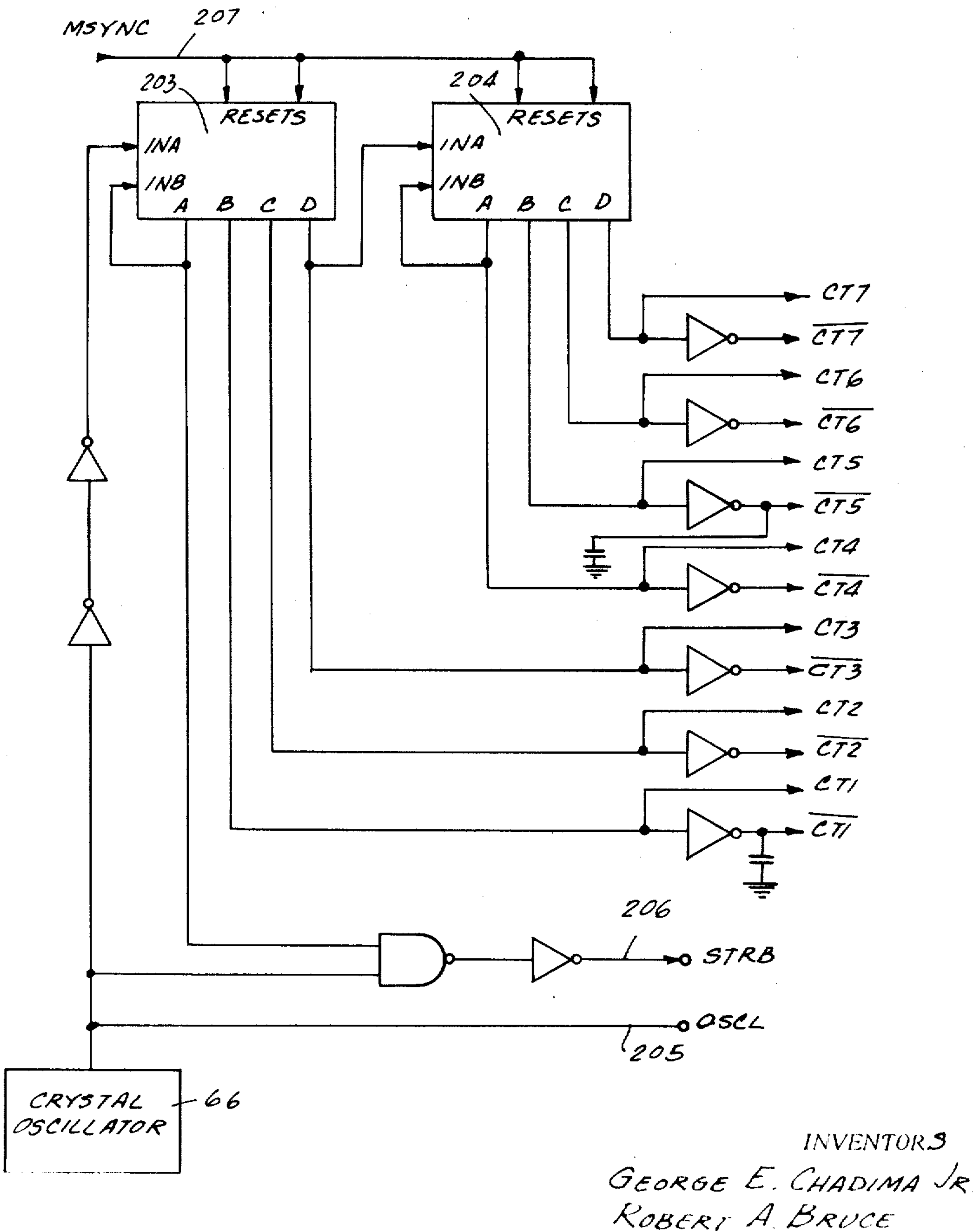
FIG. 22 is a schematic of a portion of the timing generator associated with the key board display unit shown in FIG. 3.

FIGS. 22, 23, 24, and 25 illustrate the schematic for the timing generator 23 shown in FIG. 3. FIG. 22 shows a pair of four-bit binary counters 203 and 204 connected in a series to form an eight-bit counter. The crystal oscillator 66, also shown in FIG. 3, supplies the high frequency input to the counters 203 and 204. The counter outputs are brought out through a series of lines at terminals A, B, C, D of each one of the counters and inverted at $\overline{CT}$ outputs and not inverted at CT outputs. Also, the oscillator signal is shown coupled to an output 205 and the STRB signal is coupled to an output 206. The counters 203 and 204 have an M SYNC signal coupled at a circuit line 207 to the recess terminals of each of the counters. The M SYNC allows remote control between the timing generator 23 of FIG. 3 and the console timing generator 67 of FIG. 4.

Figure 23:
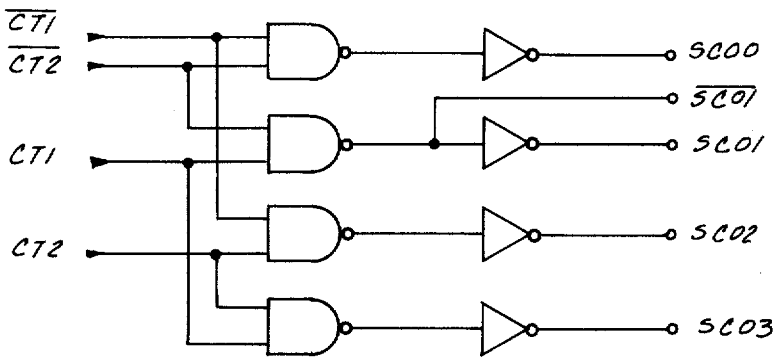
FIG. 23 is a schematic of a further portion of the timing generator of FIG. 3.
Figure 24:
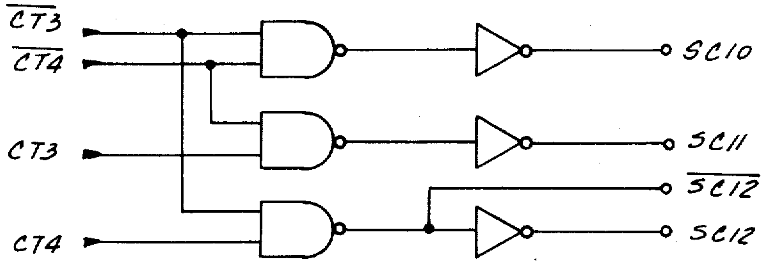
FIG. 24 is another portion of the timing generator of FIG. 3.
Figure 25:
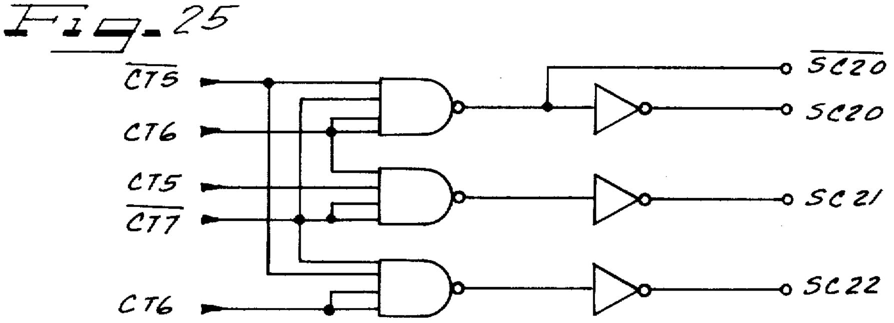
FIG. 25 is another portion of the timing generator illustrated in FIGS. 22, 23 and 24.

The CT and $\overline{CT}$ outputs of FIG. 22 are coupled to combinational logic circuitry shown in FIGS. 23, 24 and 25 as shown to produce the various SC signals at the output thereof. The SC signals generated in this way are the pulses which are shown in FIGS. 19 and 20.

Figure 26:
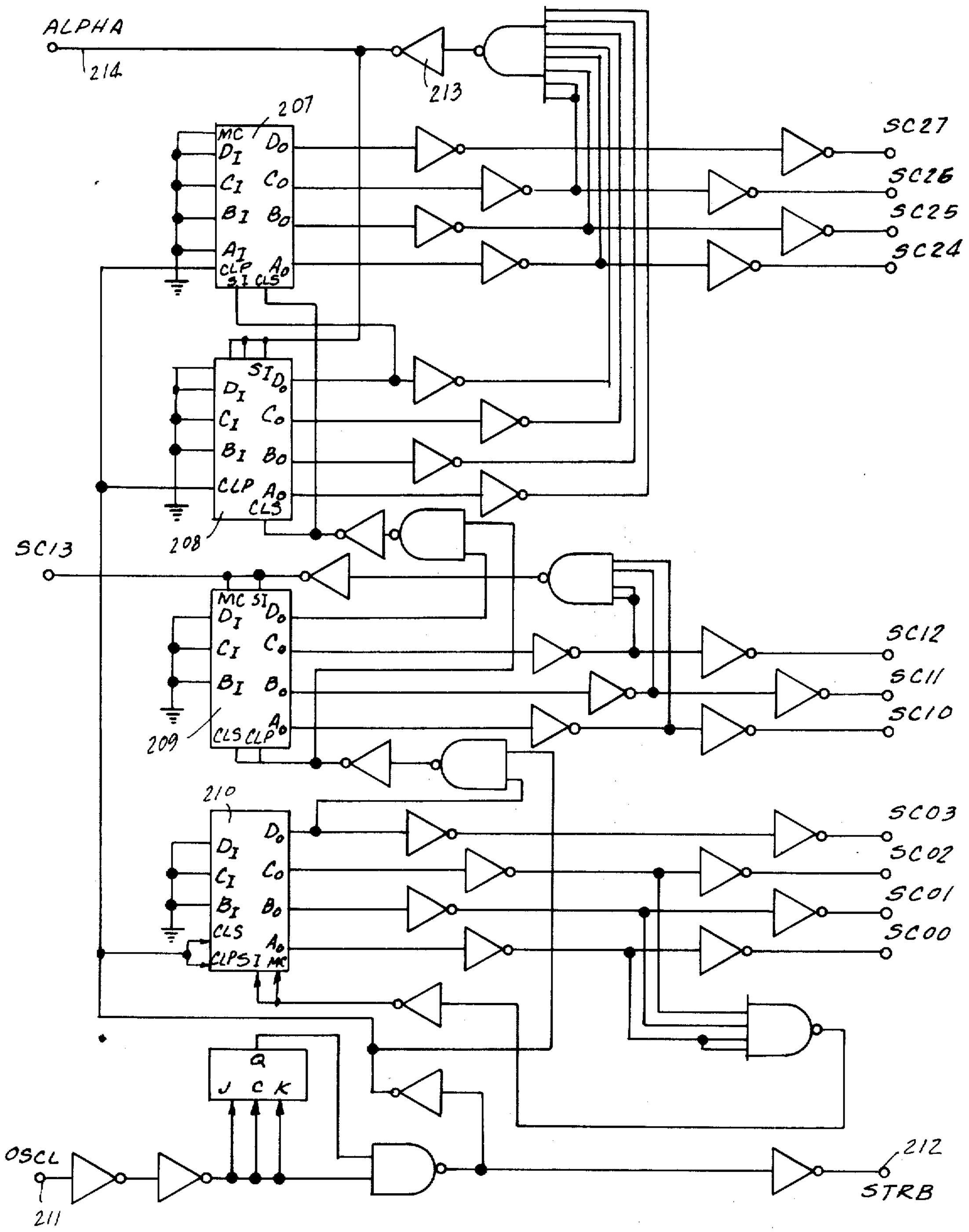
FIG. 26 is a schematic of the timing generator associated with the console unit as illustrated in FIG. 4.

FIG. 26 shows the schematic for the timing generator 67 as shown in FIG. 4. This is the console timing generator. In this case a series of shift register 207, 208, 209 and 210 are used to develop the sequential timing signals. The shift registers used may be TEXAS INSTRUMENT type number 74L95. The outputs of the shift registers are inverted as shown, and a limited number of combinational logic circuit elements are used to develop the SC signals which are shown at the output to the right in FIG. 26. The oscillator is shown at the input at terminal 211 and the STRB is shown at an output 212. An ALPHA signal is developed at the output of an inverter 213 at a terminal 214 and is coupled to an input 215 of a nand-gate 216 shown in FIG. 80. The gate 216 also has SC02 and SC13 signals coupled thereto. These signals are then coupled to a series of flip-flops 217, 218 and 219. The circuit has a power source VCC at a terminal 220 and an input SC27 at the J terminal of the flip-flop 218. The STRB signals are coupled to the C terminal of the flip-flop 217 and the M SYNC signal is developed at a terminal 221. The M SYNC signal is then coupled to the timing generator 23 as explained.

Figure 80:
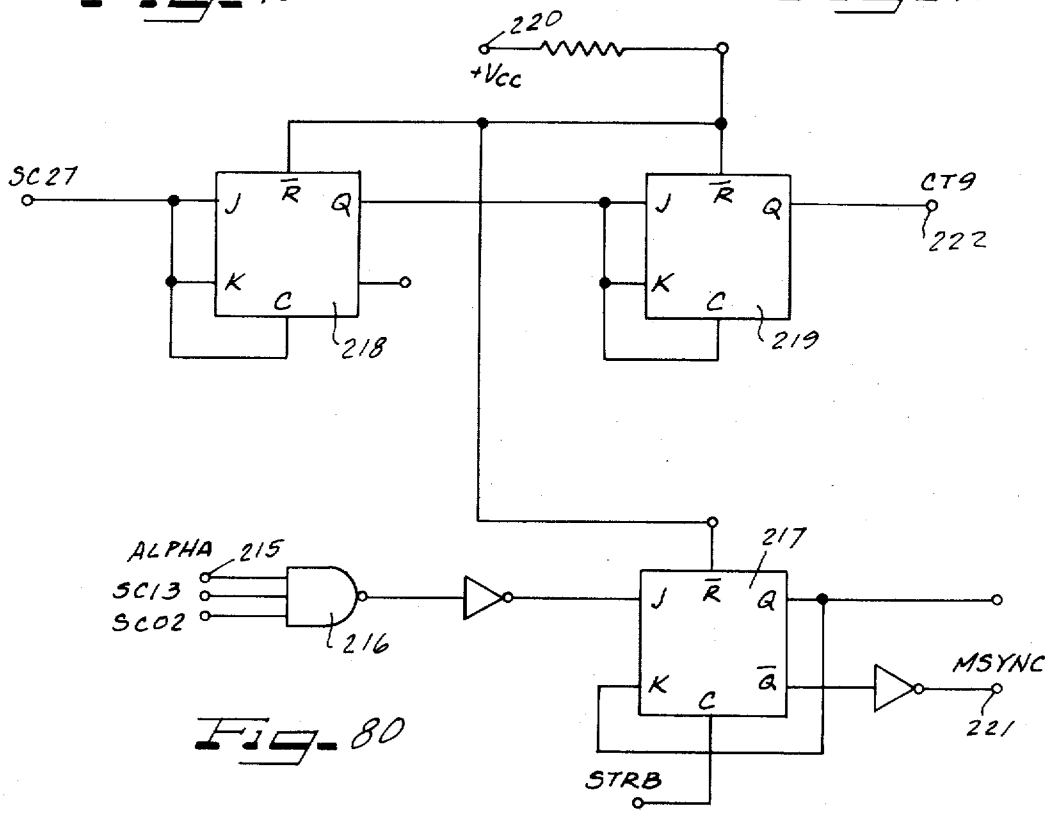
FIG. 80 is a portion of a multiplexer circuit incorporated within the timing generator shown in FIG. 4.

The circuit of FIG. 80 also forms a CT9 signal at a terminal 222 which is used as another timing signal. The timing signal CT9 may be used in conjunction with a timing operation of another device such as is illustrated by the block 112 in FIG. 4.

A start-inhibit circuit was discussed in connection with the operation of the block diagram of FIG. 3. This circuit essentially delays the display through the display-inhibit circuitry shown in FIGS. 34 and 35. The display is delayed until such time as the tape is permitted to move several inches to clear the tape lead.

When the start key 57 on the keyboard 16 of FIG. 3 is depressed, a momentary logic-zero is applied to a terminal 58 of a nand-gate 223. This results in an output logic-one at the terminal 224 which is coupled to a switching transistor 225. The transistor 62 turns on, grounding a circuit point 59, resulting in the start of the tape motor. The circuit point 59 is coupled to the circuit line 59 of FIG. 3.

The nand-gate 223 is cross-coupled with a further nand-gate 226, and a zero logic output is produced by the gate 226 at the same time the one logic output is produced by the gate 223. The zero output of 226 turns on a further transistor 227 which provides a discharge path for a capacitor 228 which has been previously charged to a negative voltage at a point 229 by a voltage source $-V_E$ at a terminal 230. The capacitor discharges through a resistor 231 and the emitter-collector portions of the transistor 227. The emitter of the transistor 227 is coupled to a series of resistors 232, 233, and 234.

When the capacitor 228 is discharged to a suitable positive level, a field effect transistor 235 is turned on, which reduces the voltage level of a circuit point 236. The circuit point 236 was previously at a voltage level determined by the source $V_{CC}$. The dropping in voltage of the circuit point 236 then causes the nand-gate 226 to shift from a logic zero to a logic one by means of the feedback circuit line 237. At the same time the gate 223 switches from a logic one to a logic zero resulting in a raising of the voltage at the circuit line 59 and a stopping of the tape motor.

At the time the start key is initially depressed and a logic one appears at the output of the gate 23 and a logic zero at the output of the gate 226, a circuit line 238 couples the logic zero to an input 239 of a nand-gate 240 which has the effect of inhibiting the display. This results in a logic one at the output of the gate 240 to inhibit display via terminal ID.

After the capacitor 228 is discharged and the gates 223 and 226 have switched condition, a logic one at the output of the gate 226 has the effect of releasing the inhibit signal ID provided that all of the other inputs shown to be coupled to the gate 240 have a logic one. The other inputs are MT, TRX, and NT which are outputs from the system control circuit shown in FIG. 5 and described in further detail in FIGS. 44, 51, and 58. The remaining inputs SC21 and RID have been previously described. SC21 is a timing signal, and the RID signal comes from the recorder at the circuit line 65 in FIG. 3.

Figure 34:
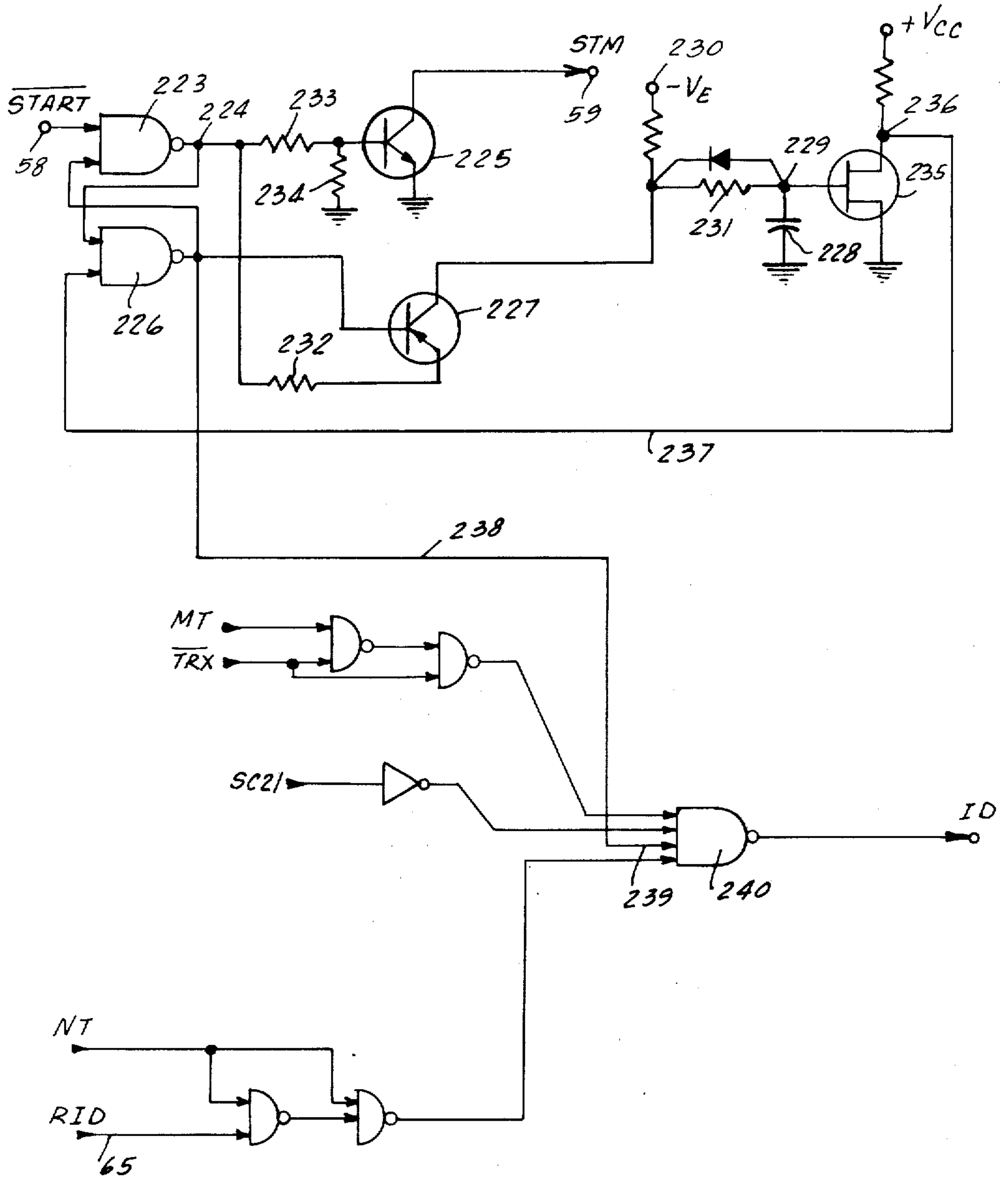
FIG. 34 is a portion of an inhibit circuit to delay the operation of the display or to prevent display prior to initiating designated start conditions.
Figure 35:
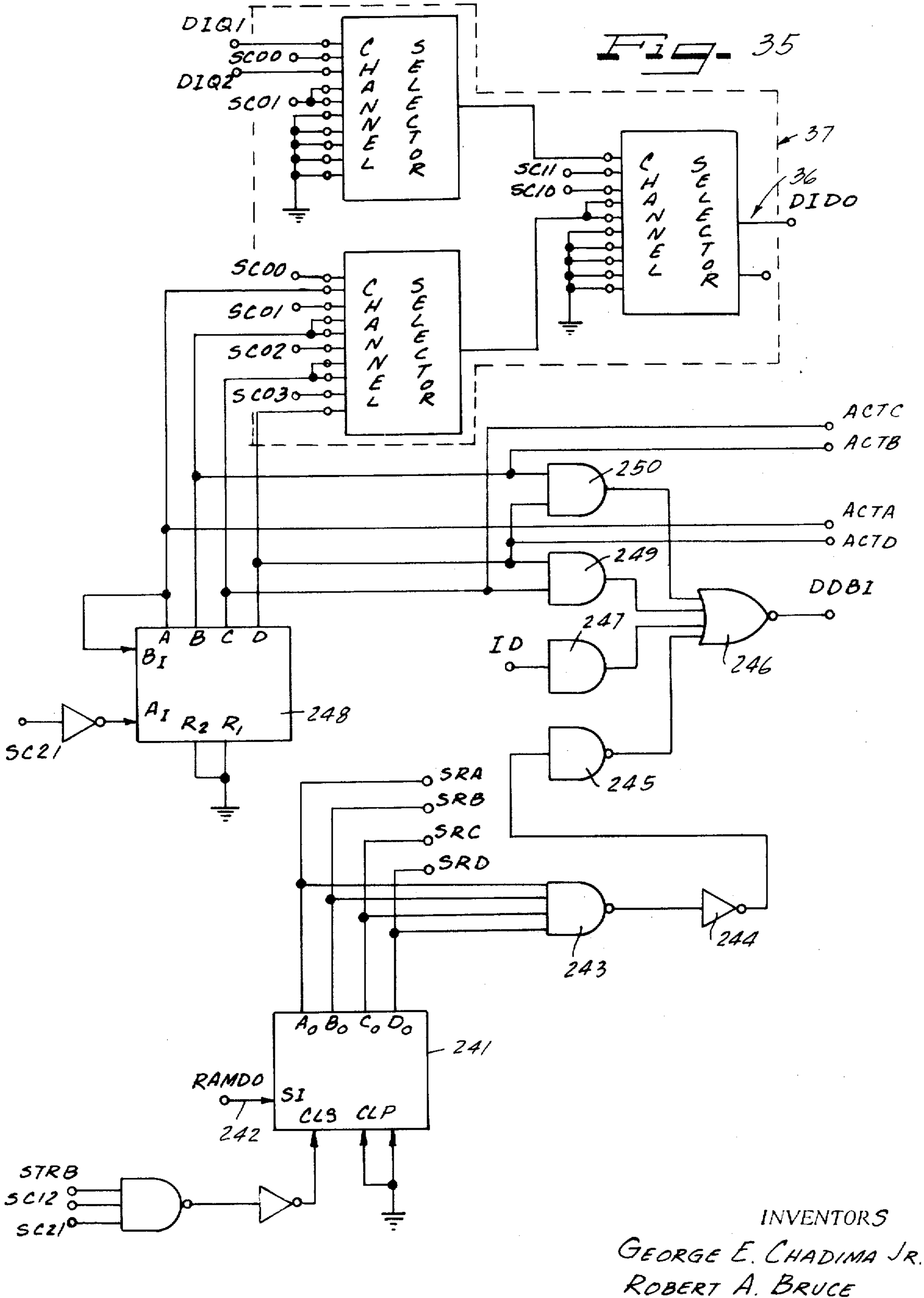
FIG. 35 is a portion of the display decoder and control and multiplexer circuits illustrated in block form in FIG. 3 and also a portion of the inhibit circuit illustrated schematically in FIG. 34.

FIG. 35 shows the multiplexer circuit 37 of FIG. 3 and also a portion of the inhibit circuitry discussed in part in connection with FIG. 34. The multiplexer is indicated by the dash lines in FIG. 35. A fourbit shift-register 241 is used for receiving the data at an input 242 which is coupled to the RAMDO data output of the memory 25 of FIG. 3. Timing signals STRB, SC12 and SC21 are coupled through a nand-gate inverter as shown to one of the inputs of the register 241. This is the same type of register which has previously been described herein. The register 241 produces a series of outputs SRA, SRB, SRC, and SRD. Each of these outputs are also coupled through a nand-gate 243 and an inverter 244 and a further and-gate 245 to an input of a nor-gate 246. The output of the gate 246 is DDBI.

The ID signal generated by the circuit in FIG. 34 is coupled to an input of an and-gate 247.

A display address counter 248 is provided. This is a standard four-bit binary counter having outputs A, B, C, and D which are coupled as shown to the inputs of further and-gates 249 and 250. The timing signal SC21 is coupled to the input of the counter 248. The signal DDBI gives an inhibit signal which is developed whenever any of the outputs of the and-gates 245, 247, 249, and 250 is a logic one. The input to the gate 245 is used to develop an inhibit signal whenever a blank code is developed at the output of the register 241. The gate 247 develops an inhibit signal due to the time delay of the start key as explained in connection with FIG. 34 and other inhibit operations such as trying to enter data on the recorder without the recorder being switched into the record mode. The two gates 49 and 50 are the portions of the circuit which in conjunction with the counter 248 provide blanking signals for addresses ten or greater. This is necessary since there are only 10 indicators and addresses zero through nine are provided for these 10 indicators.

Figures 36, 37:
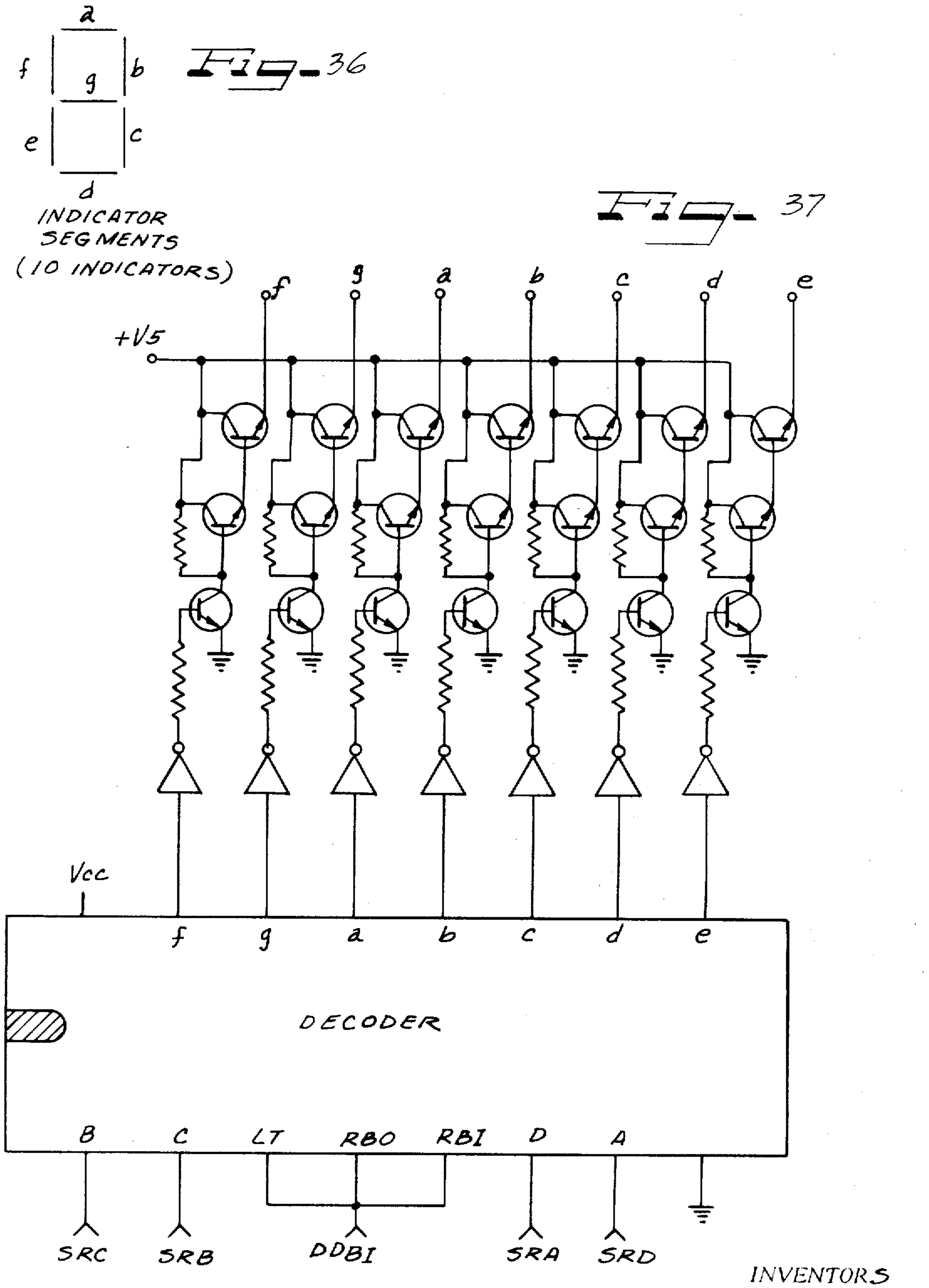
FIG. 36 is one of a series of indicator segments used to present a display of characters in the hand-held unit of the system as shown in FIG. 2.
FIG. 37 is a schematic of a decoder and the driving circuitry to select the segments of the indcators shown in FIG. 36 which are to be illuminated.
Figures 38, 39:
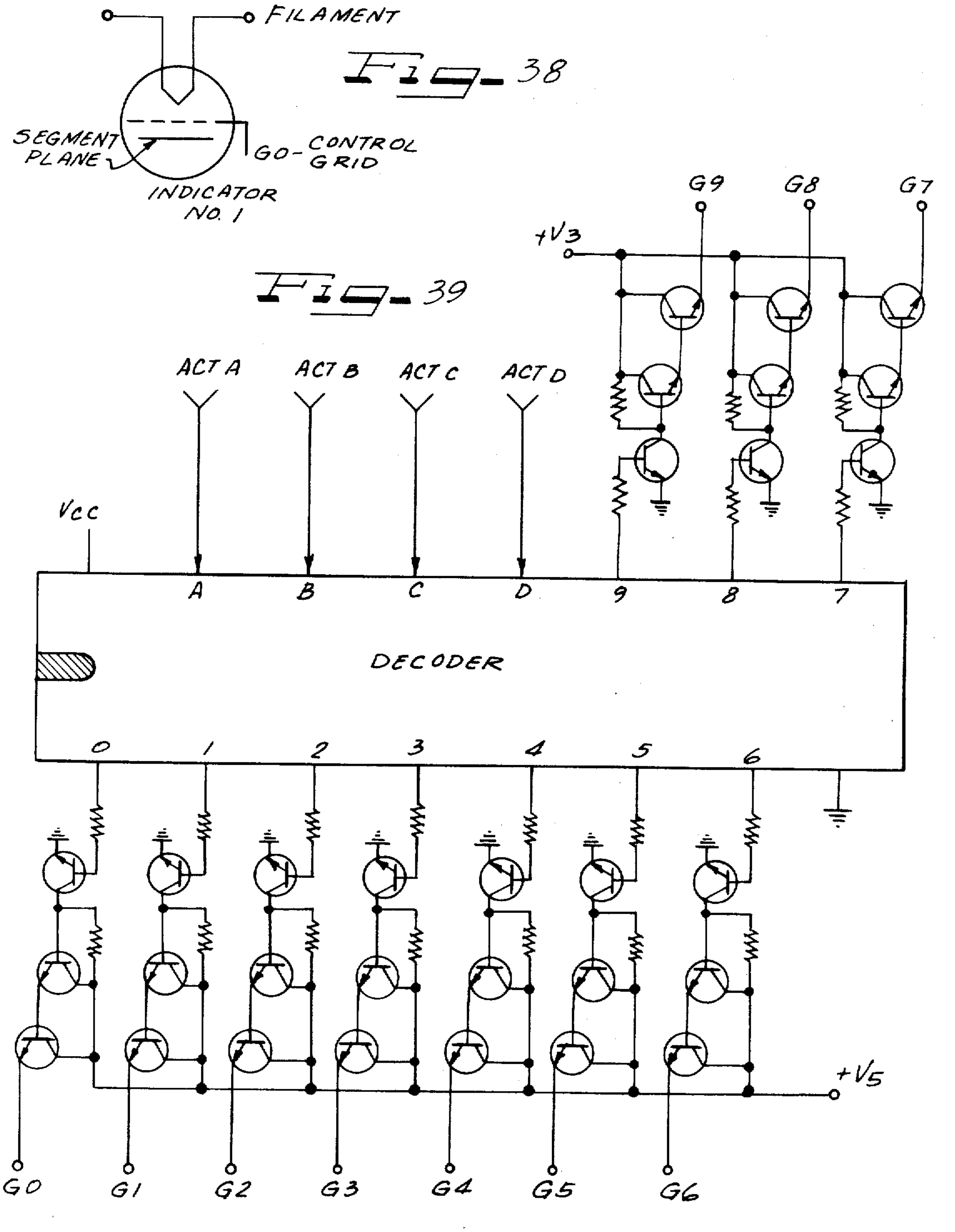
FIG. 38 shows the circuitry portion of the indicators illustrated in FIG. 36.
FIG. 39 is the decoder and driving circuitry associated with the turning on or off of the indicator by means of coupling to the circuitry shown in FIG. 38.

FIG. 38 shows the indicator tubes electrical connections, while FIG. 36 shows the segments of the tubes which are illuminated to form a character.

It is necessary to provide address information to determine which indicator is to be made operative at any point in time, and at the same time it is necessary to provide data information to determine which of the segments of the indicator are to be illuminated to form the required character on the display.

FIG. 39 shows the address decoder and grid drivers to render any one of the ten indicator tubes operative. The decoder is a standard decoder, such as, for instance, TEXAS INSTRUMENTS type number SN7442N. The decoder has a series of inputs ACTA, ACTB, ACTC, and ACTD which are derived from the address counter 248 of FIG. 35 as shown in FIG. 35.

The decoder has a series of outputs 0 to 9 to which are connected ten respective driver circuits for driving the grids G0 through G9 of the indicator tubes to render the tubes operative. The three transistors shown in each driver are arranged to meet the voltage and current requirements to turn the respective tubes on.

At the same time that the address decoder determines which tube is to be turned on, a data decoder shown in FIG. 37 determines which of the sgements *a* through *g* of the indicator tubes (FIG. 36) are to be illuminated. The data decoder of FIG. 37 may be a standard item such as TEXAS INSTRUMENTS type number SN7448N.

The decoder of FIG. 37 has inputs SRA through SRD derived from the data shift register 241 shown in FIG. 35. Also, the DDBI output derived from the gate 246 of FIG. 35 is coupled to the input LT, RBO, and RBI of the decoder shown in FIG. 37. The decoder of FIG. 37 has outputs *a* through *g* which correspond to the segments of the indicator elements of FIG. 36. Suitable drivers such as a serially connected inverter and three transistors are provided to drive the indicated segments of the tubes. In this way the indicator tubes are addressed, and the required character is illuminated.

Figure 17:
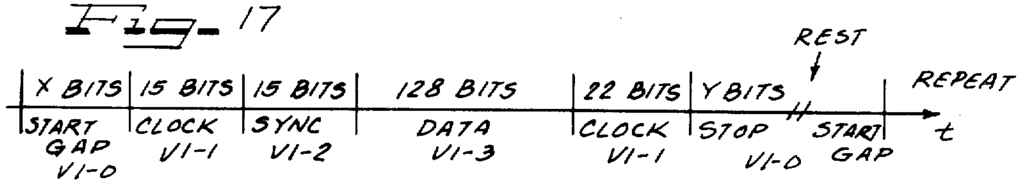
FIG. 17 is a timing diagram illustrating the modulator output.
Figure 18:
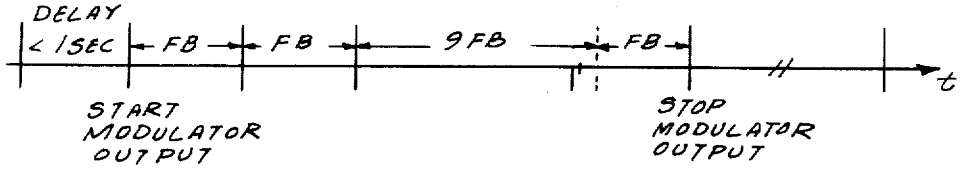
FIG. 18 is a further timing diagram similar to FIG. 17.
Figure 21:
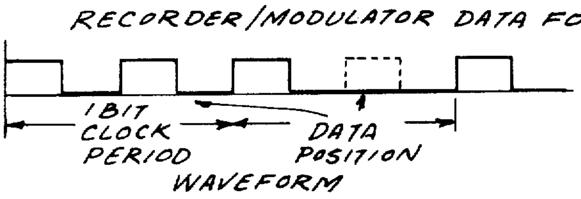
FIG. 21 is a diagrammatic view of the clock and data waveforms from the modulator output.
Figure 40:
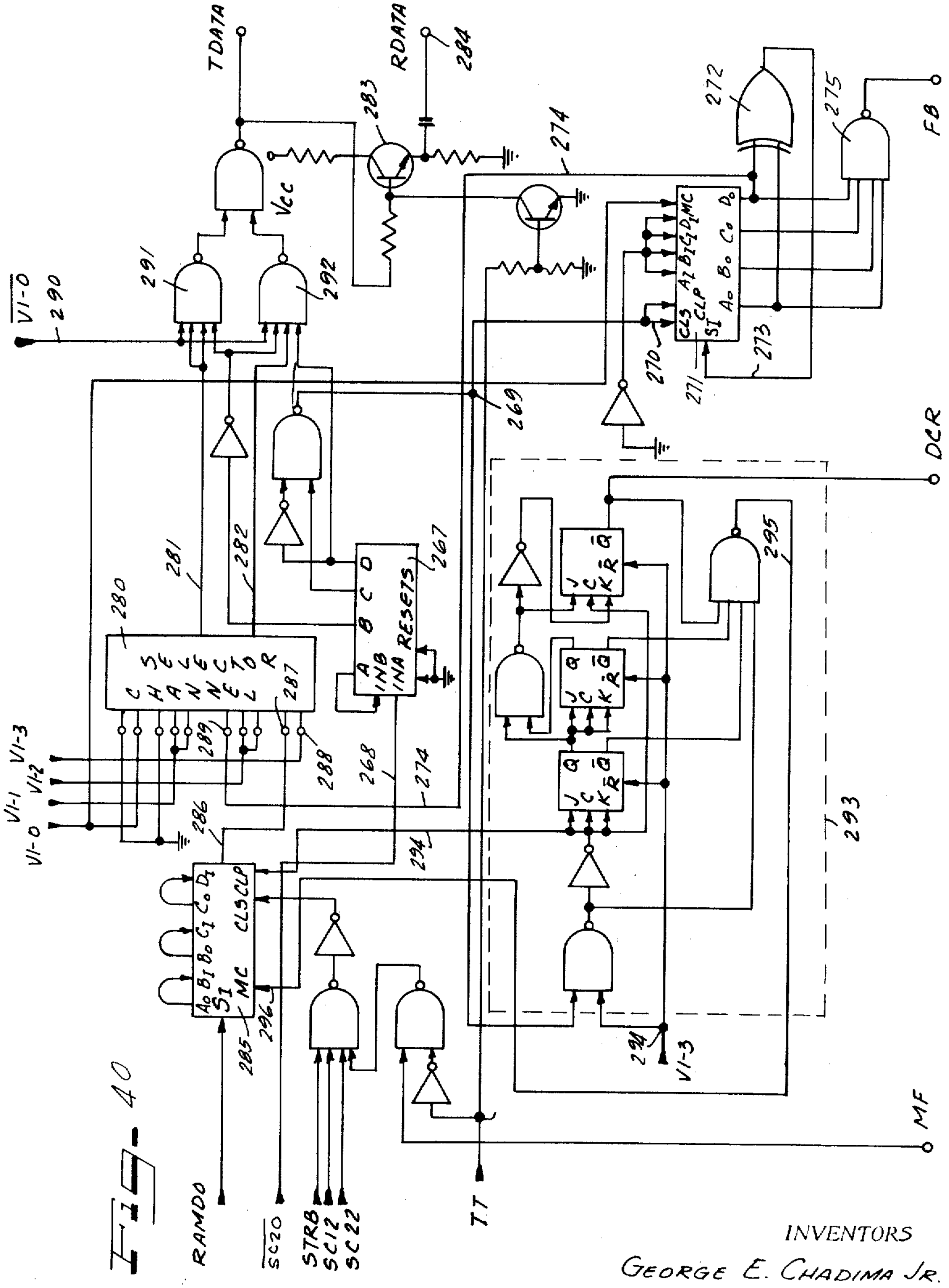
FIG. 40 is a schematic of the modulator data input portion of the modulator and control system illustrated in block form in FIG. 3.
Figure 41:
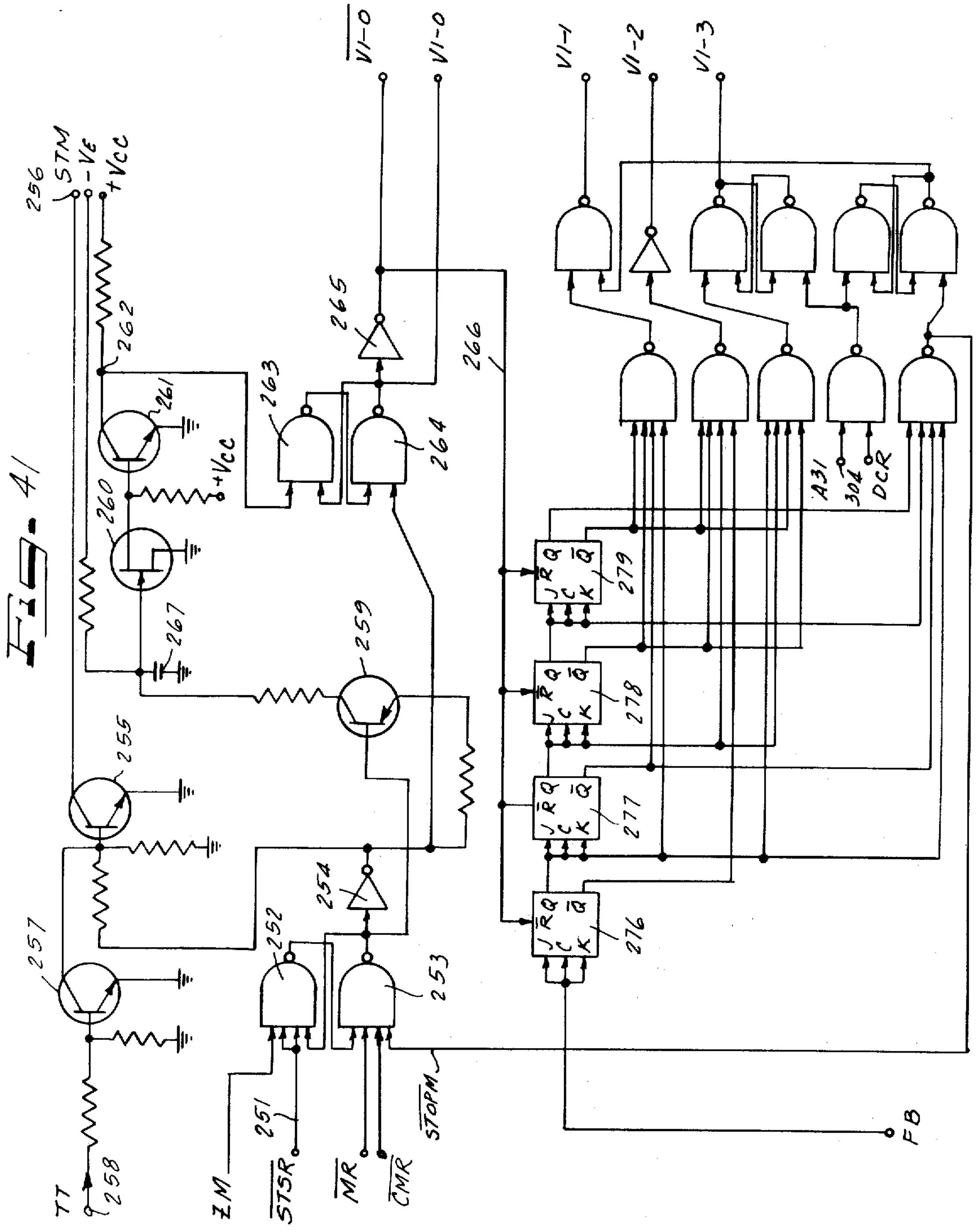
FIG. 41 is a schematic of the data output control of the modulator of FIG. 3.
Figure 42:
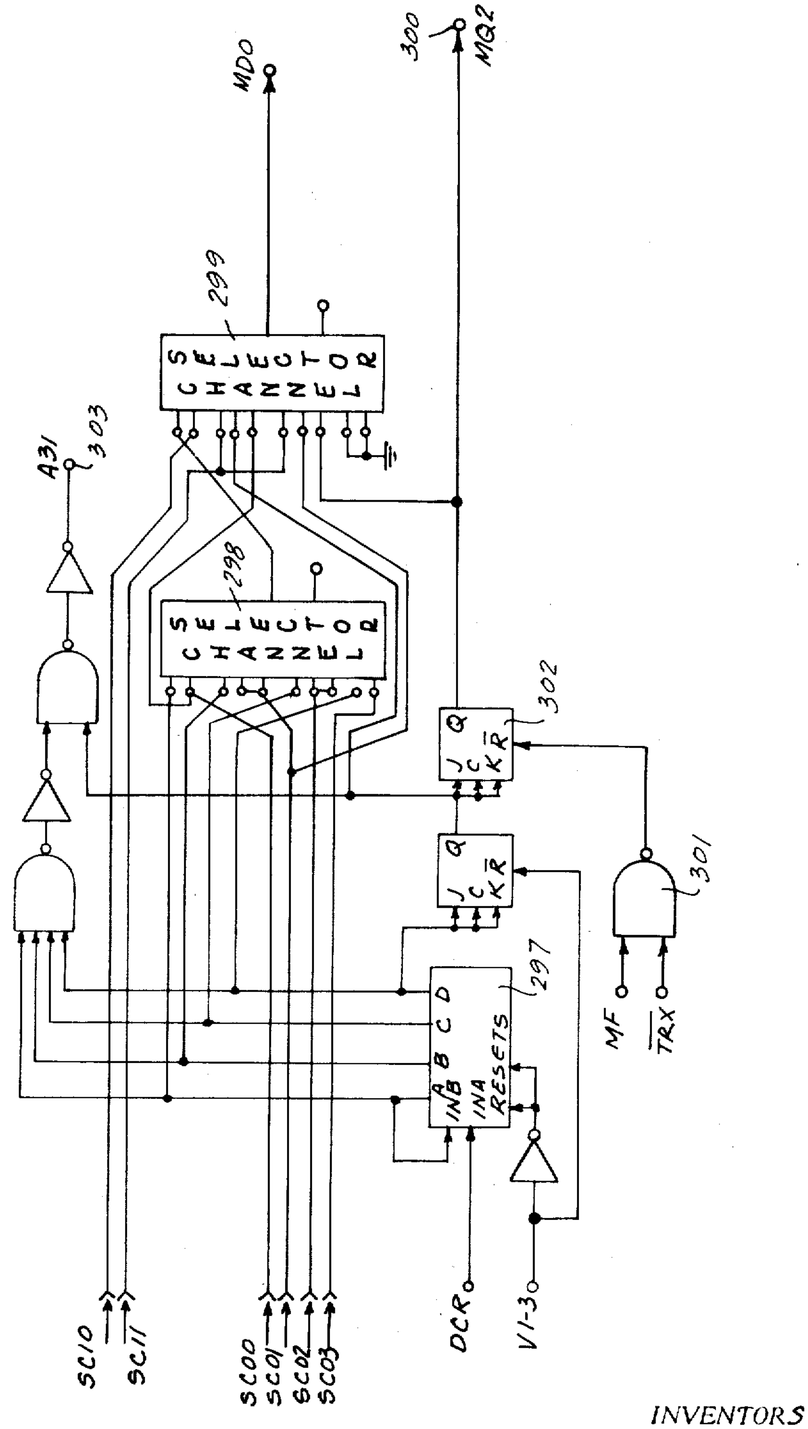
FIG. 42 is the multiplexer associated with the modulator shown in FIG. 3, and also illustrates the address counter associated with the modulator of FIG. 3.

The modulator control, its address counter and the multiplexer shown in block form in FIG. 3 are illustrated schematically in FIGS. 40, 41 and 42 with time slots shown diagrammatically in FIGS. 17 and 18 and actual pulse waveforms shown in FIG. 21. The modulator is started by the output B of the contention control circuit 49 in FIG. 3. As explained previously the contention control circuit will generate a start modulator signal at an appropriate time to read a pair of lines from the memory 25. The start modulator signal referred to as $\overline{STSR}$ in FIG. 41 is coupled to an input 251 of a nand-gate 252 in FIG. 41. The gate 252 is cross-coupled to a similar gate 253 which has three inputs, $\overline{MR}$, $\overline{CMR}$, and $\overline{STOP\ M}$. The $\overline{MR}$ signal is the signal which is derived in FIG. 32, and the $\overline{CMR}$ signal is derived in FIG. 49. A ZM signal which is coupled to one of the inputs of the gate 252 is derived in FIG. 48 and is shown in FIG. 4 as the output of the or-gate 109.

The output of the gates 252 and 253 are coupled through an inverter 254 to an input of a transistor 255 which is used to start the tape recorder motor, having an output STM and a terminal 256. The STM output is identified in the block diagram of FIG. 3. A transistor 257 is provided to inhibit the start of the motor in response to the start of the modulator during a transmission mode. When the transmission mode is selected a signal is coupled to the transistor 257 from the terminal 258 to turn off the transistor 255. This prevents the tape recorder motor from responding to the output of the gates 252 and 253.

A delay circuit is provided to allow the recorder to operate momentarily prior to the initiation of the modulator. This circuit consists of a transistor 259 which is coupled to a field effect transistor 260 which, in turn, is coupled to a further transistor 261, having an output at a terminal 262. The output 262 is coupled to the input of a nand-gate 263 which is cross-coupled to a further nand-gate 264. The output of an inverter 265 is coupled through a circuit line 266 to a timing generator consisting of the logic circuitry shown below the circuit line 266. This logic circuitry generates output signals V10, V11, V12, and V13. The $\overline{V10}$ signal is used to initiate the modulator and is inhibited from beginning its time interval by a temporary logic condition at the output of the inverter 265 which condition exists during the time delay provided by the combination of the field effect transistor 260 and a capacitor 267.

Referring to FIG. 40, an $\overline{SC20}$ timing signal which has been described previously is coupled to an input of a four-bit binary counter 267 at a lead 268. The binary counter has the effect of dividing the frequency of the signal $\overline{SC20}$ by 16, and the resulting output which is available at a circuit point 269 is coupled to an input 270 of a shift register 271. The shift register 271 is of the same type as has been previously discussed herein. The shift register 271 is arranged in the form of a feedback shift register by the coupling of the $D_0$ output through an exclusive-or-gate 272 back to an input 273. An $A_0$ output is coupled to the other end of the exclusive-or-gate 272.

The principal purpose of the feedback shift register is to develop a sequential pattern of pulses to provide a sync signal on a circuit line 274. Also, the shift register has the effect of dividing the frequency of the input signal at the circuit point 270 to a lower frequency at the output terminal of a nand-gate 275. The terminal is identified as FB.

The FB signal from FIG. 40 is coupled to the input of a flip-flop 276 of FIG. 41. The flip-flop 276 along with three other flip-flops 277, 278, and 279 form a counter which has a series of outputs coupled to combinational and sequential logic circuitry illustrated to produce the desired output time signals V1-1, V1-2, and V1-3.

The V1-0 through V1-3 signals are then coupled to an input of a channel selector 280. The channel selector 280 has a non-inverted output 281 and an inverted output 282. The timing signals are used to control various inputs to the channel selector which are used to apply logic states to the waveform generator of the modulator, consisting of the binary counter 267 and the series of logic circuitry coupled between the binary counter and an output terminal identified as T DATA. The T DATA terminal in FIG. 40 is also shown in FIG. 3. The T DATA terminal is also coupled through an interface circuit for the recorder consisting of a transistor 283 and its associated biasing resistors to provide an output at an R DATA terminal 284. The R DATA terminal is also shown in FIG. 3 at the output of the modulator.

The timing sequence of the time slots V1-0 through V1-3 are shown in FIG. 17. The actual time interval allotted to each one of the time slots of FIG. 17 is illustrated in FIG. 18, and the actual pulse waveforms associated with the time intervals of FIG. 17 are shown in FIG. 21.

Referring again to FIG. 40, the data is coupled into a shift register 285 of the type previously described. This input comes from the RAMDO or data output from the memory 25 as shown in FIG. 3. The shift register produces serially arranged pulses at the output 286. These pulses are coupled to an input 287 of the channel selector 280. The corresponding terminal of the channel selector, namely 288 is coupled to a circuit point which is in turn identified as being coupled to the V1-3 output of FIG. 41.

The SYNC signal shown as being developed on the circuit line 274 is coupled to an input 289 of the channel selector. The corresponding control signal is V1-2 which is coupled as shown. The V1-0 and V1-1 inputs to the channel selector are grounded. This provided a logic zero signal on the line 281 and a logic one on the output 282. Such a condition means that during V1-1 time, a clock only, signal will be developed at the T DATA terminal. The clock signal is coupled from the output D of the four-bit binary counter through the waveform circuitry as shown to the T DATA output. During the time interval V1-0 a signal is coupled as shown into a circuit line 290 to an input of a gate 291 and a further gate 292 which has the effect of shutting off the gates and making T DATA output a continuous logic zero.

In the circuit operation, the time separation of the inputs to the channel selector takes the form shown in FIG. 17 with a logic zero being developed at the T DATA output during the first time interval, a clock signal being developed at the T DATA output during the second time interval, sync during the third time interval, and data during the fourth time interval. The sequence then reverts to a V-1 time interval to develop further clock and to a V1-0 time interval to develop a logic zero at the T DATA output corresponding to a stop signal. A counter illustrated generally by the logic circuitry within the dotted lines 293 in FIG. 40 counts the clock pulses of a circuit line 294. This extracts data from the shift register 285. The counting of the counter 293 begins only after the time slot V1-3 is initiated. This occurs due to the coupling of the V1-3 timing signal to a circuit point 294. When the counter 293 has counted four bits, the output of the counter at a circuit point 295 momentarily changes the control 296 of the shift register 285 to permit the register to receive additional data from memory. Also, the counter develops a signal DCR which is coupled to an address counter 297 in FIG. 42. Each time a pulse is received at the DCR input of the address counter 297, a new location in memory is addressed and data from that location is allowed to enter the shift register 285 by the RAMDO.

The address counter 297 is coupled to memory through the multiplexer 43 and the channel selector 22 as shown in FIG. 3.

The remaining circuitry shown in FIG. 42 includes the multiplexer circuitry consisting of a pair of channel selectors 298 and 299 which have an output MDO. This output is shown in FIG. 3. The address counter has an output MQ2 at a terminal 300 and is also shown in FIG. 3.

A pair of inputs MF and TRX are coupled to a nand-gate 301 which in turn is coupled to a flip-flop circuit 302 which is used to reset the flip-flop 302 for system control purposes. The MF and TRX signals are shown on FIGS. 51 and 58 respectively.

A signal A31 developed at a terminal 303 is used to sense the 31st address location in memory to reset the V1-3 pulse period on the timing generator shown in FIG. 41. The A31 signal is coupled to a circuit point 304 in FIG. 41 for this purpose. The remaining inputs to the circuit in FIG. 42 have been previously described.

Figures 43, 43A:
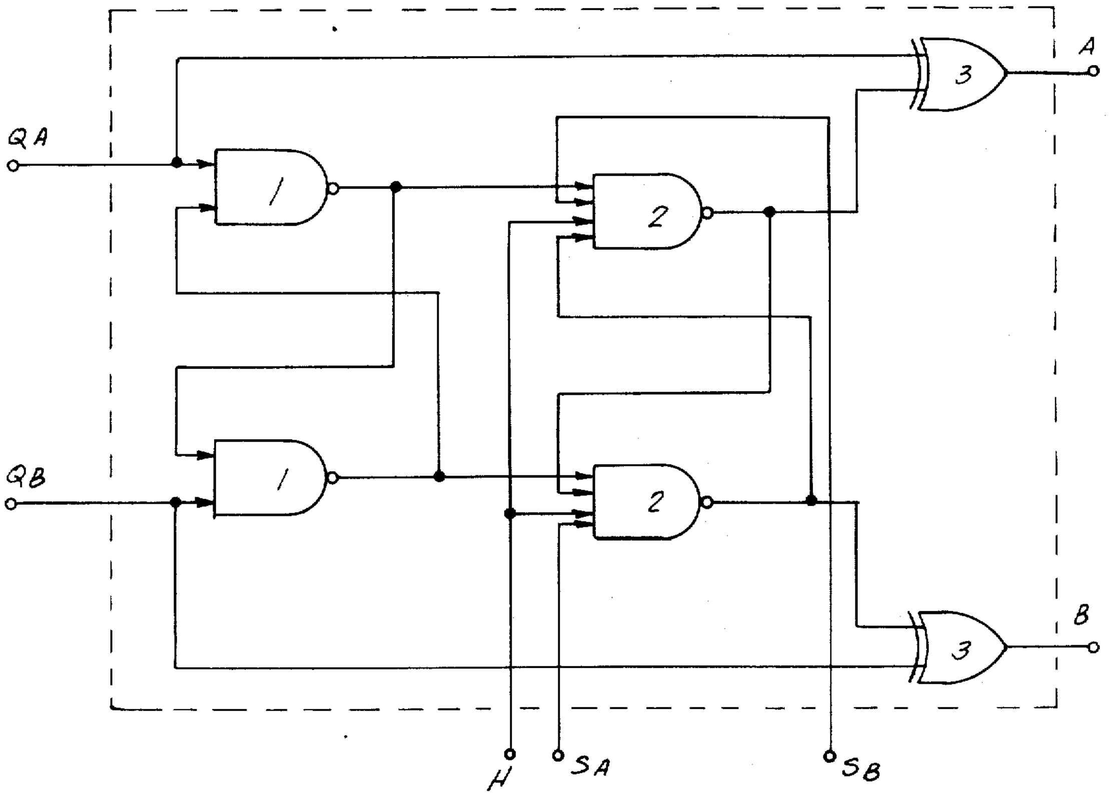
FIG. 43 illustrates the circuitry in each of the contention control circuits shown in block form in FIGS. 3 and 4.
FIG. 43A illustrates the truth table for the contention control circuit.

FIG. 43 shows a schematic of the contention control circuit which is utilized in the various devices shown in FIGS. 3 and 4.

A contention control circuit is used to control the transfer of input data to the desired output via the memory. This is best shown by example. Suppose the printer (an output of the memory) is to print the data stored on the magnetic tape recorder (an input of memory). Such a print-out must be controlled, started and stopped, and not be arbitrary. That is, the printer must wait until enough data has been loaded into memory before it is permitted to print a full section of memory. Therefore the demodulator must provide a full signal to the contention control circuit which in turn permits the printer to access the stored data in memory.

Further, the recorder can continue to load more data into memory, while the printer is taking data out of memory, since the memory is split into two sections, namely section zero and section one.

While section zero is being addressed to provide data to the printer, the recorder may continue to fill section one with new data. The printer may be slow in accessing data from section zero, and therefore the recorder must be inhibited from entering new data into section zero until the printer has advanced to section one of memory. Therefore a two-way control is required between the printer and the recorder.

If the printer is slow in moving to section one from section zero, the recorder must be inhibited until the printer has indicated to the recorder that the addressing of the section in contention is completed by the printer. Conversely, if the recorder is slower than the printer, the printer must be inhibited until the recorder has completed loading the memory section to be accessed by the printer. The contention control circuit for accomplishing this start-stop control of a selected pair of input-output devices is shown in FIG. 43.

Standard logic symbols are shown in FIGS. 43 and 43a. The inputs to the circuit in FIG. 43 are QA and QB and are derived from respective input and output addressing circuits. Specifically, the Q signals indicate where the input and output circuits are located in memory, section zero or section one. If QA or QB is in the logic zero state, the memory section will assume to be section zero. If the Q signal is in a logic one state, the memory section being addressed is then section one.

The contention control outputs are A and B which are used to stop and start the input and output devices from accessing memory. When A is at a logic zero, the input is permitted to start, or when B is at a logic zero, the output is permitted to start. When the A or B outputs are at a logic one, the input or output respectively, is inhibited from accessing memory.

To initialize the contention control circuitry, additional circuitry must be used to first set QA and QB to logic zero and the HOLD to a logic zero. Then the HOLD is changed to a logic one. This permits electing which device should start accessing memory first, the input or the output device. By the nature of the system organization, the input is selected to start first, so the circuit must place a logic zero signal on start A (SA) and a logic one signal on start B(SB). The logic zero signal may be a pulse signal (momentary zero) to get the contention circuitry started.

After the input has loaded section zero of memory, the QA signal changes from a logic zero to a logic one indicating that it has now proceeded to section one. However, the QB signal is still in the logic zero state because no accessing of section zero has been permitted.

As QA changes from logic zero to logic one, the contention control circuit changes the B output to logic zero, telling the output to start accessing memory section zero. At this time, the A output signal is at logic zero, also, telling the input to keep accessing memory section one.

Only when the input device has finished section one, and the output is still accessing section zero, does the A output change to the logic one state, indicating a need to stop the input process. The contention circuit in this case sees QA go to logic zero again while QB is still in the logic zero state. However, when the output has finished with section zero, the QB signal changes to the logic one condition. The logic of the circuit then changes the A signal to logic zero, and the input is again allowed to proceed to access section zero of memory.

The procedure described above may be kept going with the out-put device being either a slow or relatively fast device as compared to the input device without the two interfering with each other in memory.

A multiple of contention control circuits may be utilized to obtain different combinations of inputs and outputs. If a common circuit as described above is used for several input-output combinations, the QA, QB, A and B signals in and out of the circuit must be selected by the system control circuitry. The multiple circuit approach is illustrated in block form in FIG. 5, with specific schematics illustrated in FIGS. 44 through 60, whereby unused circuits are placed in a HOLD condition.

To assist in understanding the operation of the contention control circuit, a truth table is shown in FIG. 43*a* indicating the various logic states for each of five possible combinations of inputs QA and QB. The tabulation in the truth table follows directly from a logic analysis of the nand-gates shown in FIG. 43 and the two output exclusive-or-gates.

Figures 44, 45, 46, 47, 48, 49:
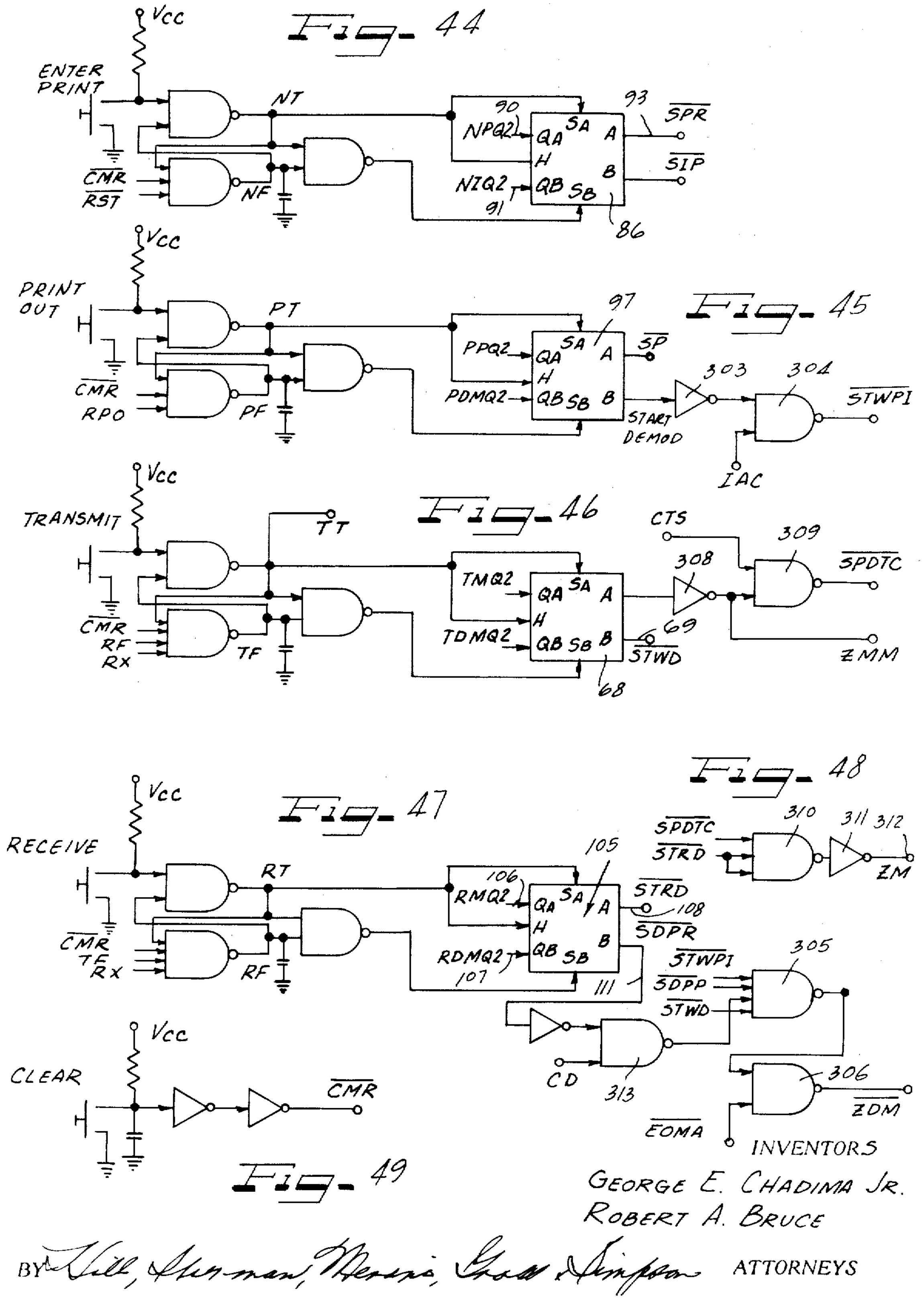
FIG. 44 is a schematic of the holding and initialization circuits of the contention control circuits shown in FIG. 43.
FIGS. 45 through 60 are similar to the schematic illustrated in FIG. 44 and are each part of the system control circuitry illustrated in block form in FIG. 5.

FIGS. 47 and 48 illustrate the operation of the various keys on the keyboard 13 of FIG. 1.

FIG. 44 shows the enter-print key and its associated circuit.

FIG. 45 is a circuit similar to FIG. 44 showing the print-out key arrangement and the associated contention control circuit 97 which is also shown in FIG. 4. An inverter 303 and a nand-gate 304 are associated with the or-block 70 in FIG. 4.

Figures 54, 55:
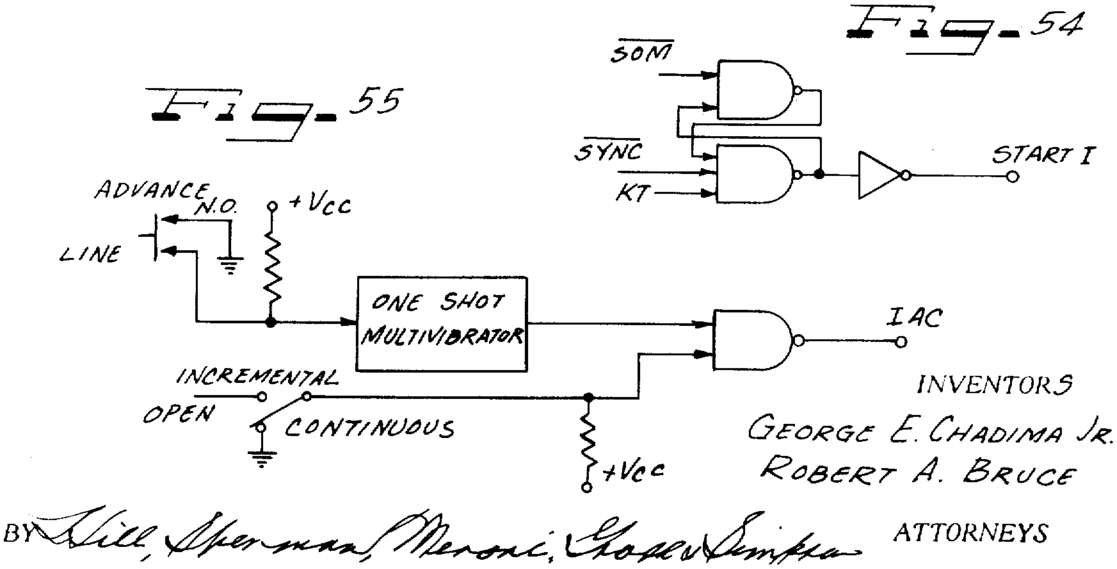

The IAC input to the gate 304 is derived from FIG. 55 and the $\overline{STWPI}$ is an output which is coupled to an input of a gate 305 of FIG. 47. A further gate 306 of FIG. 47 provides a $\overline{ZDM}$ signal and these two gates, 305 and 306 complete the or-block 70 of FIG. 4.

FIG. 46 is a schematic similar to 44 and 45 showing the transmit key arrangement of the keyboard 13 of FIG. 1 which is coupled by the logic circuitry shown to the contention control circuit 68. The circuit 68 has an inverter 307 coupled to the output thereof, and the output of the inverter is coupled to a nand-gate 309 which has an output $\overline{SPDTC}$. This output is coupled to the input of a gate 310 which is serially connected to an inverter 311 resulting in a ZM output at a terminal 312 (FIG. 48).

The gate 309 has an input CTS which is derived from the interface of FIG. 6. An output ZM is taken from the connection point between the inverter 308 and the nand-gate 309 and is used in FIG. 63.

The circuit elements 308, 309, 310, and 311 form the or-block 109 shown in FIG. 4.

FIG. 47 is a further circuit for the receive key of the keyboard 13 in FIG. 1 and couples the keying signal to a contention circuit 105 which has a pair of outputs 108 and 111 as shown in FIG. 4.

A gate 313 has a pair of inputs, one being from the output 111 of the contention control circuit 105, and the other being an input CD from the interface of FIG. 6.

FIG. 49 shows a circuit which is connected to the clear key of the keyboard 13 of FIG. 1. By depressing the clear key, a signal $\overline{CMR}$ is developed which is coupled to each one of the circuits as shown in FIGS. 44 thrugh 47 as well as FIGS. 50 and 51 and other circuits to reset the system.

Figure 50:
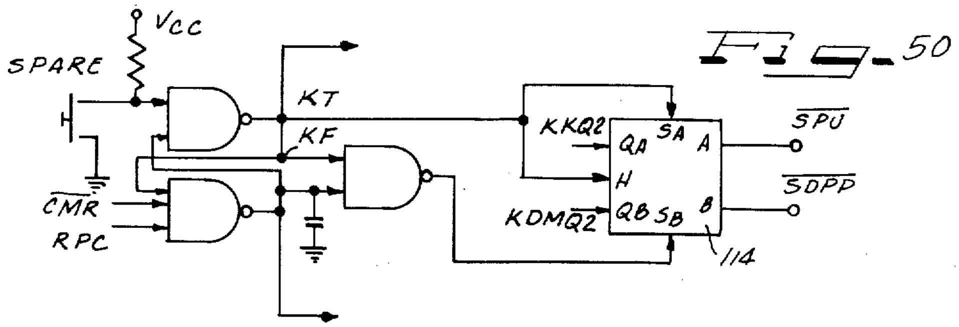
Figure 51:
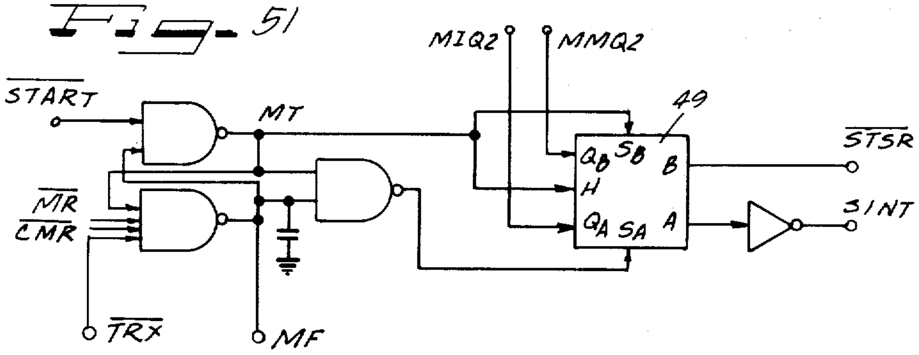

FIGS. 50 and 51 are similar to the previously described FIGS. 44, 45, 46 and 47. FIG. 50 is the spare unit which is shown in FIG. 4 and identified as the remote device. By depressing the spare key, signals are coupled to the contention control circuit 114 shown in FIG. 4.

FIG. 51 is a similar circuit which is associated with the contention control circuit 49 of FIG. 3.

Figure 52:
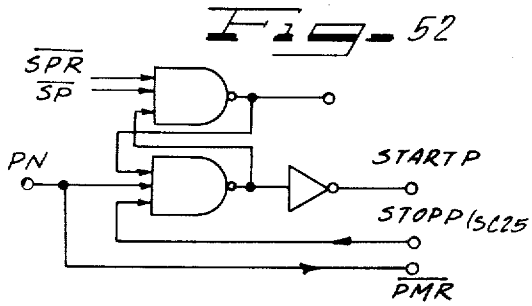
Figure 53:
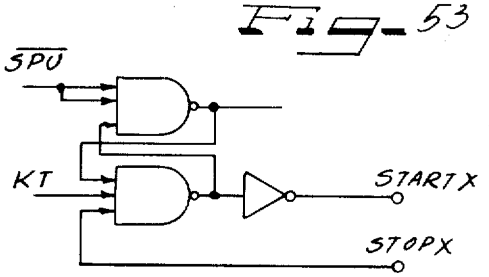

FIGS. 52, 53 and 54 are interface circuits between the printer and the remote device respectively and are well understood in the art. All of the inputs and outputs of the circuits 52 through 54 are identified throughout the system.

FIG. 55 illustrates the advance-line key on the console keyboard 13 of FIG. 1 for manually incrementing the printer. This is accomplished by use of the incremental/continuous key shown in FIG. 55. In the incremental position the advance-line key is coupled to the multivibrator which has an ultimate output IAC which is coupled to the or-circuit 70 of FIG. 4.

By moving the switch to the continuous position, the advance-line key is by-passed, and the continuous print-out operation, as has been described previously, is enabled. The purpose of the circuit of FIG. 55 is to stop the demoldulator after every line-pair has been printed until such time as the advance-line key is pushed to advance another line pair to the printer. In this way the printer can monitor data on a line-pair basis.

Figures 56, 57, 58, 59:
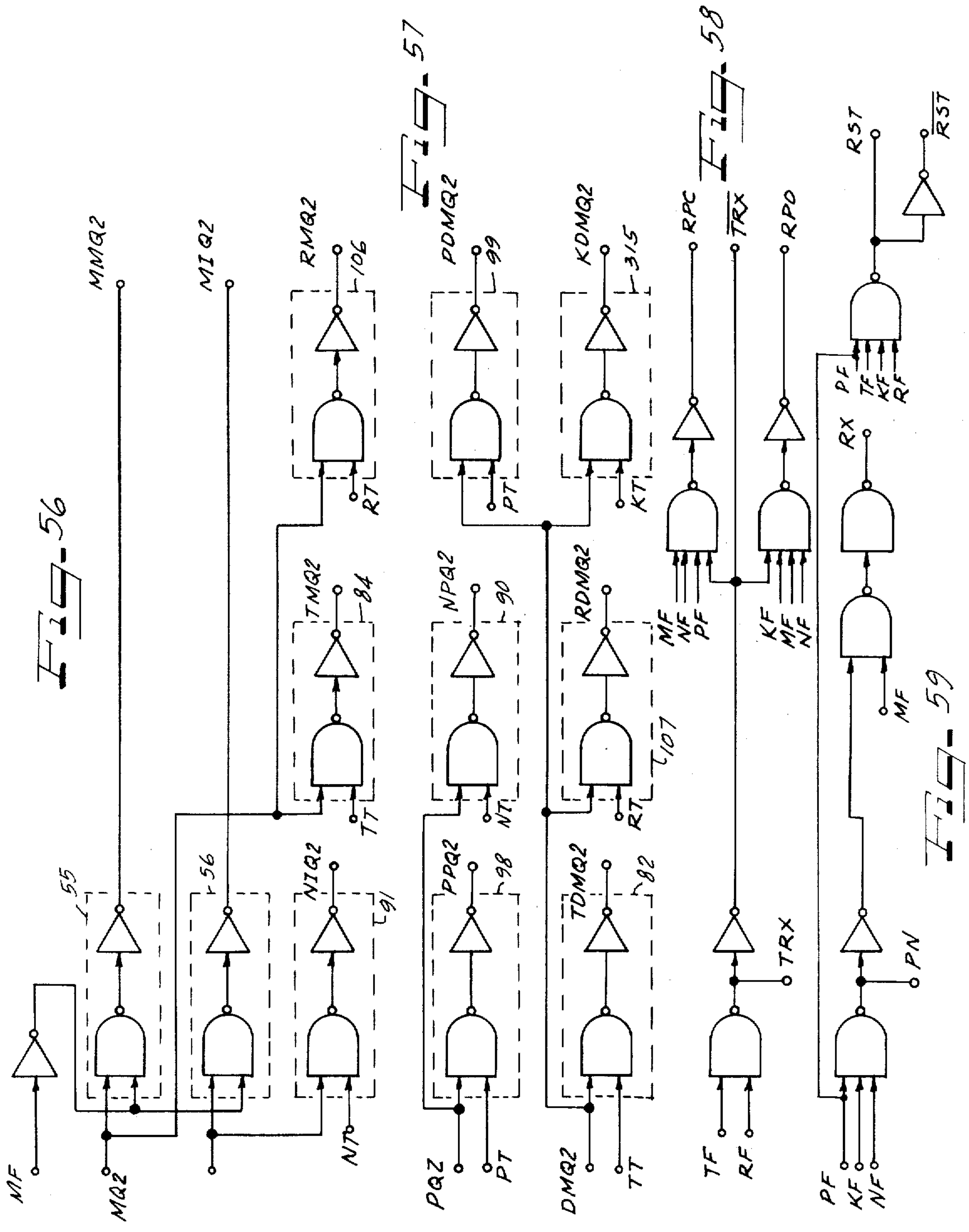

FIGS. 56 and 57 show the logic circuitry for a plurality of switches illustrated in the block diagrams of FIGS. 3 and 4. Each of the switches have been identified by the same reference numerals as in FIGS. 3 and 4 with the switches themselves being enclosed in dotted lines. The operation of the various switches in FIGS. 56 and 57 is controlled by the system control of FIG. 5. All of the inputs and outputs have been designated on these figures and are designated on other figures with the same symbols.

FIGS. 58 and 59 show the logic circuitry which is coupled between various of the figures such as FIGS. 44 through 51 to accomplish the resetting portions for various accommodations of operation modes which might be selected by depressing various keys on the keyboard 13 of the device shown in FIG. 1. The various inputs and outputs of the logic circuitry of FIGS. 58 and 59 are shown in the circuits illustrated in FIGS. 44 through 51 and other circuits.

Figure 60:
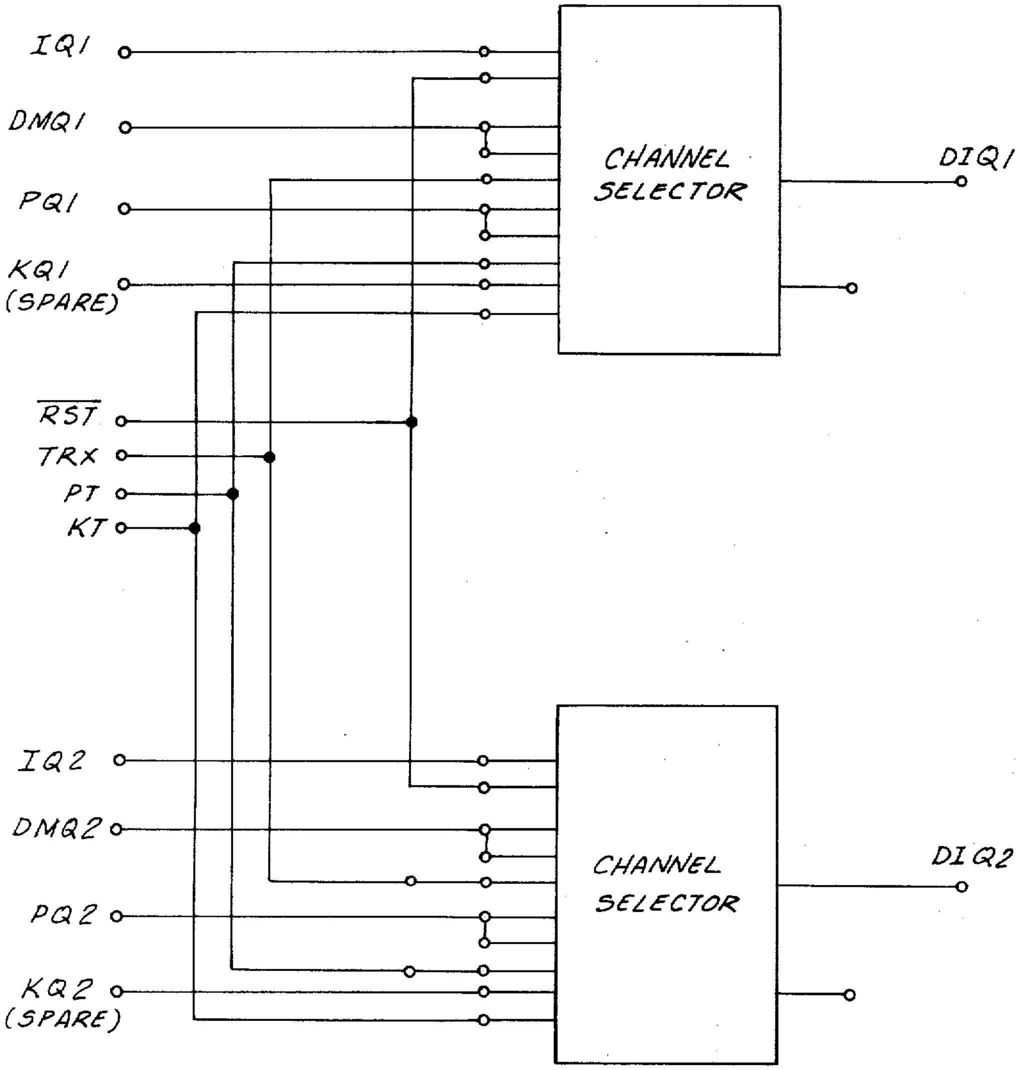

FIG. 60 shows a display selector which is comprised of a pair of channel selectors of the type previously discussed. Each of the channel selectors has an output, one being DIQ1 and the other being DIQ2. The inputs to the channel selectors are the Q1 and Q2 signals respectively, from each of the various input and output devices of the system. This circuit is used to permit the display to address the appropriate lines of memory. The control for the system is provided by the system control of the previously discussed figures such as FIGS. 58 and 59. These control signals are $\overline{RST}$, TRX, TT, and KT as shown in FIG. 60.

Figure 61:
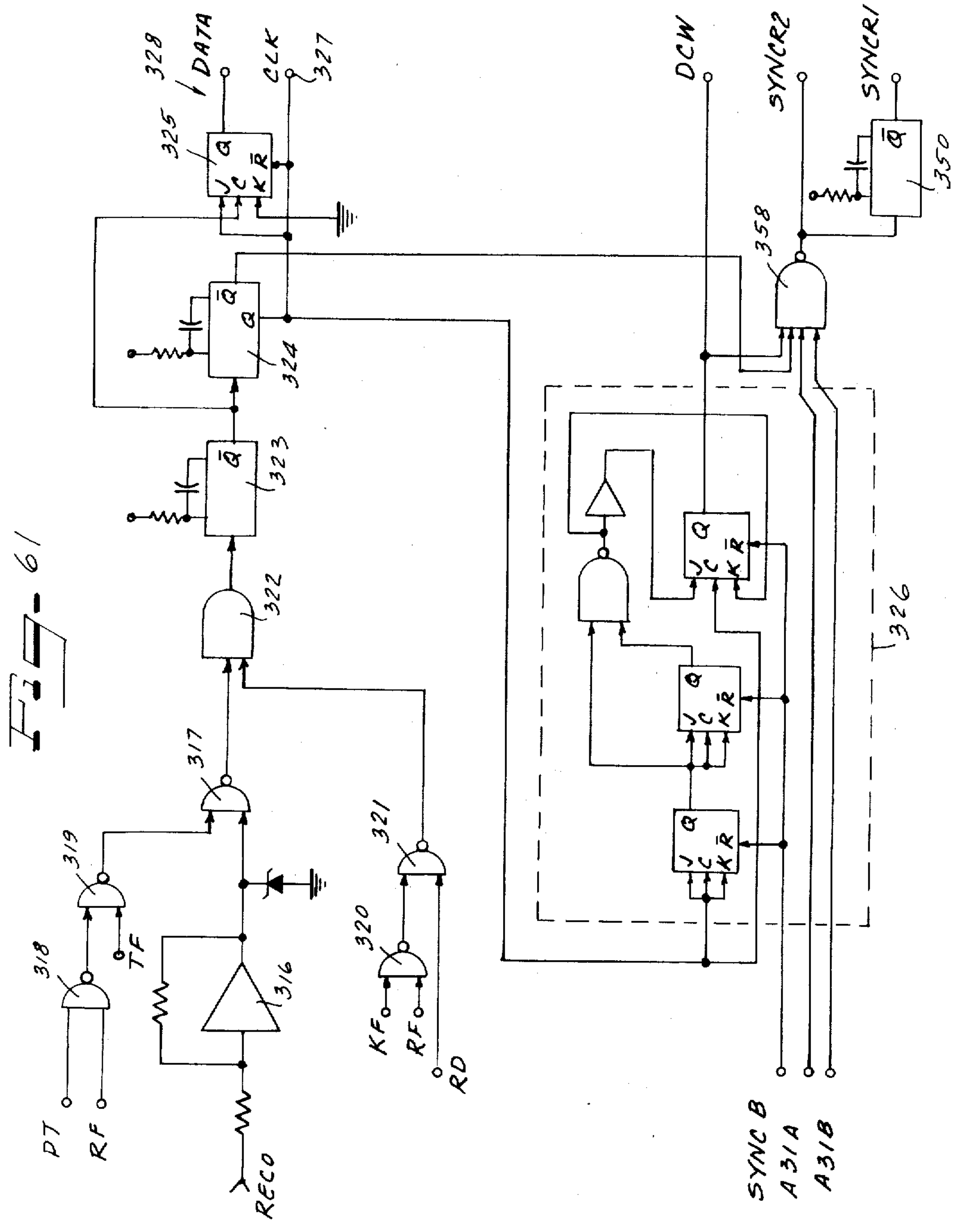
FIG. 61 is the input portion illustrated schematically of the demodulator shown in block form in FIG. 4.

Amplifier 316 in FIG. 61 is an amplifier for preparing the signal from the recorder to a logic level signal usable by the nand-gate 317.

Logic circuitry such as the nand-gates 318, 319, 320 and 321 are provided with various inputs PT, RF, TF, KF and RD which are coupled from a system control previously discussed to an and-gate 322. The output of the and-gate is coupled to a pair of one-shot multivibrators 323 and 324.

The RD signal shown in FIG. 61 is the RD signal or received data signal shown in FIG. 6.

The purpose of the circuitry discussed in connection with FIG. 61 is to select either the received data or the record input for demodulation. The demodulator itself is illustrated in part in FIGS. 61, 62, 63 and 64. A flip-flop circuit 325 is coupled to the multivibrators to separate the data and the clock pulses as shown.

The logic circuitry shown in FIG. 61 and identified by the reference numerals 326 is a digit counter which is used to count the clock pulses at the output 327 associated with the flip-flop 325.

The counter 326, however, will not begin counting the clock pulses appearing at 327 until an input identified as SYNC B has a logic one signal applied thereto. The application of a logic information to the SYNC B at the input of FIG. 61 can be understood from consideration of FIG. 62.

Figure 62:
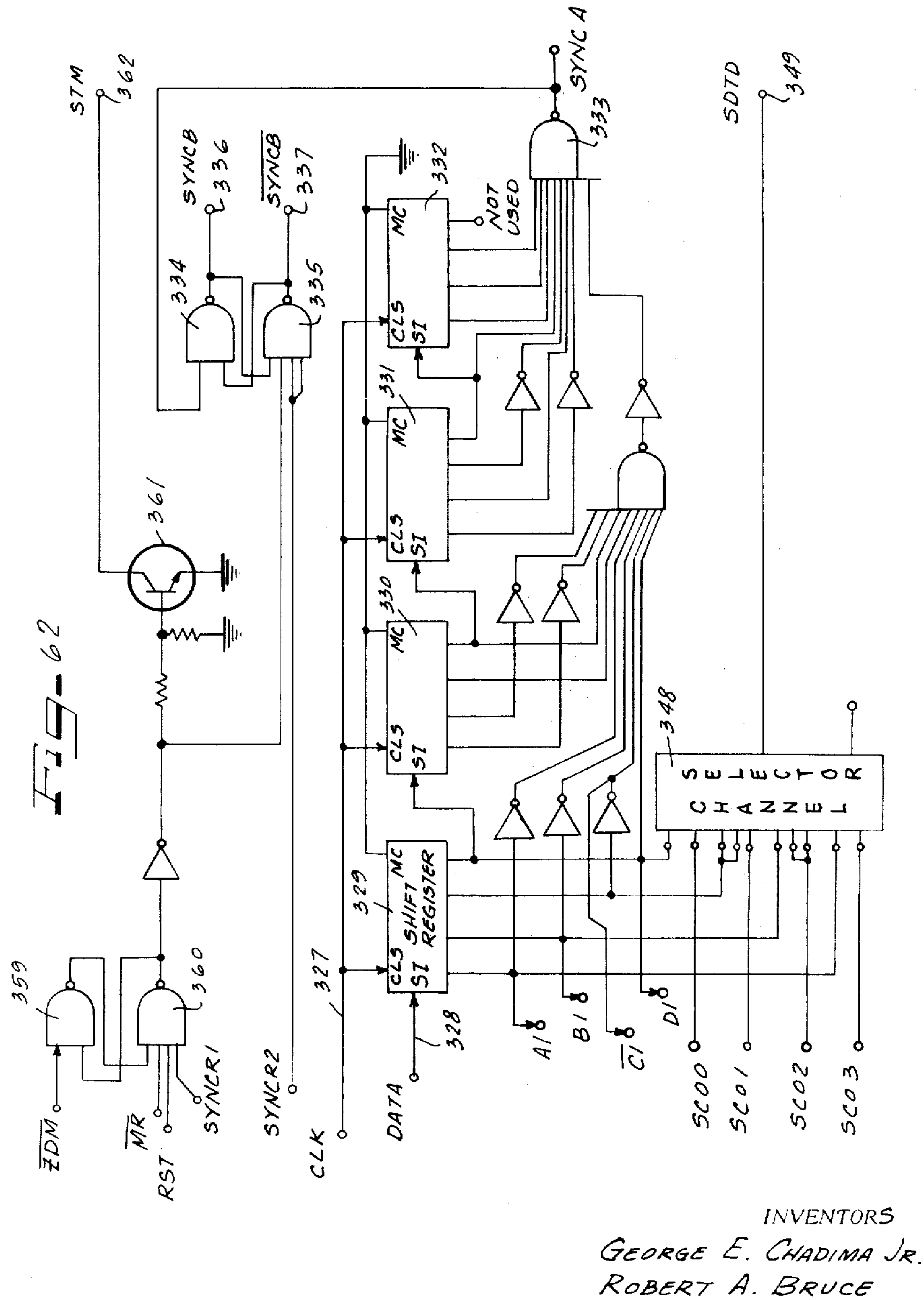
FIG. 62 is the data decoding and synchronization register portion of the demodulator shown in FIG. 4.

The data and clock outputs of the flip-flop 325 are shown in FIG. 62 by the reference numerals 327 and 328.

The data input 328 is coupled to four shift registers 329, 330, 331 and 332. These shift registers are then coupled to the inverter shown to a nand-gate 333 which produces a SYNC A output which in turn is coupled to a further cross-coupled pair of nand-gates 334 and 335 to develop SYNC B and SYNC B outputs 336 and 337 respectively. The SYNC B output is then coupled to the SYNC $\overline{B}$ point of FIG. 61.

The digit counter 326 of FIG. 1 will produce an output DCW for every four bits of clock pulses following synchronization as explained.

Figure 64:
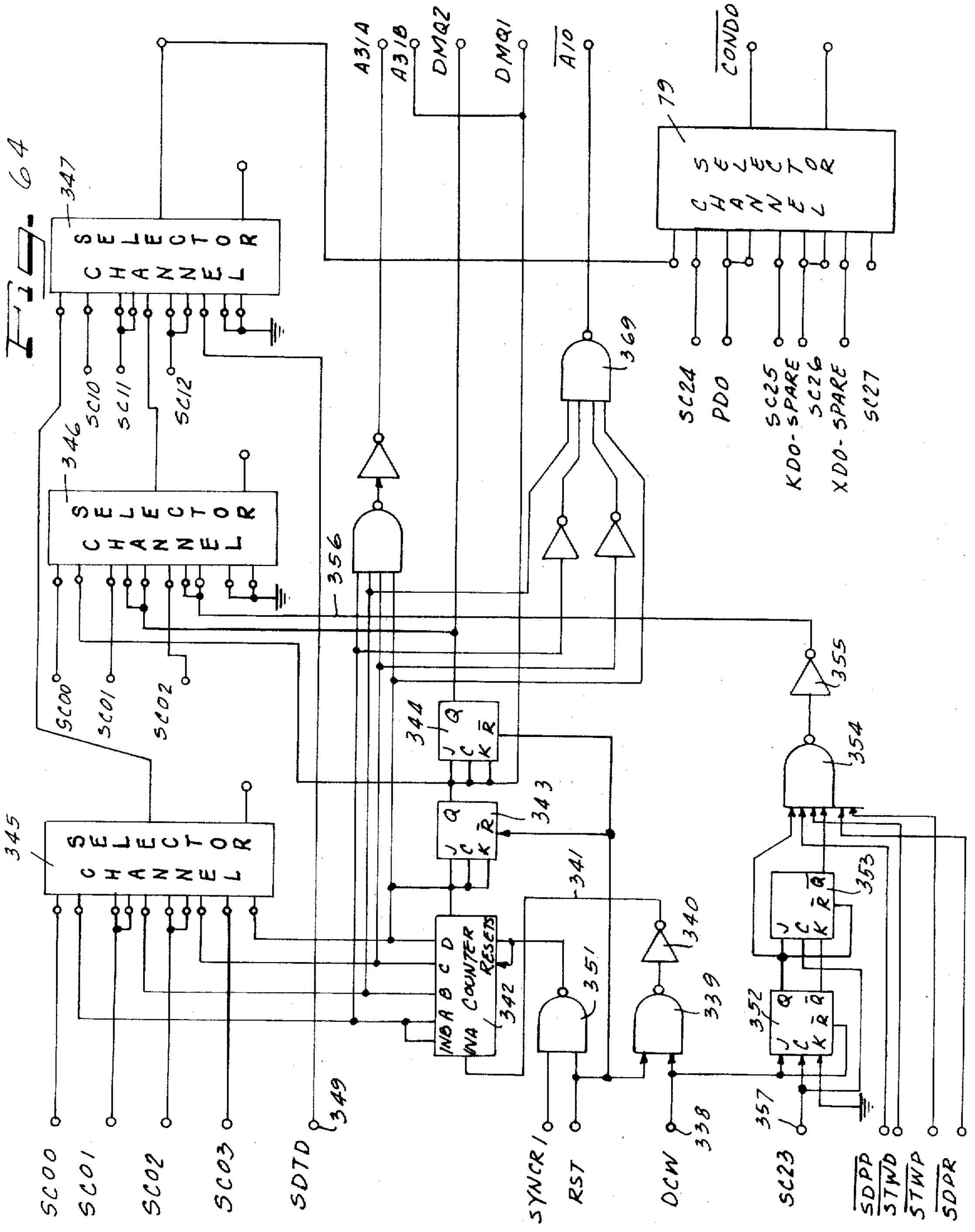
FIG. 64 is a schematic of the address counter associated with the demodulator of FIG. 4 and also illustrates the multiplexer circuitry coupled to the demodulator.

The DCW output of FIG. 61 is then coupled to a DCW input 338 of FIG. 64. The signal DCW is then coupled to the nand-gate 339 and the inverter 340 through a circuit line 341 to an address counter which includes a conventional four-bit binary counter 342 and a pair of flip-flops 343 and 344 as shown.

Each of the addresses associated with the address counters are multiplexed through a multiplexer which includes three channel selectors 345, 346 and 347. The channel selectors are controlled by the timing signals SC00, SC01, SC02 and SC03 as shown. Other timing signals are coupled to the channel selectors 346 and 347 as shown.

The data is multiplexed by means of the channel selector 348 of FIG. 62. The data is coupled to the channel selector 348 from the shift register 329 and is controlled by the timing generator signals SC00, SC01, SC02, and SC03. The output of the channel selector is identified as SDTD at terminal 349. The terminal 349 is coupled to a similarly numbered terminal in FIG. 64 which in turn is connected to one of the inputs on the channel selector 347 as shown.

The circuit of FIG. 61 develops a SYNC R1 signal at the output of a one shot multivibrator 350. This signal is then coupled to an input of a nand-gate 351 in FIG. 64. An RST signal is also coupled to an input of the same nand-gate from the system control circuit. The output of the nand-gate 351 is then used to reset and initialize the address counter in a well understood manner.

A circuit portion of FIG. 64 consisting of a pair of flip-flops 352 and 353 as well as a nand-gate 354 and an inverter 355 provide a write signal through a circuit line 356 to an input of the channel selector 346. The flip-flop 352 has a timing signal input at a terminal 357 identified as SC 23. The nand-gate 354 has a series of inputs from the system control identified as $\overline{SDPP}$, $\overline{STWB}$, $\overline{STWP}$, and $\overline{SDPR}$.

When the address counter indicates a full count or a count indicative of two lines of data, a logic one appears at outputs A31A and A31B in FIG. 64 which in turn are coupled to correspondingly named terminals in FIG. 61. The result is a sync reset 2 which is written as a SYNC R2 signal developed at the output of a nand-gate 358. The purpose of the SYNC R2 signal is to reset SYNC B of FIG. 62 to zero and also to initiate the one-shot multivibrator 350 to form SYNC R1 which is coupled to the input of a pair of nand-gates 359 and 360. The purpose of the cross-coupled nand-gates 359 and 360 is to start the demodulator when a suitable input is developed at the input terminal ZDM. ZDM is the output of the associated contention control circuit. Also, the circuit 359–360 is used to start the tape motor through a transistor 361 at a terminal 362 of FIG. 62 when it is desired to use the recorder as a source of demodulator data.

Figure 63:
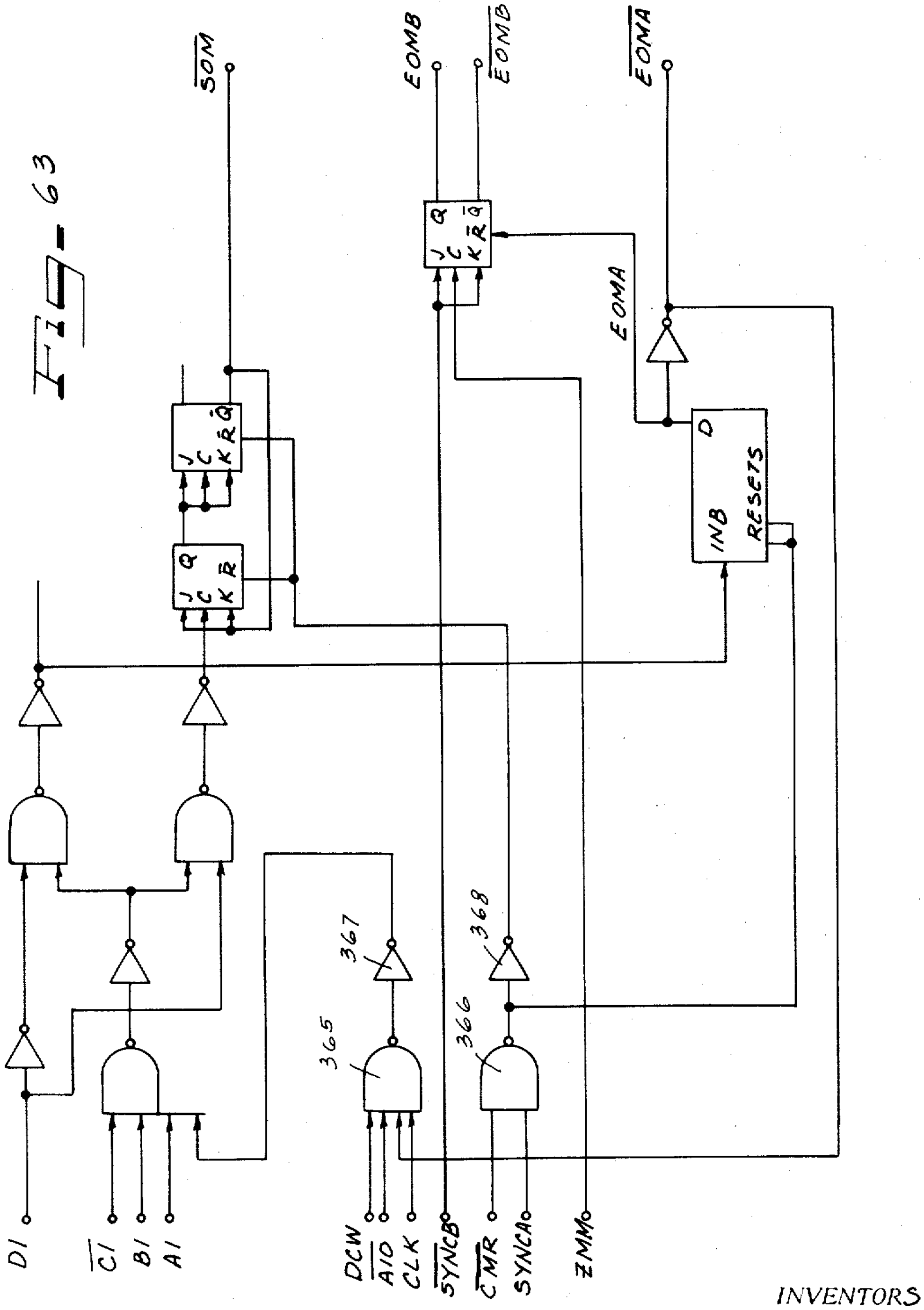
FIG. 63 is a schematic of a portion of a demodulator used to control the start and end of data flow in the demodulator of FIG. 4.

FIG. 63 shows a start and stop code detection circuit for use in the system control. The circuit has inputs A1, B1, C1, and D1 which are taken from correspondingly identified terminals at the output of the shift register 329 of FIG. 62. These inputs are coupled through the logic circuitry shown to a pair of flip-flops 363 and 364 to develop an output signal $\overline{SOM}$ which is a general start signal for use in the system and indicates the beginning of data flow in the demodulator.

Similarly an output $\overline{EOMB}$ is developed which is a stop signal indicating the stop of data flow through the demodulator. A portion of the circuit in FIG. 3, namely a pair of nand-gates 365 and 366 and associated inverters 367 and 368 provide control signals to the circuit to determine the time interval at which the input formation on terminals A1, B1, C1 and D1 will be viewed for the purpose of detecting start and stop codes. The nand-gates 365 and 366 have a plurality of inputs, DCW, $\overline{A10}$, CLK, $\overline{SYNC}$ B, $\overline{CMR}$, SYNC A, and ZMM. All of these inputs have been previously identified in the circuit except for $\overline{A10}$ which is developed at the output of a nand-gate 369 of FIG. 64.

The purpose of the $\overline{A10}$ signal is to provide a blanking signal to prevent detection of stop and start codes during the 11th digit address of each line of data which could otherwise be detected as a false start or stop code due to the fact that this is the time interval allocated for a check digit.

The channel selector 79 of the block diagram of FIG. 4 has been repeated to show its coupling to the output of the channel selector 347. This has been repeated in FIG. 64, and the output is identified as CONDO which is similarly identified as the console data output of FIG. 4.

FIGS. 65 through 79 illustrate various circuits utilized as part of the printer control, address counter, and associated multiplexer used to control the printer to respond to the data being accessed from memory. The present system utilizes a Friden type 147 helical printer, and the logic circuitry shown in FIGS. 65 through 79 have been designed to translate the data being retrieved from memory into a printing action by this printer.

Figure 65:
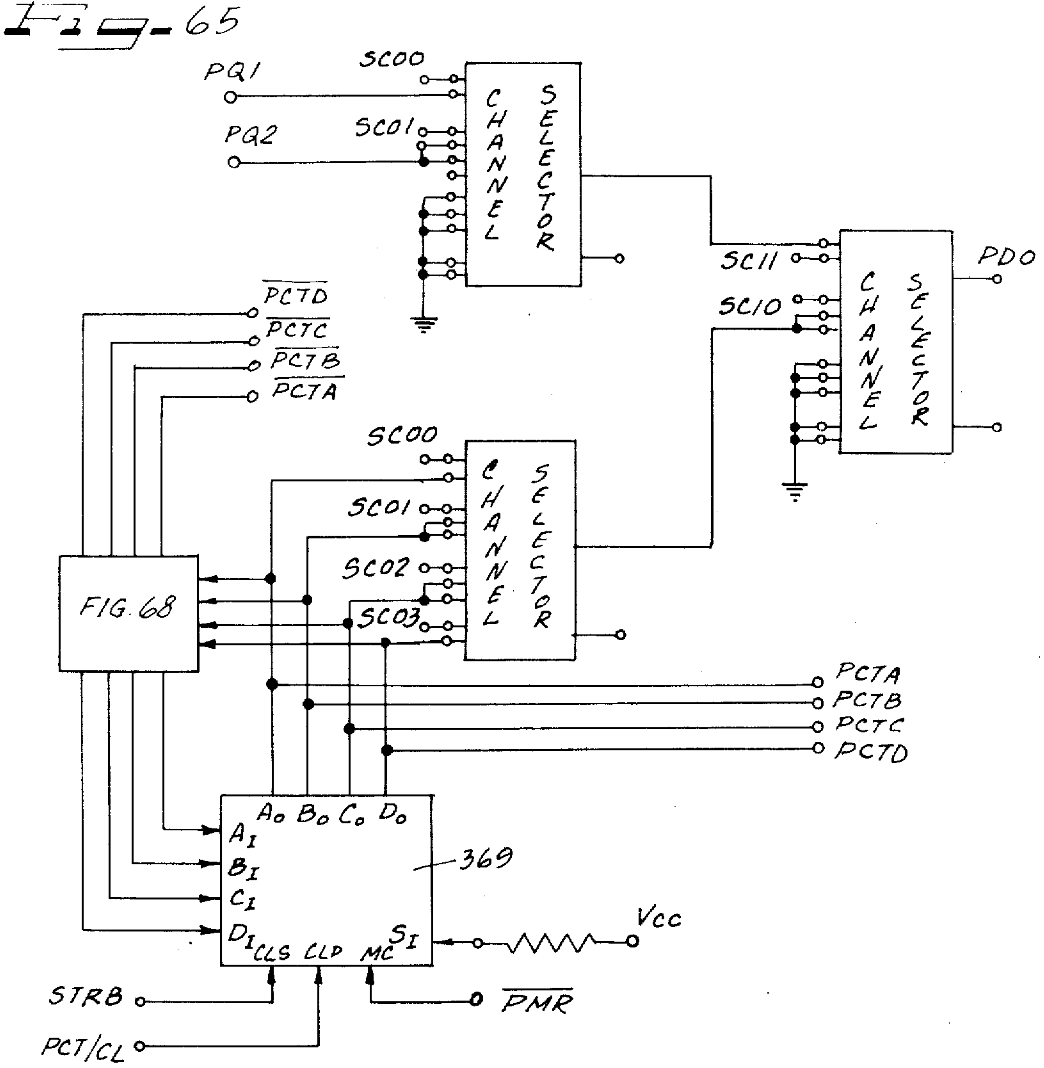
FIG. 65 is a portion of the circuitry associated with the multiplexer of the printer control shown in FIG. 4.

FIG. 65 shows an address counter and a multiplexer for the printer circuit. The channel selectors shown in FIG. 65 are the same as the channel selectors previously described in connection with the present invention.

Figure 68:
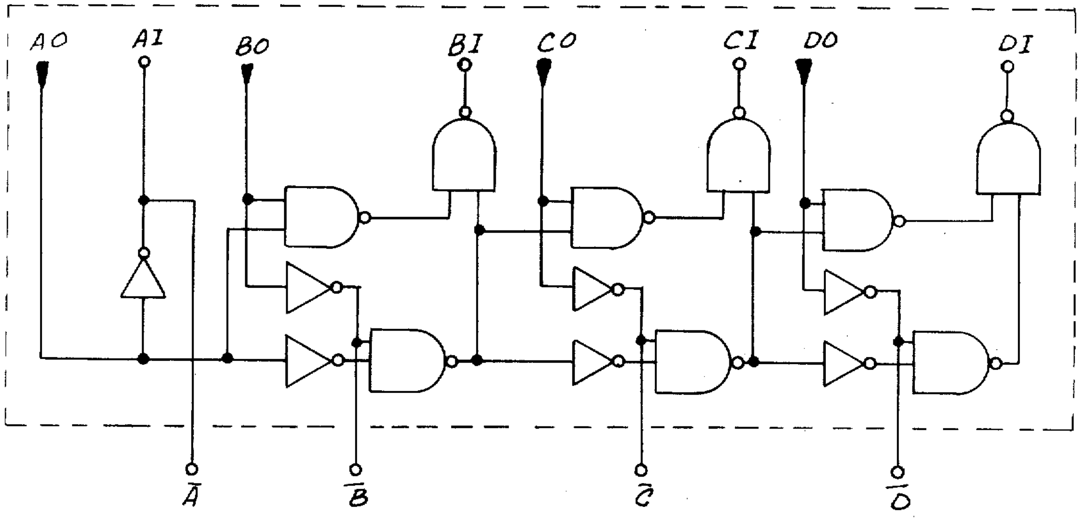
FIG. 68 is the logic circuitry associated with the down counter of FIGS. 65 and 66 and also illustrated in FIG. 75.

A shift register 369 which is also the same as shift registers previously discussed herein is coupled to a down-counter feedback circuit which is shown in block form in FIG. 65 and is illustrated schematically in FIG. 68. The purpose of the down-counter is to reverse the addressing procedure for accessing data from memory due to the fact that the type of printer described prints from right to left which is opposite to the mode of entering data into memory.

The address signals PCTA through PCTD and $\overline{\text{PCTA}}$ through $\overline{\text{PTCD}}$ are connected to various address sensing circuits in the printer control system.

Figure 66:
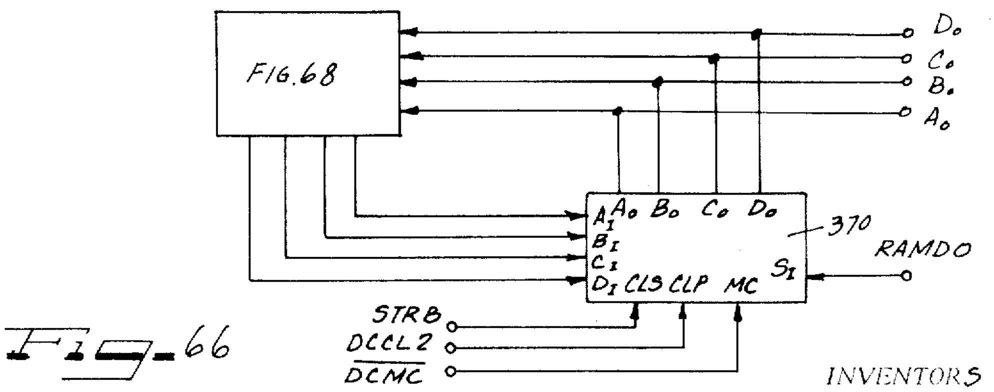
FIG. 66 is a data input register for the printer control of FIG. 4.

FIG. 66 shows the data register identified by the reference numeral 370. The data register is also coupled to a similar feedback circuit of the type shown in FIG. 68. The identifying symbols in the register 370 as well as the register 369 correspond to the symbols shown in FIG. 68 which are applied to the various terminals of the logic circuit shown therein. The purpose of FIG. 68 is to provide a dow-counter for data loaded into the four-bit register 370 in order to locate a given position on the circumference of a printer wheel.

Figure 69:
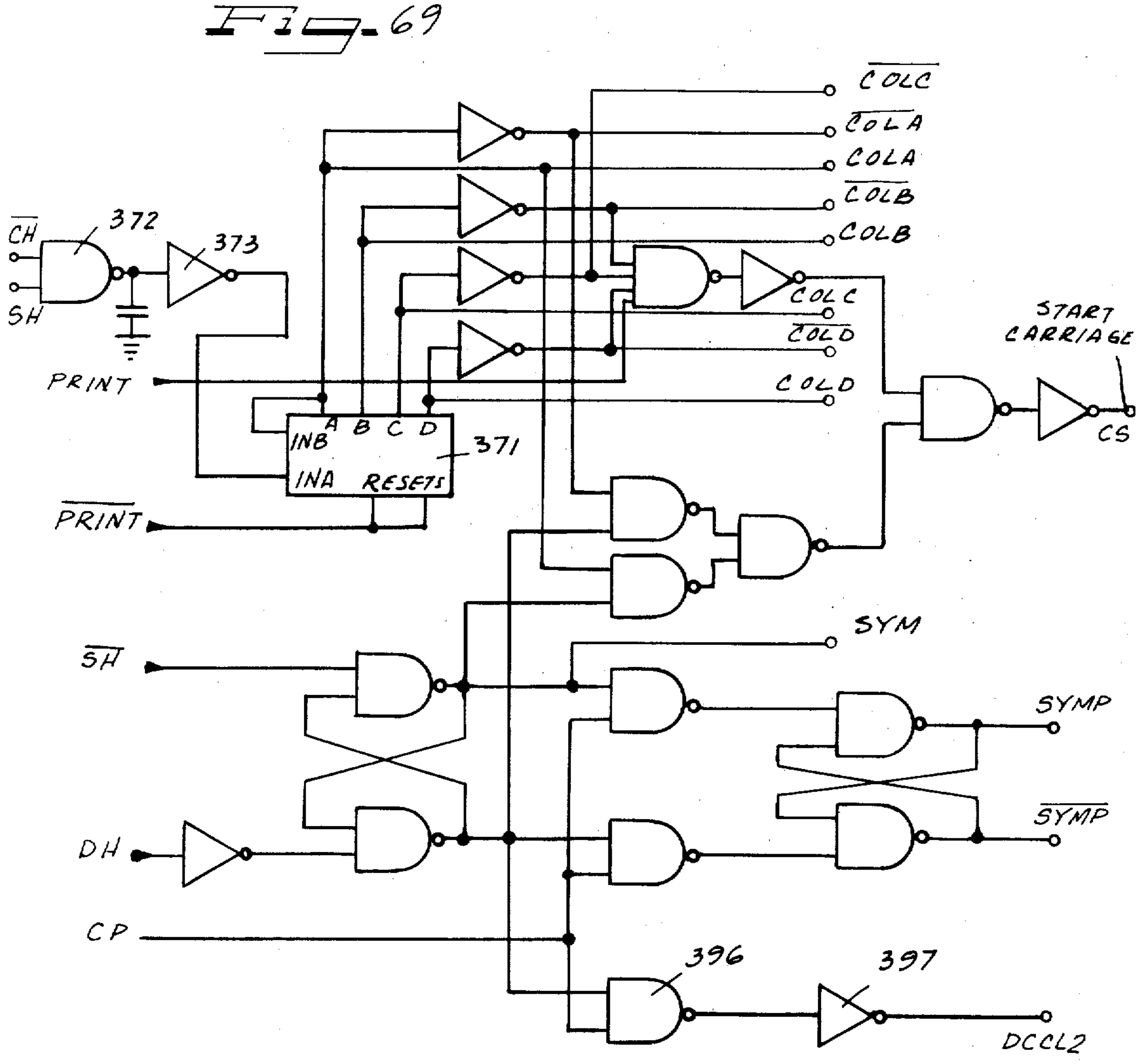
FIGS. 69 through 73 are separate circuit portions of the control logic of the printer control circuit of FIG. 4.
Figure 70:
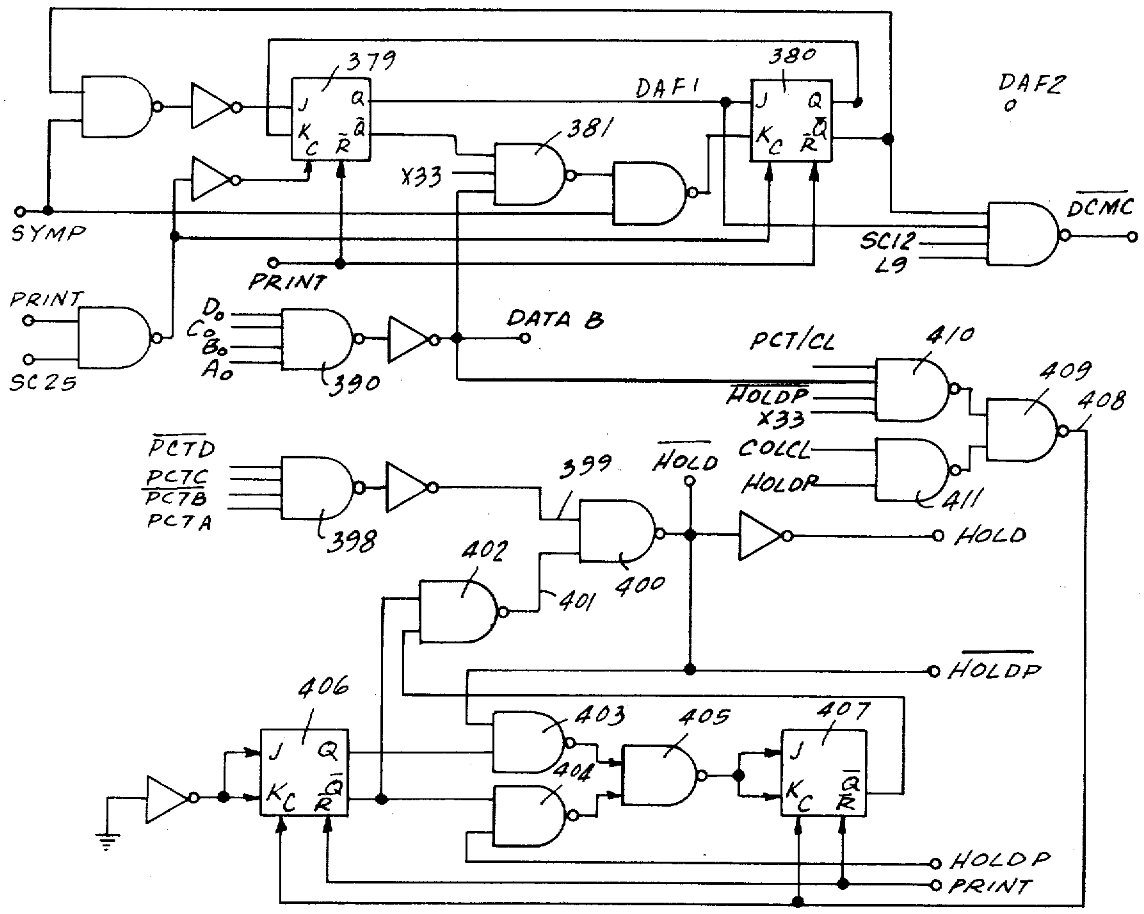

The down count of FIG. 66 is controlled by the input signals STRB, DCCL2, and $\overline{\text{DCMC}}$ which are generated in FIGS. 69 and 70.

FIG. 69 is a logic circuit for developing a series of column signals, as indicated, to inform the printer which column to print a given digit.

Figure 74:
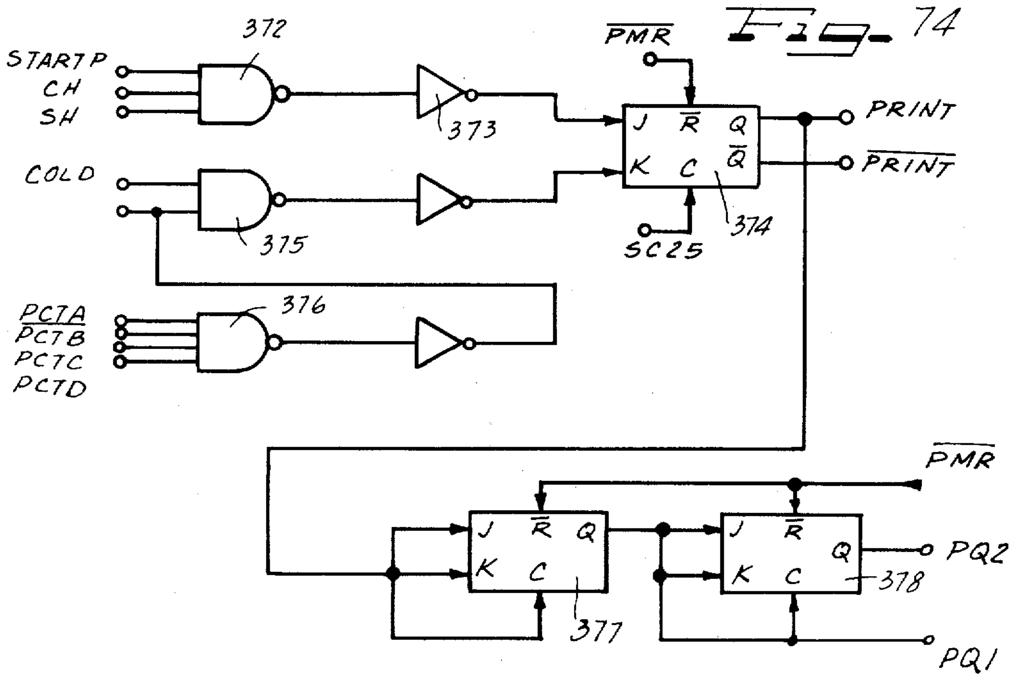
FIG. 74 is the start print control circuitry also part of the printer control illustrated in FIG. 4.

The column signals are generated by a four-bit binary counter 371 which has a $\overline{\text{PRINT}}$ input derived from initialization circuitry in FIG. 74. Also, the counter 371 has a pair of inputs $\overline{\text{CH}}$, and SH which are coupled to a nand-gate 372 and through an inverter 373 to the counter 371. The $\overline{\text{CH}}$ and SH signals are derived from the printer feedback signals. The $\overline{\text{CH}}$ signal is developed each time the carriage is moved to its initial position, and the SH signal is developed each time the carriage advances one column which is the same as one revolution of the printing wheel. In this way the column signals identified in FIG. 69 are generated.

The purpose of the circuit shown in FIG. 74 is to start the printer. A nand-gate 372 has a series of inputs, one of them being a start key input which comes from a like identified output of FIG. 52. Also, the nand-gate has two other inputs $\overline{\text{CH}}$ and SH which are related to the $\overline{\text{CH}}$ and SH signals at the input of the nand-gate 372 of FIG. 69. A logic one on each of the inputs to the gate 372 indicates that the printer was in a start print position. The output at the gate is coupled through an inverter 373 to a flip-flop 374 which has a print and $\overline{\text{print}}$ output.

Further logic circuitry indicated by the nand-gates 375 and 376 provide a reset function for the flip-flop 374. The output of the flip-flop 374 then causes the line counter which consists of a pair of flip-flops 377 and 378 to begin counting. This occurs at a point after the carriage has started moving from right to left.

The result is output signals PQ1 and PQ2 which are used in the associated contention control circuit and in display selection circuit which has previously been described.

Figure 72:
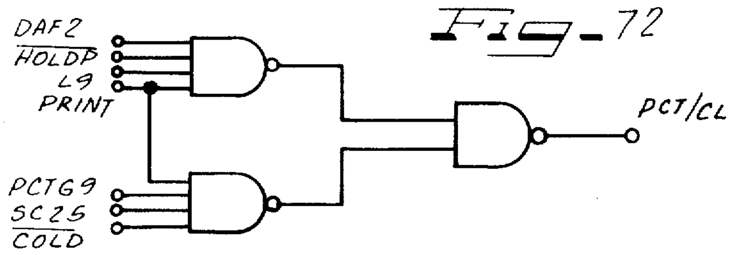
Figure 73:
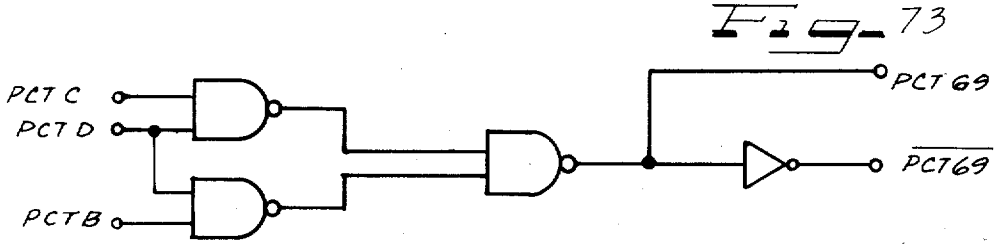

FIG. 73 is a logic circuit which monitors the address counter output of FIG. 65 to form a detector for the purpose of determining when the address is greater than nine. The output signals generated by this circuit are PCTG9 and $\overline{\text{PCTG9}}$. FIG. 72 shows combinational logic for developing a clock signal to decrement the counter 369 in association with FIG. 68. Each of the input and output signals of the various circuits as discussed are identified with symbols which are common throughout the various circuits.

The portion of FIG. 70 including the flip-flops 379 and 380 in conjunction with the input SYMP which is derived from FIG. 69 is used to generate a signal DAF2 which indicates when a data access time is available for retrieving data from memory. Such a time is avaliable when the printing wheel is at a print position where a character is not required to be printed.

The SYMP and $\overline{\text{SYMP}}$ symbols of FIG. 69 are generated by the logic circuitry as shown from the inputs $\overline{\text{SH}}$ and DH which are timing signals generated by the printer wheel position.

Figure 69A:
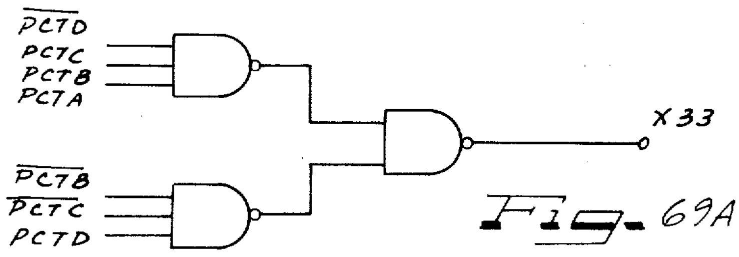

FIG. 69*a* shows combinational logic used to generate a signal X33 which is coupled to one of the inputs of a nand-gate 381 of FIG. 70 which signal is used to reset the flip-flop 380.

Figure 67:
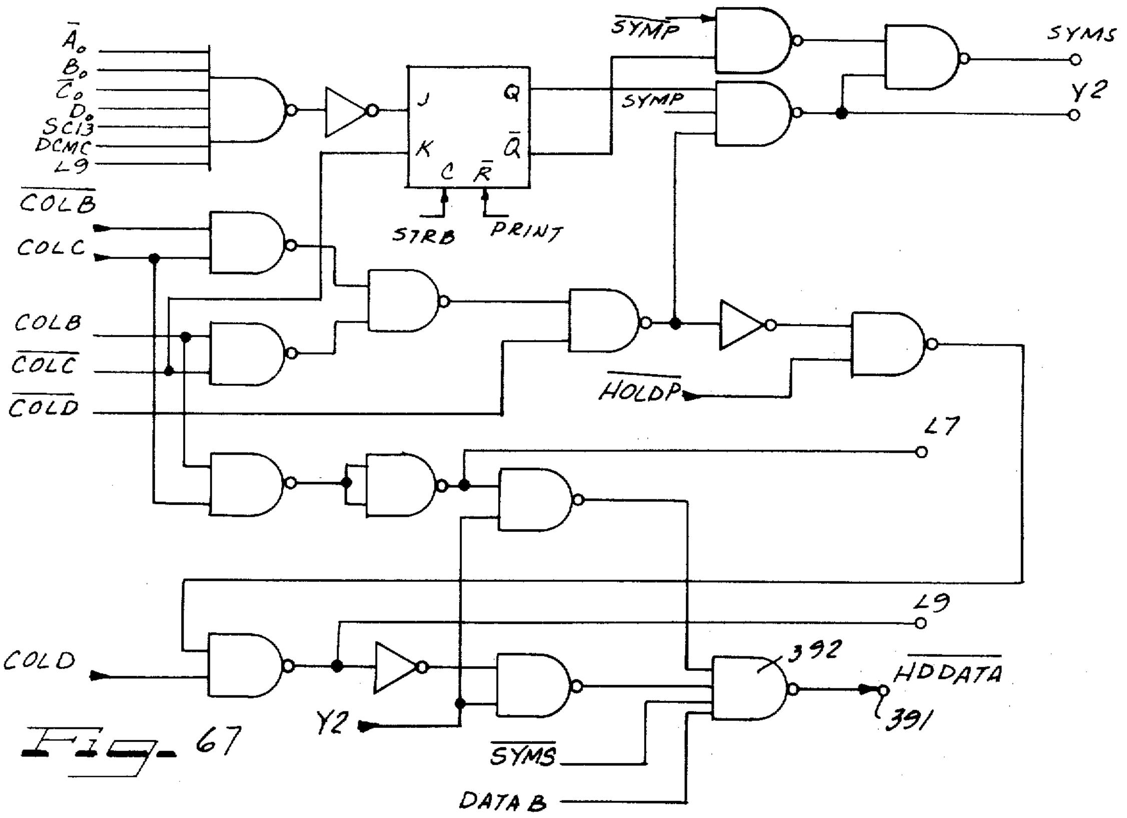
FIG. 67 is a schematic of a portion of the control logic system associated with the printer control of FIG. 4.
Figure 75:
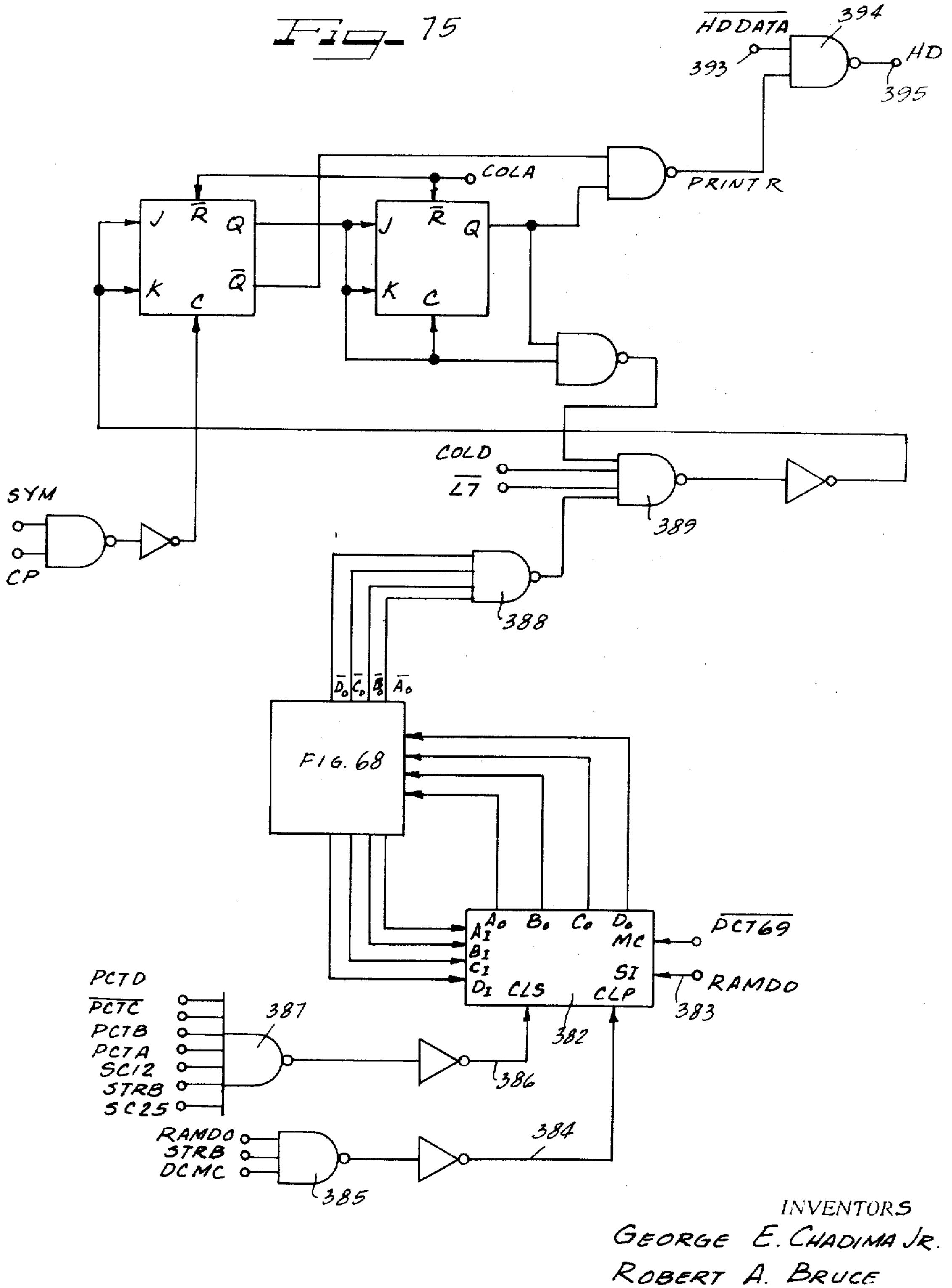
FIG. 75 is part of a printer drive circuit of the printer control of FIG. 4.

FIG. 67 shows the logic circuitry which is utilized to generate the hammer drive signal, and FIG. 75 is a portion of the hammer drive circuit which is responsive to the parity counter and check digit circuitry.

Referring to FIG. 75, a shift register 382 has a data input at 383 which receives data input during the 11th digit of a line. The data is then down counted by a circuit in conjunction with FIG. 68 in accordance with a signal at a circuit line 384 which is derived from a series of inputs to a nand-gate 385.

A signal on a circuit line 386 clocks the data into the shift register 382. The signal 386 is derived from a plurality of inputs identified in FIG. 75 to a nand-gate 387.

If the output of the register 382 down counts to zero, the circuit FIG. 68 has a logic one at each of the outputs $\overline{\textbf{A0}}$, $\overline{\textbf{B0}}$, $\overline{\textbf{C0}}$ and $\overline{\textbf{D0}}$ which when coupled through the logic circuitry consisting of the nand-gate 388 produces an inhibit signal at a nand-gate 389 which prevents the hammer drive from printing an error symbol in the line being printed.

The purpose of the circuit just described in FIG. 75 is to determine whether an error has occurred in the process of the printer receiving data from its original source. This error check function is accomplished by using the sub-total of all the logic one pulses in a given data line. This count is then placed in the check digit address of memory, which is the digit location in memory following the first ten digits of data. This check digit is coupled to the counter 382 at the input 383 which puts an initial count in the down counter 382.

Since the addressing is reversed on the printer, the check digit appears first at the counter 382 and subsequent data pulses in the line can be used to count down the down-counter 382 to zero. As explained, this then results in a series of logic one outputs which prevent the hammer drive from printing an error signal on the line. If the down-counter does not count to zero, the nand-gate 389 will not be inhibited, and the hammer drive will print an E beside the line, indicating that there is a discrepancy between the data originally placed in memory and the data printed by the printer. The printer used in the present system has its operation divided into columns 2 through 15 shown in FIG. 71*a*. FIG. 71*a* shows a portion of a paper tape which has been printed with the present system.

Columns 2, 3, 4 and 5 are utilized as a quantity field. Columns 6 and 7 are left blank to provide separation between the quantity field and an item field which is printed in columns 8 through 13. Column 14 is left blank and the error R previously described as printed in column 15.

Since the printer is receiving data in reverse order from the order in which data is entered into memory, without suitable logic circuitry, the printer would print the quantity field digits in the manner shown in FIG. 71*a* indicated by the primed digits, i.e., 1′, 2′, etc. This would mean that a quantity of 1 would be printed in column 5 and a quantity of 12 would be printed with the 1 in column 5 and the 2 in column 4. Since it is desirable to right-justify the quantity field, suitable circuitry is provided to assure that the "ones" digit of each quantity line is printed in column 2, the "tens" digit of each line in column 3, etc. This right-justified printout is shown in FIG. 71*a* above the dashed line.

The item field may have a varied number of digits, but it is not necessary to right-justify these digits, and accordingly they are printed in an arrangement such as is shown at the upper half of FIG. 71*a*.

In the operation of the printer in the item field, the printer is allowed to print the first digit, after which memory is accessed for data prior to the printing of the following digits. In order to accomplish the right justification illustrated in the upper half of the quantity field of FIG. 71*a*, a circuit must be provided to reset the memory access of the printer whenever a blank or no-character code is indicated by memory. This resetting continues until the first digit appears which will always be the first print-column digit if there is any quantity indicated, otherwise the printer will advance to the item field.

The resetting of data access of the printer must occur rapidly and before the printing wheel arrives at the first printing location.

The circuit for accomplishing the right justification is shown in combination in FIGS. 66 and 70.

The circuit of FIG. 6 produces the output signals DO, BO, CO, and AO which are logic ones when the down-counter 68 detects a blank or no-print condition. These output signals are then coupled to inputs similarly identified in FIG. 70 to a nand-gate 390 which produces a data B output after inverting the signal shown.

The DATA B signal is then coupled to the gate 381 which is used to reset the DAF2 signal which will cause the address counter of the printer to decrement to a new address in memory. The DAF2 signal is coupled to an input in FIG. 72 to accomplish this function.

When the first non-blank digit appears at the output of FIG. 66, the DATA B will no longer function to reset the DAF2 signal, and the printer will be allowed to print and access data after each digit is printed. The DATA B signal shown in FIG. 70 is also coupled to a like-identified circuit point in FIG. 67. DATA B of FIG. 67 is coupled to a nand-gate 392. The output of the gate 392 is coupled to hammer drive at a circuit terminal 391. If the output 391 is then coupled to a terminal 393 in FIG. 75 which is the input to a nand-gate 394. The output of the nand-gate 394 is coupled to the hammer drive terminal 395 which in turn is coupled to a simple interface circuit in FIG. 78 which provides the actual signal to initiate the brive of the hammer.

When a non-blank character is accessed from memory, the DATA B signal as derived in FIG. 70 is at a logic zero condition which means that the hammer drive signal 391 in FIG. 67 is not initiated. Since it is desirable to initiate the hammer drive signal 391, the circuit shown in FIG. 66 is employed to count down the digit data which has been loaded from memory until the count goes to zero and flips the counter to an allone state at the outputs A0, B0, C0, D0. This then produces a logic one at the output of DATA B as previously explained which enables hammer drive circuit.

Figures 76, 77:
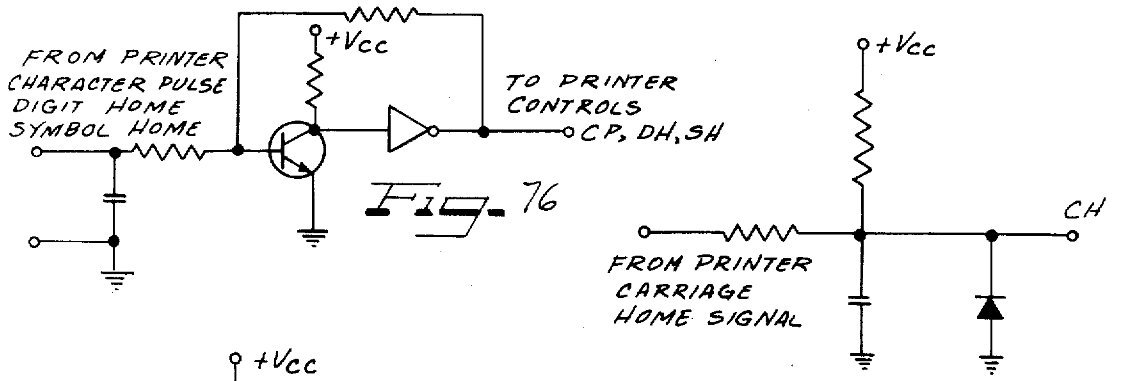
FIGS. 76 through 79 are circuit interface portions between the printer control and the printer of FIG. 4.
Figure 78:
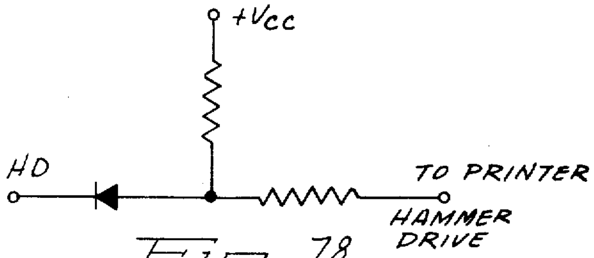
Figure 79:
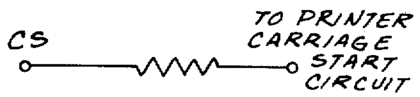

The down-count signal DCCL2 shown in FIG. 66 is derived from a combination of the circuits shown in FIG. 76 and 69. The printer produces a digit-home signal, symbol-home signal, and a character pulse signal each of which have a circuit like that shown in FIG. 76. The outputs CP, DH, and SH are coupled to the input of the circuit in FIG. 69, and gate 396 provides the output DCCL2 through the inverter 397.

The signal DCCL2 is a clock pulse which will count down the down-counter to zero at a time when the printing wheel reaches the location corresponding to the data input digit.

Due to the right-justification process described in conjunction with FIG. 71a, it is necessary to hold the hammer drive and the data access of memory until the printing wheel advances from the last printed digit of the quantity field to the first printed digit of the item field. Such a hold circuit is shown as part of the circuit of FIG. 70, 71, and 67.

Referring to FIG. 70, a nand-gate 398 has a series of inputs from the address counter. When each of the inputs are all logic one which indicates that the address counter is at the boundary between the item and the quantity field as shown in FIG. 71*a*, a logic one is generated at an input 399 to a gate 400. The gate 400 has a further input 401 which has a signal coupled thereto through the logic circuitry which includes gates 402, 403, 404, 405, and flip-flops 406 and 407. The input to this logic circuitry is derived from an output 408 of combinational logic including gates 409, 410 and 411.

One of the inputs to the circuit 409, 410 and 411 is the DATA B signal. Each time a blank digit is entered from memory in the quantity field, the address counter is advanced ahead of the corresponding column counter of the printer.

The resulting signal out of the circuit 409, 410, 411, is a clock signal which is used to change the state of a flip-flop 406 which produces a logic one at the input 401 of the nand-gate 400, thereby producing a hold signal when the address counter signal from gate 398 produces a logic one at the input 399. This indicates that the address counter has reached the boundary between the quantity field and the item field. Such a hold signal is then used to hold up the address counter until the column counter of the printer wheel reaches a count corresponding to the count of the address counter.

Figure 71:
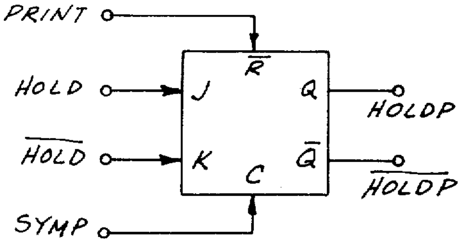
Figure 71A:
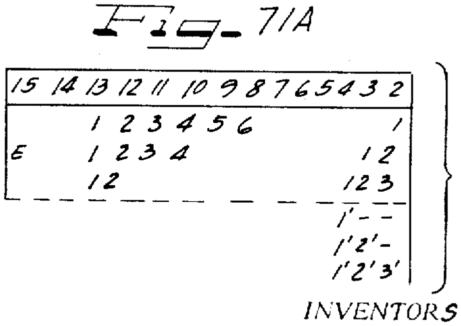

The purpose of the circuit shown in FIG. 71 is to delay the hold signals by one-half revolution of the printing wheel to produce a HOLD P and a $\overline{\text{HOLD P}}$ output as shown. The purpose of the circuit of FIG. 71 is to delay the hold signal so that it will not interfere with the mechanics of the printing cycle of the printing wheel.

Referring briefly to FIG. 67, a pair of signals $Y_2$ and $\overline{SYMS}$ are coupled to the logic circuitry as shown and ultimately to the hammer drive data output 391 as a special control operation to print the symbolic characters as opposed to the numeric characters on the printing wheel. All of the inputs in FIG. 67 have been identified with symbols which correspond to symbols on other parts of the circuit associated with the printer control.

Figure 81:
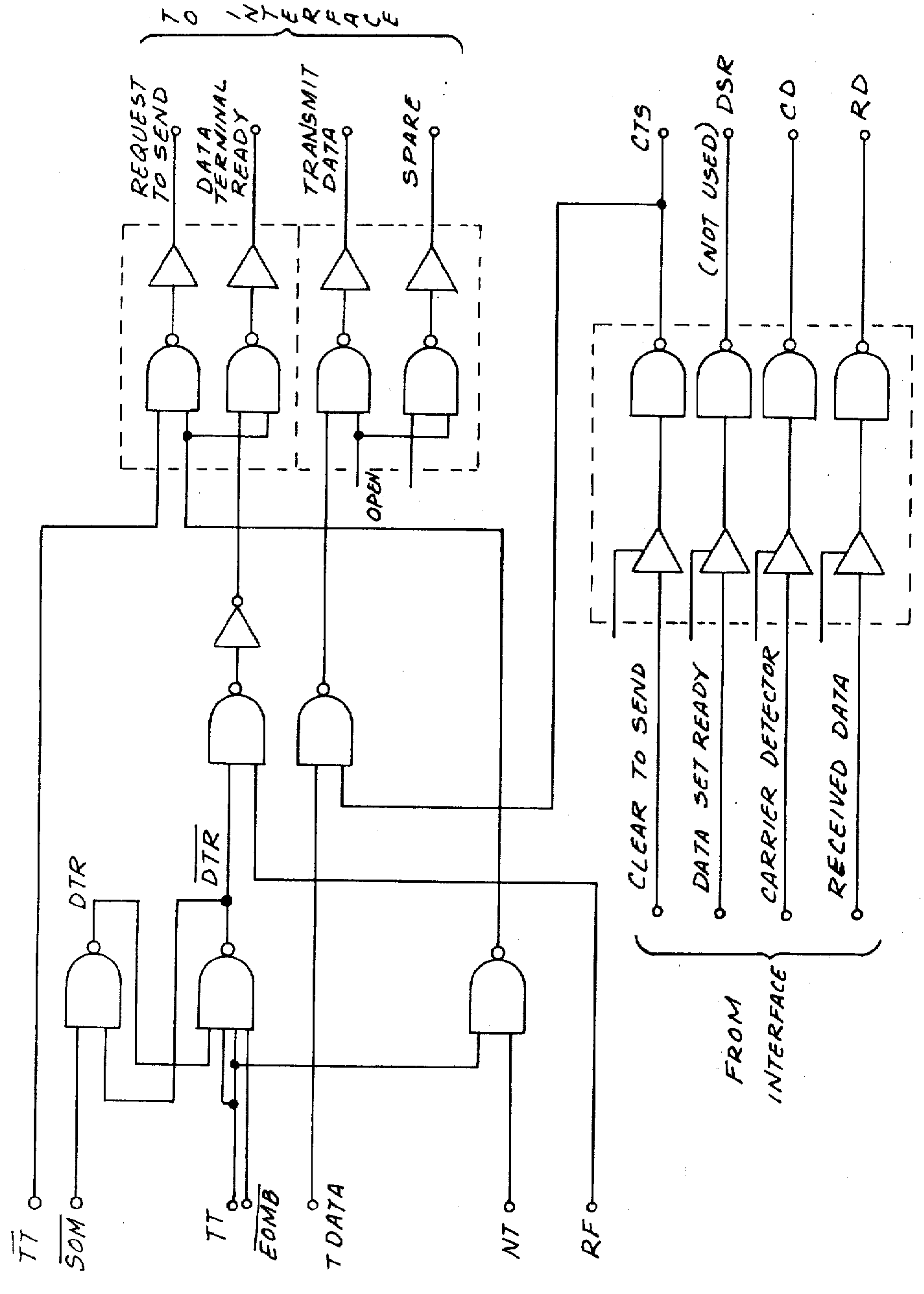
FIG. 81 is a schematic of an interface circuitry between the entire data collection and utilization system of the present invention and an external transmission system such as telephone lines.

FIG. 81 is the interface circuitry corresponding to the interface device shown in FIG. 5 of the block diagram. This interface is designed to be compatible with a telephone interface commonly known as EIA standard RS232. The input signal shown in FIG. 81 has been previously identified, and the purpose is to provide the "request to send," "data terminal ready signal," "transmit data," and a "spare" output signal as shown.

FIG. 82 shows the recorder circuitry for the cassette recorder unit shown in FIG. 1 and the portable power supply which consists of a pair of batteries and a DC to DC inverter. The purpose of the inverter is to step up the output voltage for the gas indicator tubes used in the display device. All of the outputs associated with the power supply have been identified throughout the system and are employed where indicated by like numerals and symbols as shown in FIG. 82. The P and R references in the upper portion of FIG. 82 refer to the playback and record modes of the recorder which are selected by the ganged switches shown.

What we claim is:

1. A data collection and utilization system comprising:
- a console for manipulating and utilizing data flow,
- a portable data key entry and memory unit,
- said portable data key entry and memory means having first electronic means to manipulate data,
- a bulk data storage unit associated with said portable key entry and memory unit,
- said portable key entry and memory unit being cooperable with said bulk data storage unit wholly apart from said console for entering and storing data,
- said console having further electronic means separate from said first electronic means to manipulate data which has been entered and stored in said portable data input means, said portable data key entry and memory unit together with said bulk data recording and storage unit being operably conectable to said console to permit said console to manipulate and utilize data from said bulk data recording and storage unit.

2. A data collection and utilization system in accordance with claim 1 wherein said console system has a system control keyboard for controlling the flow of data between said bulk data storage unit, said portable key entry and memory unit and said console system.

3. A data collection and utilization system in accordance with claim 2 wherein said console system has a housing associated therewith, said housing having a pair of carriage slots formed therein, said portable key entry and memory unit being readily releasably receivable within one of said carriage slots and said bulk data storage unit being readily releasably receivable within the other of said carriage slots, electrical connection means within each of said carriage slots and mating electrical connection means respectively within said portable key entry and memory unit and said bulk data storage unit.

4. A data collection and utilization system in accordance with claim 3 wherein a flexible electrical cable is provided to operably connect said portable key entry and memory unit with said bulk data recording and storage unit and wherein said flexible electrical cable is of sufficient length to permit said portable key entry and memory unit to be held in the hand of the operator, while said bulk data storage unit is relatively remotely carried by the operator.

5. A data collection and utilization system in accordance with claim 4 wherein said bulk data storage unit comprises a housing having recorder means therein for recording on a standard single track cassette type recording medium.

6. A contention control logic circuit for regulating the operation of first and second devices comprising:
- first input means for detecting when a first device has completed a predetermined function,
- second input means for detecting when a second device has completed a predetermined function,
- first output means for controlling the operation of said first device,
- second output means for controlling the operation of said second device,
- logic circuit means for comparing the logic states of the signals on the first and second input means and for using such comparison to control the operation of one of said two devices only at a time when said one device would, if not controlled, result in operational interference with the other device.

7. A contention control logic circuit in accordance with claim 6 wherein said contention control circuit comprises first and second logic gates coupled to said first and second input means respectively, the output of said first logic gate being coupled to an input of said second logic gate, the output of said second logic gate being coupled to an input of said logic gate, a second pair of such cross coupled logic gates having inputs coupled to the respective outputs of said first and second logic gates, a third pair of gates, each having one input coupled to an output of one of the gates of said second pair of gates and each having another input coupled to said first and second input means of the contentions control circuit.

8. A contention control logic circuit in accordance with claim 7 wherein said third pair of gates comprises first and second exclusive-or-gates.

9. A contention control logic circuit in accordance with claim 8 wherein each of said first and second logic gates and each of said second pair of gates comprises a nand-gate.

10. A contention control logic circuit in accordance with claim 8 wherein said first and second output means are coupled to the outputs respectively of each of said third pair of exclusive-or-gates.

11. A contention control logic circuit in accordance with claim 10 wherein first and second start inputs are provided for each of said second pair of gates respectively.

12. A contention control logic circuit in accordance with claim 11 wherein a reset input is provided for each of said second pair of gates.

13. A data collection and utilization system comprising:
- an intermediate memory, means for keying data into said intermediate memory,
a bulk data storage unit,
means for transferring data from said intermediate memory to said bulk data recording and storage unit, peripheral devices for utilizing data,
means for providing that data from said bulk data storage unit passes through memory prior to being utilized by said peripheral device, and
system control means for selectably passing data from said bulk data storage unit to said intermediate memory and from said intermediate memory to at least one of said peripheral devices.

14. A data collection and utilization system in accordance with claim 13 wherein other sources of data are provided in said data collection and utilization system and wherein data from each of said sources is caused to pass through said intermediate memory prior to being utilized by any one of said peripheral devices.

15. A data collection and utilization system in accordance with claim 14 wherein said data collection and utilization system is physically divided into three units, the first of said units containing at least the intermediate memory, the second of said units containing at least the bulk data storage unit, and the third of said units containing at least one of said peripheral data utilization devices, said first and second units being operably usable together either wholly apart from the operation of said third unit or operably coupled to said third unit.

16. A data collection and utilization system in accordance with claim 13 wherein said data collection and utilization system includes a number of devices, each being required to access data from said intermediate memory and wherein a time division multiplexing system is provided to provide a time slot for each of said number of devices to access said intermediate memory.

17. A data collection and utilization system in accordance with claim 16 wherein one of said number of devices comprises a display unit for visually displaying data.

18. A data collection and utilization system in accordance with claim 16 wherein one of said number of devices comprises a demodulator and means are provided to couple the output of said demodulator to said intermediate memory.

19 A data collection and utilization system in accordance with claim 18 wherein means are provided to pass data from said bulk data storage device to said demodulator prior to being passed to said intermediate memory.

20. A data collection and utilization system in accordance with claim 19 wherein one of said peripheral devices comprises a printer and wherein said system control means has enabling means to cause said printer to access memory when it is desired to print data from any data source including said bulk data and storage unit.

21. A data collection and utilization system in accordance with claim 16 wherein at least one contention control circuit is provided between any two of said number of devices which are required to access memory, said contention control circuit having means for sensing which of two devices has accessed a certain portion of memory first and for preventing the other device from accessing that portion of memory until the completion of access by the other device.

22. A data collection and utilization system comprising:
an intermediate memory having first and second sections,
a plurality of devices,
means for selectably causing one of said pluality of devices to access said first and second sections of memory sequentially,
means for developing a logic signal when a device has completed access of one of said two sections of memory,
a first of said plurality of devices transferring data to said intermediate memory,
a second of said plurality of devices retrieving data from memory, and
means providing for said first and second devices to access a given section of memory at different times and to assure that one device does not access a given section of memory until the other device has completed access of that section.

23. A data collection and utilization system in accordance with claim 22 wherein said intermediate memory is divided into at least four lines of data and wherein each of said sections of said memory contains at least two lines of data.

24. A data collection and utilization system in accordance with claim 23 wherein said means providing for the access of said sections of memory at different times comprises at least one contention control circuit having means for detecting said logic signal when a device has completed access of one of said two sections, and for permitting access of said one section by the other device and for continually controlling the access of memory by said devices to prevent interference by said devices in accessing either one of said sections of memory.

25. A data collection and utilization system comprising:
a console,
a portable data input means,
said portable data input means having first electronic means to manipulate data,
a bulk data storage means associated with said portable input means, said portable data input means and bulk data storage means being cooperably associated wholly apart from said console for entering and storing data,
said console having further electronic means separate from said first electronic means to manipulate date which has been entered and stored in said portable data input means, at least one of said input and bulk storage means being operably connectable to said console to permit the combination of said one means and the console to manipulate and utilize data.

26. A data collection and utilization system in accordance with claim 25, wherein said portable data input means has means for producing a visual display.

27. A data collection and utilization system in accordance with claim 26, wherein means are provided to produce the visual display before the displayed data is transferred to the bulk data storage means.

28. A data collection and utilization system in accordance with claim 25 wherein the portable data input means is a hand held unit.

29. A data collection and utilization system in accordance with claim 25 wherein said portable data input means comprises a key entry unit.

30. A data collection and utilization system in accordance with claim 26, wherein means are provided to clear an entry in the visual display, prior to transferring the displayed date to the bulk data storage means.

31. A data collection and utilization system in accordance with claim 26, wherein an intermediate storage means is provided, means are provided for recalling data from the intermediate storage means to the visual display means after the display of that data has been cleared from the display means.

32. A data collection and utilization system in accordance with claim 26, wherein means for recalling data from the intermediate storage mans comprises means for sequentially recalling each line of data held in the intermediate storage means at any instant of time.

33. A data collection and utilization system in accordance with claim 26 wherein means are provided to review the data stored in the bulk data storage means by producing a display of said data sequentially on the visual display means.

34. A data collection and utilization system comprising a console, a portable data input means, said portable data input means having first electronic means to manipulate data, a bulk data storage means associated with said portable means, memory means operably coupled between said input means and said bulk data storage means, means for transferring data from said input means to said memory means and means for transferring data from said memory to said bulk storage means, said console having further electronic means separate from said first electronic means to manipulate data which has been entered and stored in said portable data input means, said portable data input means, memory and bulk data recorder and storage means being cooperably associated wholly apart from said console for entering and storing data, at least one of said input and bulk storage means being operably connectable to said console to permit the combination of said one means and the console to manipulate and utilize data.

35. A data collection and utilization system in accordance with claim 34 wherein peripheral devices are provided for utilizing data stored in memory and wherein means are provided to permit said peripheral devices to access memory on a time shared non-interfering basis.

36. A data collection and utilization system in accordance with claim 35 wherein means are provided for addressing said memory and wherein the means for providing non-interference access to the memory comprises a contention control circuit.

37. A data collection and utilization system in accordance with claim 36 wherein the contention control circuit comprises: first input means for detecting when a first device has completed a predetermined function, second input means for detecting when a second device has completed a predetermined function, first output means for controlling the operation of said first device, second output means for controlling the operation of said second device, logic circuit means for comparing the logic states of the signals on the first and second input means and for using such comparison to control the operation of one of said two devices only at a time when said one device would, if not controlled, result in operational interference with the other device.

38. A data collection and utilization system in accordance with claim 34 wherein means are provided for transferring data from the bulk storage means to a point remote from both the portable data input means and from the console.

39. A data collection and utilization system in accordance with claim 38 wherein means are provided for transferring data from said memory to a point remote from both the portable data input means and from the console.

40. A data collection and utilization system in accordance with claim 34 wherein means are provided for receiving data from a point which is remote from both the console and the data input means, and means are provided for utilizing the received data.

41. A data collection and utilization system in accordance with claim 40 wherein means for utilizing the received data comprises means for producing a visual display of the same.

42. A data collection and utilization system in accordance with claim 40 wherein said means for utilizing the received data comprises means for producing a printed reproduction of the data.

43. A data collection and utilization system in accordance with claim 40 wherein said means for utilizing the received data comprises means for storing the data.

44. A data collection and utilization system in accordance with claim 40 wherein means are provided for transferring the received data to and through said memory prior to being transferred to the means for utilizing the data.

45. A data collection and utilization system in accordance with claim 18, wherein means are provided to transfer received data to said demodulator prior to being passed to said intermediate memory.

46. A data collection and utilization system in accordance with claim 16 wherein one of said number of devices comprises a modulator, said modulator being coupled to an output of said intermediate memory and means are provided to couple the output of the modulator to a further utilization device.

47. A data collection and utilization system in accordance with claim 16 wherein said further utilization device comprises means for transmitting data over telephone lines.

48. A data collection and utilization system in accordance with claim 25, wherein the console has means for charging batteries associated with the portable input and bulk data storage means and wherein the console has an alternate source of power for operating together with the input means and bulk data recorder and storage means.

* * * * *